United States Patent
Otani et al.

(10) Patent No.: US 9,718,910 B2
(45) Date of Patent: Aug. 1, 2017

(54) ARTICLE AND ACTIVE ENERGY RAY-CURABLE RESIN COMPOSITION

(71) Applicant: Mitsubishi Rayon Co., Ltd., Tokyo (JP)

(72) Inventors: Go Otani, Otake (JP); Seiichiro Mori, Toyohashi (JP); Masashi Ikawa, Otake (JP); Yusuke Nakai, Otake (JP); Keiko Yasukawa, Otake (JP); Shinji Makino, Otake (JP)

(73) Assignee: Mitsubishi Rayon Co., Ltd., Tokyo (JP)

(*) Notice: Subject to any disclaimer, the term of this patent is extended or adjusted under 35 U.S.C. 154(b) by 175 days.

(21) Appl. No.: 14/407,764

(22) PCT Filed: Jun. 17, 2013

(86) PCT No.: PCT/JP2013/066592
§ 371 (c)(1),
(2) Date: Dec. 12, 2014

(87) PCT Pub. No.: WO2013/187528
PCT Pub. Date: Dec. 19, 2013

(65) Prior Publication Data
US 2015/0166704 A1  Jun. 18, 2015

(30) Foreign Application Priority Data

Jun. 15, 2012 (JP) .................... 2012-135982
Jun. 19, 2012 (JP) .................... 2012-138147
(Continued)

(51) Int. Cl.
*C08F 222/10* (2006.01)
*C08F 222/20* (2006.01)
(Continued)

(52) U.S. Cl.
CPC ...... *C08F 222/1006* (2013.01); *C08F 222/20* (2013.01); *C08F 290/062* (2013.01);
(Continued)

(58) Field of Classification Search
CPC  C08F 222/1006; C08F 222/20; C08F 290/02; C08F 290/062; C08F 299/02;
(Continued)

(56) References Cited

U.S. PATENT DOCUMENTS

2010/0323165 A1* 12/2010 Sakuma ............. G02B 1/118
428/167

FOREIGN PATENT DOCUMENTS

EP        2128659 A1    12/2009
JP     2000-071290 A    3/2000
(Continued)

OTHER PUBLICATIONS

Third Party Submission (dated Oct. 30, 2015) pp. 1-3 provided in counterpart Japanese Patent Application No. 2013-529230.
(Continued)

*Primary Examiner* — Derek S Chapel
*Assistant Examiner* — Adam W Booher
(74) *Attorney, Agent, or Firm* — Morgan, Lewis & Bockius LLP

(57) ABSTRACT

Provided is an article having high scratch resistance and satisfactory fingerprint wipeability. Disclosed is an article having a microrelief structure containing a cured product of a resin composition on the surface, in which the indentation elastic modulus (X) [MPa] and the creep deformation ratio (Y) [%] of the cured product satisfy the following formulas (1) and (2):

$80 \leq X \leq 560$                                (1)

$Y \leq (0.00022X - 0.01) \times 100$            (2).

19 Claims, 4 Drawing Sheets

(30) Foreign Application Priority Data

Nov. 7, 2012 (JP) ................................ 2012-245231
Nov. 27, 2012 (JP) ................................ 2012-258346

(51) Int. Cl.
*C08F 290/06* (2006.01)
*C08F 299/02* (2006.01)
*G02B 1/11* (2015.01)
*B29C 37/00* (2006.01)
*B29C 59/04* (2006.01)
*G02B 1/118* (2015.01)
*B29C 35/08* (2006.01)

(52) U.S. Cl.
CPC .............. *C08F 299/02* (2013.01); *G02B 1/11* (2013.01); *G02B 1/118* (2013.01); *B29C 37/0067* (2013.01); *B29C 59/046* (2013.01); *B29C 2035/0827* (2013.01)

(58) Field of Classification Search
CPC ........... G02B 1/11; G02B 1/111; G02B 1/118; G02B 1/10; G02B 5/02–5/0231; G02B 5/0268; G02B 27/42–27/46; B29C 37/0067; B29C 59/046; B29C 2035/0827
See application file for complete search history.

(56) References Cited

FOREIGN PATENT DOCUMENTS

| | | |
|---|---|---|
| JP | 2000-234073 A | 8/2000 |
| JP | 2004-284178 A | 10/2004 |
| JP | 2005-284142 A | 10/2005 |
| JP | 2007-084602 A | 4/2007 |
| JP | 2007-084625 A | 4/2007 |
| JP | 2009-286953 A | 12/2009 |
| JP | 2011-000856 A | 1/2011 |
| JP | 2011-033892 A | 2/2011 |
| JP | 2011-090326 A | 5/2011 |
| JP | 2011-198434 A | 10/2011 |
| TW | 201139120 A | 11/2011 |
| WO | 2008/096872 A1 | 8/2008 |
| WO | 2011/115162 A1 | 9/2011 |
| WO | 2011/118734 A1 | 9/2011 |
| WO | 2011/155499 A1 | 12/2011 |

OTHER PUBLICATIONS

Extended European Search Report issued in counterpart European Patent Application No. 13804639.6 dated Jun. 9, 2015.
International Search Report issued in corresponding International Patent Application No. PCT/JP2013/066592 dated Jul. 16, 2013.
Written Opinion issued in corresponding International Patent Application No. PCT/JP2013/066592 dated Jul. 16, 2013.
Office Action issued in counterpart Taiwanese Patent Application No. 102121190 dated Aug. 27, 2014.
Office Action issued in counterpart Japanese Patent Application No. 2013-529230 dated Jan. 19, 2016.
Office Action issued in counterpart Japanese Patent Application No. 2015-015543 dated Dec. 6, 2016.

\* cited by examiner

ARTICLE AND ACTIVE ENERGY RAY-CURABLE RESIN COMPOSITION

TECHNICAL FIELD

The present invention relates to an article and an active energy ray-curable resin composition.

This patent application claims priority based on Japanese Patent Application No. 2012-135982 filed on Jun. 15, 2012; Japanese Patent Application No. 2012-138147 filed on Jun. 19, 2012; Japanese Patent Application No. 2012-245231 filed on Nov. 7, 2012; and Japanese Patent Application No. 2012-258346 filed on Nov. 27, 2012, the entire disclosures of which have been incorporated herein by reference.

BACKGROUND ART

It is known that an article having a microrelief structure that has a period of less than or equal to the wavelength of visible light on the surface, has an antireflection performance that is based on continuous change in the refractive index in the microrelief structure. Furthermore, it is also known that the microrelief structure exhibits super water-repellent performance as a result of a lotus effect.

Regarding the method for producing an article having a microrelief structure on the surface, for example, the methods described below have been suggested.

(i) A method of transferring a microrelief structure to a thermoplastic resin when a thermoplastic resin is injection molded or press molded, by using a stamper having a reverse structure of the microrelief structure on the surface.

(ii) A method of filling an active energy ray-curable resin composition between a transparent substrate and a stamper having a reverse structure of a microrelief structure on the surface, curing the resin composition by irradiation of active energy radiation, subsequently releasing the stamper, and thereby transferring the microrelief structure to the cured product. Alternatively, a method of filling an active energy ray-curable resin composition between the stamper described above and a transparent substrate, subsequently releasing the stamper to thereby transfer a microrelief structure to the active energy ray-curable resin composition, and then curing the active energy ray-curable resin composition by irradiation of active energy radiation.

Among these methods, attention has been paid to method (ii), from the viewpoint that the method exhibits satisfactory transferability of the microrelief structure and a high degree of freedom of the composition at the article surface, is capable of continuous production when the stamper has a belt shape or a roll shape, and exhibits excellent productivity.

Regarding the active energy ray-curable resin composition that is used for the method (ii), for example, the following compositions have been suggested.

(1) A photocurable resin composition containing an acrylate oligomer such as urethane acrylate, an acrylic resin having a radical polymerizable functional group, a mold releasing agent, and a photopolymerization initiator (Patent Document 1).

(2) A photocurable resin composition containing a (meth)acrylate such as ethoxylated bisphenol A di(meth)acrylate, a reactive diluent such as N-vinylpyrrolidone, a photopolymerization initiator, and a fluorine-based surfactant (Patent Document 2).

(3) An ultraviolet-curable resin composition containing a polyfunctional (meth)acrylate such as trimethylolpropane tri(meth)acrylate, a photopolymerization initiator, and a leveling agent such as a polyether-modified silicone oil (Patent Document 3).

Furthermore, Patent Document 4 suggests a solvent-free active energy ray-curable resin composition. However, a light transmissive article formed from this curable resin composition still has room for improvement in terms of scratch resistance. Furthermore, examples of a general technique for enhancing scratch resistance include a method of incorporating a silicone oil to a curable resin composition as a surface adjusting agent, and thereby imparting slip properties (for example, Patent Document 5), and a method of using a polyfunctional acrylate monomer (for example, Patent Document 6).

Furthermore, it has been disclosed that an article having a microrelief structure on the surface has at least two layers, including a transparent base, and a layer formed by a cured product of an active energy ray-curable resin composition, the layer being formed on the transparent base and has a microrelief structure transferred thereon (Patent Document 7). In addition, in order to impart adhesiveness between the transparent base and the layer formed by a cured product of an active energy ray-curable resin composition, and functionalities such as high hardness, investigations have been made on the addition of functional layers thereto (Patent Document 8).

CITATION LIST

Patent Document

Patent Document 1: Japanese Patent No. 4156415
Patent Document 2: JP 2007-84625 A
Patent Document 3: JP 2000-71290 A
Patent Document 4: WO 2008/096872
Patent Document 5: JP 2000-234073 A
Patent Document 6: Japanese Patent No. 4318577
Patent Document 7: JP 2011-33892 A
Patent Document 8: JP 2011-856 A

DISCLOSURE OF THE INVENTION

Problem to be Solved by the Invention

However, the photocurable resin composition of (1) has problems described below.

The photocurable resin composition is susceptible to scratching by rubbing.
Since the cured product has insufficient hydrophilicity, even if it is attempted to wipe up contaminations such as fingerprints adhering to the cured product (microrelief structure) with a damp cloth, the contaminations do not rise to the surface with water, and it is difficult to wipe up fingerprints or the like.

Furthermore, the photocurable resin composition of (2) has problems described below.

Since the cured product has insufficient hydrophilicity, even if it is attempted to wipe up contaminations such as fingerprints adhering to the cured product (microrelief structure) with a damp cloth, the contaminations do not rise to the surface with water, and it is difficult to wipe up fingerprints or the like.

Furthermore, since the ultraviolet-curable resin composition of (3) has sufficiently high hydrophobicity of the cured product, contaminations such as fingerprints do not easily adhere thereto; however, the following problems exist.

Due to the low molecular weight of the polymerizable component, the cured product becomes hard and brittle, and is susceptible to scratching by rubbing.

Furthermore, since a nanorelief structure has a unique surface structure, it is difficult to impart scratch resistance by the same method as in the case of a smooth surface. For example, in a method of incorporating a surface adjusting agent such as silicone oil as in the case of Patent Document 5, the required scratch resistance cannot be sufficiently satisfied. Furthermore, the attached contaminations may not easily come off due to the influence of the surface adjusting agent.

Furthermore, in the method of using an ethylene oxide-modified compound of a polyfunctional monomer of Patent Document 6, there are occasions in which detachment failure such as cracking occurring when the structure is detached from a mold, may occur. There are also occasions in which protrusions of the nanorelief structure are broken by the contact with a hard member, and the antireflection performance may be deteriorated. Furthermore, if there is an excessively large amount of ethylene oxide, there occurs a phenomenon in which the protrusions of the nanorelief structure draw closer to one another, so that the film may become cloudy.

Also, in a case in which a bilayer structure having a transparent base, and a layer formed by a cured product of an active energy ray-curable resin composition, which layer is formed on the transparent base and has a microrelief structure transferred thereon, is employed as described in Patent Document 7, there is a problem that it is difficult to increase the adhesiveness between the two layers, and there are problems such as deterioration of the antireflection performance caused by interfacial reflection occurring due to the difference between the refractive indices of the two layers, and high substrate cost.

A material containing, as a main component, triacetyl cellulose or an acrylic polymer, both of which are frequently used as transparent bases in the case of using a film-like antireflective article having a microrelief structure on the surface in an application of an image display device, is relatively expensive in many cases. Furthermore, since a transparent base containing triacetyl cellulose or an acrylic polymer as a main component is soft in order to enhance handleability as a film, it is difficult to increase the hardness of the entire article by means of a cured product of an active energy ray-curable resin composition.

If a thin film made of polyethylene terephthalate (PET) is selected, the film may be relatively inexpensive; however, the film has a large difference in the refractive index with a glass or acrylic front face plate, and the film is not preferable as a transparent base for antireflective film. Furthermore, since polyethylene terephthalate has a large difference in the refractive index with a cured product of an acrylic active energy ray-curable resin composition, there is a problem that interfacial reflection occurs, and the antireflection performance is significantly deteriorated. Meanwhile, a cured product of an acrylic active energy ray-curable resin composition, a tacky adhesive, an acrylic plate, and a glass plate have very small mutual differences in their refractive indices.

Furthermore, a method of adding a new functional layer between a transparent base and a layer formed from a cured product of an active energy ray-curable resin composition as described in Patent Document 8, has a problem that the cost is increased due to an increase in the number of treatment processes.

It is an object of the present invention to provide an article having high scratch resistance and satisfactory fingerprint wipeability, and an active energy ray-curable resin composition that is used in the production of the relevant article.

Means for Solving Problem

The present invention includes inventions related to the following items [1] to [19].

[1] An article having a microrelief structure containing a cured product of a resin composition on the surface, wherein the indentation elastic modulus (X) [MPa] and the creep deformation ratio (Y) [%] of the cured product satisfy the following formulas (1) and (2):

$$80 \leq X \leq 560 \quad (1)$$

$$Y \leq (0.00022X - 0.01) \times 100 \quad (2).$$

[2] The article described in [1], wherein the indentation elastic modulus (X) [MPa] and the creep deformation ratio (Y) [%] of the cured product satisfy the following formula (1'):

$$120 \leq X \leq 360 \quad (1').$$

[3] The article described in [1] or [2], wherein the average distance between adjoining convexities of the microrelief structure is 120 to 380 nm, and the average height of the convexities of the microrelief structure is 100 to 300 nm.

[4] The article described in any one of [1] to [3], wherein the article further includes a substrate, and the substrate includes, on at least one surface, a microrelief structure layer containing a cured product of an active energy ray-curable resin composition.

[5] The article described in [4], wherein the acrylic equivalent of the active energy ray-curable resin composition is from 200 to 320.

[6] The article described in [4], wherein the acrylic equivalent of the active energy ray-curable resin composition is from 230 to 310.

[7] The article described in any one of [4] to [6], wherein the proportion occupied by oxyethylene groups in the cured product is from 55.0% by mass to 74.0% by mass.

[8] The article described in any one of [4] to [7], wherein the active energy ray-curable resin composition includes:
a polymerizable component (Z) including:
0 to 20% by mass of a polyfunctional acrylate (A1) that has three or more acryloyl groups in the molecule, with the molecular weight per group of the relevant acryloyl groups being less than 110;
15 to 75% by mass of a polyfunctional acrylate (B1) that has three or more acryloyl groups in the molecule, with the molecular weight per group of the relevant acryloyl groups being 110 or more; and
20 to 85% by mass of a bifunctional acrylate (C1) that has two acryloyl groups in the molecule and contains a polyethylene glycol structure having a molecular weight of 300 or more, and
a photopolymerization initiator (D).

[9] The article described in any one of [4] to [7], wherein the active energy ray-curable resin composition includes a polymerizable component (Z) including a polyfunctional (meth)acrylate (A2) that has three or more (meth)acryloyl groups in the molecule, with the average value of the number of oxyethylene groups per group of the relevant (meth)acryloyl groups being 5 or more, and includes a photopolymerization initiator (D).

[10] The article described in [9], wherein the polyfunctional (meth)acrylate (A2) is a compound represented by the following general formula (1):

[Chemical Formula 1]

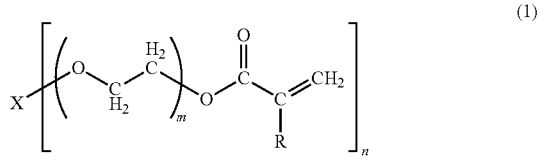

(1)

wherein X represents an organic residue; R represents a hydrogen atom or a methyl group; $m \geq 5$; and $n \geq 3$.

[11] The article described in [9], wherein the polyfunctional (meth)acrylate (A2) is one or more compounds selected from the group consisting of ethylene oxide-modified (poly)(meth)acrylates of (poly)pentaerythritol, (poly)glycerin and (di)trimethylolpropane.

[12] The article described in any one of [4] to [7], wherein the active energy ray-curable resin composition includes a polymerizable component (Z) including 25 to 100% by mass of a polyfunctional (meth)acrylate (A2); and 0 to 75% by mass of a polyfunctional (meth)acrylate (B2) that has three or more (meth)acryloyl groups in the molecule, with the average value of the number of oxyethylene groups per group of the relevant (meth)acryloyl groups being less than 5, and includes a photopolymerization initiator (D).

[13] The article described in any one of [4] to [7], wherein the polymerizable compound included in the active energy ray-curable resin composition is a tetrafunctional or higher-functional (meth)acrylic monomer (A3) in which the percentage content of polyalkylene glycol (PAG) in the (meth)acrylic monomer (A3) represented by the following formula (a) is from 50% to 87%:

$$PAG=M(PAG)/[M(ACR)+M(PAG)]\times 100 \quad (a)$$

M(PAG): Total chemical formula weight of polyalkylene glycol structural moiety

M(ACR): Total chemical formula weight of (meth)acryloyl structural moiety

[14] An active energy ray-curable resin composition comprising:
a polymerizable component (Z) including:
0 to 20% by mass of a polyfunctional acrylate (A1) that has three or more acryloyl groups in the molecule, with the molecular weight per group of the relevant acryloyl groups being less than 110;
15 to 75% by mass of a polyfunctional acrylate (B1) that has three or more acryloyl groups in the molecule, with the molecular weight per group of the relevant acryloyl groups being 110 or more; and
20 to 85% by mass of a bifunctional acrylate (C1) that has two acryloyl groups in the molecule and contains a polyethylene glycol structure having a molecular weight of 300 or more, and
a photopolymerization initiator (D).

[15] An active energy ray-curable resin composition, comprising a polymerizable component (Z) that includes a polyfunctional (meth)acrylate (A2) that has three or more (meth)acryloyl groups in the molecule, with the average value of the number of oxyethylene groups per group of the relevant (meth)acryloyl groups being 5 or more, and comprising a photopolymerization initiator (D).

[16] A light transmissive article active energy ray-curable resin composition, comprising a polymerizable component (Z) that includes 25 to 100% by mass of a polyfunctional (meth)acrylate (A2); and 0 to 75% by mass of a polyfunctional (meth)acrylate (B2) that has three or more (meth)acryloyl groups in the molecule, with the average value of the number of oxyethylene groups per group of the relevant (meth)acryloyl groups being less than 5, and comprising a photopolymerization initiator (D).

[17] An active energy ray-curable resin composition, comprising a polymerizable compound including a tetrafunctional or higher-functional (meth)acrylic monomer (A3) in which the polyalkylene glycol percentage content (PAG) in the (meth)acrylic monomer (A3) represented by the following formula (a) is from 50% to 87%; and a trifunctional or higher-functional (meth)acrylic monomer (B3) other than the (meth)acrylic monomer (A3), wherein the (meth)acrylic monomer (A3) and/or (meth)acrylic monomer (B3) of the polymerizable compound has one or more polyalkylene glycol structures having an average number of repetition of a structure derived from alkylene glycol of 5 or larger, in the molecule:

$$PAG=M(PAG)/[M(ACR)+M(PAG)]\times 100 \quad (a)$$

M(PAG): Total chemical formula weight of polyalkylene glycol structural moiety

M(ACR): Total chemical formula weight of (meth)acryloyl structural moiety.

[18] An antireflective article comprising the article described in any one of [1] to [13].

Effect of the Invention

According to the present invention, an article having high scratch resistance and satisfactory fingerprint wipeability, and an active energy ray-curable resin composition that is used in the production of the article can be provided.

MODE(S) FOR CARRYING OUT THE INVENTION

Figure 1:
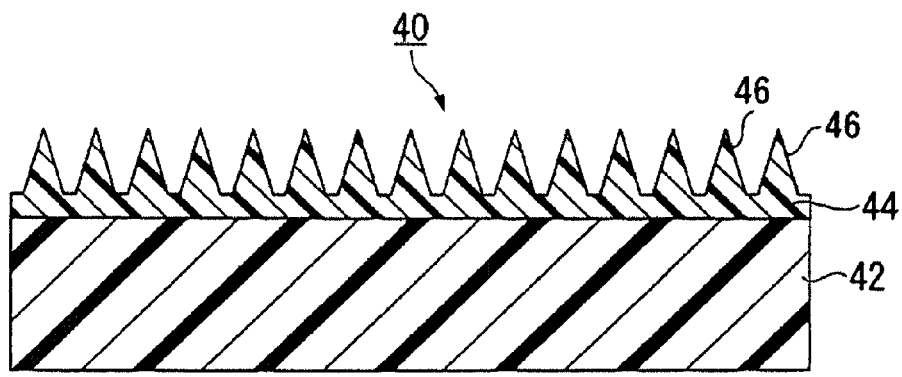
FIG. 1 is a cross-sectional diagram illustrating an example of the article according to the present invention.

Hereinbelow, various exemplary embodiments of the present invention are explained, but the present invention is not intended to be limited to these exemplary embodiments. Furthermore, the article related to the present invention is not intended to be limited to a light transmissive article, and may also include other articles.

First Exemplary Embodiment

The light transmissive article related to the present invention is a light transmissive article including a microrelief structure layer containing a cured product of an active energy ray-curable resin composition on at least one surface of a light transmissive substrate, in which article the distance between adjoining convexities in the microrelief structure layer is 140 to 260 nm, the aspect ratio of a convexity of the microrelief structure layer is 0.7 to 1.4, and the indentation elastic modulus (X) [MPa] and the creep deformation ratio (Y) [%] of the cured product satisfies the following formulas (1) and (2):

$$80 \leq X \leq 560 \quad (1)$$

$$Y \leq (0.00022X - 0.01) \times 100 \quad (2).$$

The antireflective article related to the present invention includes the light transmissive article related to the present invention.

According to the present invention, a light transmissive article having high scratch resistance and satisfactory fingerprint wipeability can be provided.

The light transmissive article related to the present invention has high scratch resistance of the microrelief structure layer and satisfactory fingerprint wipeability. Furthermore, when an active energy ray-curable resin composition related to the present invention is used, a cured product having high scratch resistance and satisfactory fingerprint wipeability can be formed.

The microrelief structure of the microrelief structure layer provided in the light transmissive article related to the present invention is preferably a so-called moth-eye structure in which plural protrusions (convexities) having an approximately conical shape, a pyramidal shape or the like are aligned. A moth-eye structure in which the distance between protrusions is less than or equal to the wavelength of visible light (400 nm), is known to be effective as a means for antireflection because the refractive index increases continuously from the refractive index of air to the refractive index of the material.

In order to achieve a balance between antireflection performance and scratch resistance in the microrelief structure layer, it is important that the distance between adjoining convexities, and the aspect ratio that represents the balance between the distance between adjoining convexities and the height of a convexity (height of a convexity/distance between adjoining convexities) are within particular ranges.

When the distance between adjoining convexities is less than or equal to the wavelength of visible light (400 nm), antireflection performance is obtained. If the distance is more than 400 nm, scattering of visible light occurs, and therefore, the article is not suitable for optical applications such as an antireflective article. The distance between adjoining convexities of the microrelief structure layer provided on the light transmissive article related to the present invention is 140 to 260 nm, preferably 150 to 240 nm, more preferably 155 nm to 220 nm, and even more preferably 160 nm to 200 nm. When the distance is 140 nm to 260 nm, the adjoining convexities do not stick together, which is preferable.

Meanwhile, the distance between adjoining convexities is a value obtained by measuring the distance between adjoining convexities (distance from the center of a convexity to the center of an adjacent convexity) at 50 sites using an electron microscope (trade name: JSM7400F, manufactured by JEOL, Ltd.), and averaging these values.

When the distance between adjoining convexities is in the range described above, the antireflection performance of the light transmissive article is typically determined by the height of the protrusion. In order to obtain satisfactory antireflection performance, the height of the convexity is preferably 120 to 250 nm, more preferably 150 to 220 nm, and even more preferably 180 to 190 nm. When the height of the convexity is 120 nm or greater, sufficiently low reflectance is obtained, and the dependency on wavelength of the reflectance is low. When the height of the convexity is 250 nm or less, the phenomenon in which the tips of convexities draw closer to one another can be easily suppressed.

Meanwhile, the height of a convexity is a value obtained by measuring the distance between the apex of the convexity and the lowermost site of a concavity existing between convexities on the occasion of observing the convexities at 50 sites using the aforementioned electron microscope at a magnification ratio of 30,000 times, and averaging these values.

The aspect ratio of a convexity (height of the convexity/distance between adjoining convexities) of the microrelief structure of the microrelief structure layer provided on the light transmissive article related to the present invention is 0.7 to 1.4, preferably 0.8 to 1.3, more preferably 0.85 to 1.25, and even more preferably 0.9 to 1.2. If the aspect ratio is less than 0.7, the reflectance is not sufficiently lowered. If the aspect ratio is larger than 1.4, sufficient scratch resistance of the convexities cannot be obtained.

The active energy ray-curable resin composition related to the present invention is a resin composition that undergoes a polymerization reaction and cures when irradiated with active energy radiation.

According to the present invention, the indentation elastic modulus (X) of a cured product of the active energy ray-curable resin composition is from 80 MPa to 560 MPa, preferably from 100 MPa to 550 MPa, more preferably from 120 MPa to 500 MPa, even more preferably from 140 MPa to 400 MPa, and particularly preferably from 160 MPa to 360 MPa. If the indentation elastic modulus (X) is less than 80 MPa, the cured product becomes so soft that when an external force is applied, the cured product may be damaged by being significantly shaved off or hollowed out to a part where a microrelief structure does not exist, and thus scratch resistance is deteriorated. On the other hand, if the indentation elastic modulus (X) is more than 560 MPa, when the microrelief structure is deformed as an external force is applied, the convexities may be broken or shaved off and cannot be restored to the original shape.

According to the present invention, the indentation elastic modulus (X) and the creep deformation ratio (Y) satisfy the relationship of formula (2). Even in a case in which the indentation elastic modulus (X) is in the range of (1), if the creep deformation ratio (Y) does not satisfy the formula (2), the conformity of the microrelief structure and the cured product to an externally applied force is low, and the protrusions may not withstand the force and may be broken or shaved off.

Meanwhile, the indentation elastic modulus (X) and the creep deformation ratio (Y) are values measured by the following method.

In regard to a microrelief structure layer, measurement is carried out in a constant temperature room (temperature 23° C., humidity 50%) using a Vickers indenter (tetrahedral diamond pyramid) and a microhardness meter (trade name: FISCHERSCOPE HM2000XYp, manufactured by Fischer Technology, Inc.). The measurement program was such that [indentation (50 mN/10 seconds)]→[creep (50 mN, 60 seconds)]→[unloading (50 mN/10 seconds)].

From the results of measurement made by such a method, the indentation elastic modulus (X) of a cured product of the active energy ray-curable resin composition is calculated by an analytic software (trade name: WIN-HCU, manufactured by Fischer Technology, Inc.).

Alternatively, a specimen produced by using a large-sized slide glass (trade name: S9213, manufactured by Matsunami Glass Industries, Ltd.) as a substrate, applying an active energy ray-curable resin composition on the substrate so as to obtain a thickness of the coating film of about 500 µm, and irradiating the active energy ray-curable resin composition with ultraviolet radiation using a high pressure mercury lamp at about 3000 mJ/cm$^2$, may also be used as a sample for measurement of the indentation elastic modulus (X) and the creep deformation ratio (Y).

Furthermore, in regard to the measurement program, the indentation depth at the time of creep initiation is designated as h0, the indentation depth at the time of creep completion is designated as h1, and the creep deformation ratio (Y) is determined based on these h0 and h1 by the following formula:

Creep deformation ratio (%)=($h1-h0$)/$h0$×100.

In regard to the active energy ray-curable resin composition, the indentation elastic modulus (X) of a cured product thereof can be adjusted to an appropriate range by adjusting the acrylic equivalent of the resin composition. The acrylic equivalent is a numeral value represented by the molecular weight per mole of the number of active (meth)acryloyl groups. As the acrylic equivalent is smaller, the concentration of (meth)acryloyl groups is increased, and a cured product having a higher crosslinking density is obtained. On the other hand, as the acrylic equivalent is larger, the concentration of (meth)acryloyl groups is decreased, and a cured product having a lower crosslinking density is obtained.

The acrylic equivalent of the active energy ray-curable resin composition related to the present invention is preferably from 200 to 320, more preferably from 215 to 310, even more preferably from 230 to 285, and particularly preferably from 240 to 280.

When the acrylic equivalent of the active energy ray-curable resin composition is 200 or more, damage of protrusions caused by an excessive increase in the crosslinking density can be prevented, and scratch resistance is enhanced. On the other hand, when the acrylic equivalent of the active energy ray-curable resin composition is 320 or less, softening of the cured product caused by a low crosslinking density can be prevented, there occurs no damage of the cured product caused by significant shaving off or hollowing out of the cured product to a part where the microrelief structure does not exist, and scratch resistance is enhanced.

It is highly likely that making the protrusions of the microrelief structure layer not easily breakable, and making the cured product not easily shavable or hollowable are in a mutual trade-off relationship. In order to design a cured product that has both of these two contradictory characteristics, it is important to maintain a balance between deformation caused by external stress and restoration, while having the indentation elastic modulus (X) adjusted to an appropriate range.

The inventors of the present invention conducted thorough investigations, and as a result, they found that when the microrelief structure is adjusted to a particular structure, and the indentation elastic modulus (X) and the creep deformation ratio (Y) of a cured product of the active energy ray-curable resin composition are adjusted to particular ranges, high scratch resistance may be imparted to the microrelief structure layer.

Furthermore, not only by adjusting the acrylic equivalent of the active energy ray-curable resin composition, but also by allowing the cured product to contain a particular structure at a particular proportion, the values of the indentation elastic modulus (X) and the creep deformation ratio (Y) can be adjusted to the ranges of the above formulas (1) and (2).

The inventors of the present invention conducted thorough investigations, and as a result, they found that when a monomer having many oxyethylene groups ($-CH_2CH_2O-$) in the molecule is used as a monomer that is included in the active energy ray-curable resin composition, the properties of the present invention of having excellent scratch resistance can be realized. Specifically, the proportion occupied by oxyethylene groups in a cured product of the active energy ray-curable resin composition is preferably from 55.0% by mass to 74.0% by mass, more preferably from 58.0% by mass to 72.0% by mass, even more preferably from 60.0% by mass to 70.0% by mass, and particularly preferably from 62.0% by mass to 68.0% by mass.

When the cured product contains oxyethylene groups at a particular proportion, mobility of the molecules is maintained even in a crosslinked structure, deformation and restoration of the microrelief structure can be adjusted, and as a result, high scratch resistance is manifested.

<Active Energy Ray-Curable Resin Composition>

The active energy ray-curable resin composition related to the present invention preferably includes a polymerizable component (Z) and a photopolymerization initiator (D) that are described below. Furthermore, the active energy ray-curable resin composition related to the present invention may optionally include other components such as an ultraviolet absorber and/or an oxidation inhibitor (E).

According to the present specification, a radical polymerizable functional group means a (meth)acryloyl group, a vinyl group, or the like. Furthermore, a (meth)acryloyl group means an acryloyl group and/or a methacryloyl group. Also, (meth)acrylate means acrylate and/or methacrylate. Furthermore, active energy radiation means visible light, ultraviolet radiation, electron beam, plasma, heat rays (infrared radiation or the like), or the like.

(Polymerizable Component (Z))

The polymerizable component (Z) is a compound that is polymerizable, and includes a particular polyfunctional acrylate (A1), a particular polyfunctional acrylate (B1), and a particular bifunctional acrylate (C1). Furthermore, the polymerizable component (Z) may optionally include a monofunctional monomer (F) or another polymerizable component (excluding the polyfunctional acrylate (A1), polyfunctional acrylate (B1), bifunctional acrylate (C1) and monofunctional monomer (F)).

(Polyfunctional Acrylate (A1))

The polyfunctional acrylate (A1) is a compound that has three or more acryloyl groups in the molecule, with the molecular weight per group of the acryloyl groups being less than 110.

The molecular weight per group of the acryloyl groups is a value obtained by dividing the molecular weight of the polyfunctional acrylate (A1) by the number of acryloyl groups in one molecule.

For example, trimethylolpropane triacrylate, which is a representative trifunctional acrylate, has a molecular weight of 296 and a number of acryloyl groups is 3. Therefore, the molecular weight per group of the acryloyl groups is 98.67. Therefore, the molecular weight per group of the acryloyl group groups of trimethylolpropane triacrylate is less than 110.

When a polyfunctional acrylate having three or more acryloyl groups in the molecule and has a molecular weight per group of the acryloyl groups of less than 110 is used, the crosslinking density of the polymerizable component (Z) as a whole can be secured, and the elastic modulus or hardness of the cured product can be enhanced.

The molecular weight per group of the acryloyl groups of the polyfunctional acrylate (A1) is less than 110, and is preferably less than 100. Furthermore, the molecular weight per group of the acryloyl groups of the polyfunctional acrylate (A1) is preferably 85 or more.

The polyfunctional acrylate (A1) may not be included in the polymerizable component (Z). Examples of the polyfunctional acrylate (A1) include pentaerythritol triacrylate, pentaerythritol tetraacrylate, dipentaerythritol pentaacrylate, dipentaerythritol hexaacrylate, trimethylolpropane triacrylate, and ditrimethylolpropane tetraacrylate. The polyfunctional acrylates (A1) may be used singly, or may used in combination of two or more kinds thereof.

The proportion of the polyfunctional acrylate (A1) included in the polymerizable component (Z) is 0 to 20% by mass when the entire amount of the polymerizable component (Z) is taken as 100% by mass, and the proportion is preferably 0 to 15% by mass, more preferably 0 to 10% by mass, and even more preferably 0 to 5% by mass. When the proportion of the polyfunctional acrylate (A1) is 20% by mass or less, the acrylic equivalent of the active energy ray-curable resin composition can be adjusted to a suitable range.

(Polyfunctional Acrylate (B1))

The polyfunctional acrylate (B1) is a compound that has three or more acryloyl groups in the molecule, with the molecular weight per group of the acryloyl groups being 110 or more.

Regarding the polyfunctional acrylate (B1), the acrylic equivalent of the active energy ray-curable resin composition can be adjusted to an appropriate range by the balance with the other components.

The molecular weight per group of the acryloyl groups of the polyfunctional acrylate (B1) is 110 or more, and preferably 150 or more. The molecular weight per group of the acryloyl groups of the polyfunctional acrylate (B1) is preferably 300 or less, and more preferably 200 or less. Also, the number of acryloyl groups in the molecule is preferably 3 or more, more preferably 4 or more, and even more preferably 5 or more.

Furthermore, when the polyfunctional acrylate (B1) has an oxyethylene group in the molecule, the amount of oxyethylene groups contained in the active energy ray-curable resin composition is easily adjusted to an appropriate range.

Examples of the polyfunctional acrylate (B1) include alkylene oxide-modified pentaerythritol triacrylate, alkylene oxide-modified isocyanuric acid triacrylate, alkylene oxide-modified glycerin triacrylate, alkylene oxide-modified pentaerythritol tetraacrylate, alkylene oxide-modified dipentaerythritol pentaacrylate, alkylene oxide-modified dipentaerythritol hexaacrylate, caprolactone-modified pentaerythritol triacrylate, caprolactone-modified isocyanuric acid triacrylate, caprolactone-modified glycerin triacrylate, caprolactone-modified pentaerythritol tetraacrylate, caprolactone-modified dipentaerythritol pentaacrylate, and caprolactone-modified dipentaerythritol hexaacrylate. Here, examples of the alkylene oxide modification include ethylene oxide modification and propylene oxide modification. Among them, ethylene oxide modification is preferred from the viewpoint of providing oxyethylene groups. The polyfunctional acrylates (B1) may be used singly, or two or more kinds thereof may be used in combination.

The proportion of the polyfunctional acrylate (B1) included in the polymerizable component (Z) is 15% by mass or more when the entire amount of the polymerizable component (Z) is taken as 100% by mass, and the proportion is preferably 25% by mass or more, more preferably 30% by mass or more, and even more preferably 35% by mass or more. Furthermore, the proportion is 75% by mass or less, preferably 65% by mass or less, more preferably 60% by mass or less, and even more preferably 55% by mass or less. When the proportion of the polyfunctional acrylate (B1) is 15% to 75% by mass, the acrylic equivalent of the active energy ray-curable resin composition and the proportion occupied by oxyethylene groups in a cured product of the resin composition can be adjusted to suitable ranges.

(Bifunctional Acrylate (C1))

The bifunctional acrylate (C1) is a compound that has two acryloyl groups in the molecule and contains a polyethylene glycol structure in which oxyethylene groups are aligned in the molecule.

The molecular weight of the polyethylene glycol structural moiety is 300 or more, and preferably 400 or more. Furthermore, if the molecular weight of the polyethylene glycol structural moiety is large, crystallization may occur, and handleability may b deteriorated. Therefore, the molecular weight of the polyethylene glycol structural moiety is preferably 1000 or less.

The proportion of the bifunctional acrylate (C1) included in the polymerizable component (Z) is 20% by mass or more when the entire amount of the polymerizable component (Z) is taken as 100% by mass, and the proportion is preferably 30% by mass or more, more preferably 35% by mass or more, and even more preferably 40% by mass or more. Furthermore, the proportion is 85% by mass or less, preferably 80% by mass or less, more preferably 75% by mass or less, and even more preferably 70% by mass or less. When the proportion of the bifunctional acrylate (C1) is 20% to 85% by mass, the acrylic equivalent of the active energy ray-curable resin composition and the proportion occupied by oxyethylene groups in the cured product can be adjusted to preferred ranges. Furthermore, the surface of the microrelief structure layer can be sufficiently hydrophilized, and thus oil stains such as fingerprints can be removed by wiping with a damp cloth.

(Monofunctional Monomer (F))

The monofunctional monomer (F) is a compound that has one radical polymerizable functional group in the molecule, and is copolymerizable with the polyfunctional acrylate (A1), polyfunctional acrylate (B1) and bifunctional acrylate (C1). The monofunctional monomer (F) is added to the polymerizable component (Z) as necessary.

Usually, the active energy ray-curable resin composition is less frequently cured alone, and as will be described below, the active energy ray-curable resin composition is used after being cured on a substrate to be integrated with the substrate. In order to enhance the adhesiveness between a light transmissive substrate and the cured product, a monofunctional monomer (F) having a small molecular weight and high penetrability to the light transmissive substrate can be added. Regarding the monofunctional monomer (F), a monomer that is appropriately added depending on the material of the light transmissive substrate, is selected.

Regarding the monofunctional monomer (F), a hydrophilic monomer is preferred from the viewpoint of the fingerprint wipeability of the cured product. A hydrophilic monomer is a monomer that can be dissolved in an amount of 1 g or more in 100 g of water at 25° C.

Examples of the monofunctional monomer (F) include alkyl(meth)acrylates(methyl(meth)acrylate, ethyl(meth) acrylate, n-butyl(meth)acrylate, i-butyl(meth)acrylate, t-butyl(meth)acrylate, 2-ethylhexyl(meth)acrylate, lauryl(meth) acrylate, and the like), benzyl(meth)acrylate, (meth) acrylates having an alicyclic structure (isobornyl(meth) acrylate, tetrahydrofurfuryl(meth)acrylate, adamantyl(meth) acrylate, dicyclopentanyl(meth)acrylate, dicyclopentenyl (meth)acrylate, and the like), (meth)acrylates having amino groups (dimethylaminoethyl(meth)acrylate, dimethylaminopropyl(meth)acrylate, and the like), (meth)acrylates having hydroxyl groups (hydroxyethyl(meth)acrylate, hydroxypropyl(meth)acrylate, and the like), (meth)acrylamide derivatives ((meth)acryloylmorpholine, N,N-dimethyl(meth)acrylamide, and the like), 2-vinylpyridine, 4-vinylpyridine, N-vinylpyrrolidone, N-vinylformamide, and vinyl acetate. The monofunctional monomers (F) may be used singly, or two or more kinds thereof may be used in combination.

Regarding the monofunctional monomer (F), a monomer that is not excessively bulky is preferred from the viewpoint of polymerization reactivity. Furthermore, from the viewpoint of antifouling properties, a monomer that is less hydrophobic is preferred. Specifically, preferred examples of the monofunctional monomer (F) include acryloylmorpholine, hydroxyethyl acrylate, N,N-dimethylacrylamide, N-vinylpyrrolidone, N-vinylformamide, methyl acrylate, and ethyl acrylate. When the material of the light transmissive substrate is an acrylic resin, the monofunctional monomer (F) is particularly preferably methyl acrylate or ethyl acrylate.

The proportion of the monofunctional monomer (F) that is included in the polymerizable component (Z) is preferably 0 to 15% by mass, more preferably 0 to 10% by mass, and even more preferably 0 to 5% by mass, when the entire amount of the polymerizable component (Z) is taken as 100% by mass. When the proportion of the monofunctional monomer (F) is 15% by mass or less, the adhesiveness to the substrate is enhanced, the active energy ray-curable resin composition is sufficiently cured, and a light transmissive article having on the surface a microrelief structure that has been completely cured is obtained. Furthermore, since unreacted monofunctional monomer (F) does not exist in the cured product, it can be prevented that unreacted monofunctional monomer (F) works as a plasticizer, lowers the elastic modulus of the cured product, and impairs scratch resistance.

(Other Polymerizable Components)

The polymerizable component (Z) may further include other polymerizable components in addition to the polyfunctional acrylate (A1), polyfunctional acrylate (B1), bifunctional acrylate (C1) and monofunctional monomer (F), to the extent that the effects of the present invention are not impaired. Examples of the other polymerizable components include a bifunctional or higher-functional monomer other than the polyfunctional acrylate (A1), polyfunctional acrylate (B1) and bifunctional acrylate (C1), and an oligomer or polymer having a radical polymerizable functional group.

Examples of the other polymerizable components include a urethane oligomer, a urethane acrylate, a polyester acrylate, an epoxy acrylate, and a vinyl ether. The other polymerizable components may be used singly, or two or more kinds thereof may be used in combination.

The proportion of the other polymerizable components included in the polymerizable component (Z) is preferably 30% by mass or less, more preferably 20% by mass or less, and even more preferably 10% by mass or less, when the entire amount of the polymerizable component (Z) is taken as 100% by mass.

(Photopolymerization Initiator (D))

A photopolymerization initiator (D) is a compound which is cleaved when irradiated with active energy radiation, and generates a radical that initiates a polymerization reaction. The active energy radiation is preferably ultraviolet radiation, from the viewpoints of the equipment cost and productivity.

Examples of the photopolymerization initiator (D) that generates a radical by means of ultraviolet radiation include benzophenone, 4,4-bis(diethylamino)benzophenone, 2,4,6-trimethylbenzophenone, methyl ortho-benzoylbenzoate, 4-phenylbenzophenone, t-butylanthraquinone, 2-ethylanthraquinone, thioxanthones (2,4-diethylthioxanthone, isopropylthioxanthone, 2,4-dichlorothioxanthone, and the like), acetophenones (diethoxyacetophenone, 2-hydroxy-2-methyl-1-phenylpropan-1-one, benzyl dimethyl ketal, 1-hydroxycyclohexyl phenyl ketone, 2-methyl-2-morpholino(4-thiomethylphenyl)propan-1-one, 2-benzyl-2-dimethylamino-1-(4-morpholinophenyl)-butanone, and the like), benzoin ethers (benzoin methyl ether, benzoin ethyl ether, benzoin isopropyl ether, benzoin isobutyl ether, and the like), acylphosphine oxides (2,4,6-trimethylbenzoyldiphenylphosphine oxide, bis(2,6-dimethoxybezoyl)-2,4,4-trimethylpentylphosphine oxide, bis(2,4,6-trimethylbenzoyl)-phenylphosphine oxide, and the like), methylbenzoyl formate, 1,7-bisacridinylheptane, and 9-phenylacridine. The photopolymerization initiators may be used singly, or two or more kinds thereof may be used in combination. When the photopolymerization initiators are used in combination, it is preferable to use two or more kinds having different absorption wavelengths in combination.

Furthermore, if necessary, thermal polymerization initiators such as persulfuric acid salts (potassium persulfate, ammonium persulfate, and the like), peroxides (benzoyl peroxide and the like), and azo-based initiators may also be used in combination.

The amount of incorporation of the photopolymerization initiator (D) is preferably 0.01 to 10 parts by mass, more preferably 0.1 to 5 parts by mass, and even more preferably 0.2 to 3 parts by mass, relative to 100 parts by mass of the entire amount of the polymerizable component (Z). When the proportion of the photopolymerization initiator (D) is 0.01 parts by mass or more, the active energy ray-curable resin composition is sufficiently cured, and a light transmissive article having sufficient mechanical properties is obtained. Furthermore, when the proportion of the photopolymerization initiator (D) is 10 parts by mass or less, since unreacted photopolymerization initiator (D) does not remain in the cured product, it can be prevented that residual photopolymerization initiator (D) works as a plasticizer, decreases the elastic modulus of the cured product, and thus impairs scratch resistance. Also, the occurrence of coloration can be suppressed.

(Ultraviolet Absorber and/or Oxidation Inhibitor (E))

The active energy ray-curable resin composition related to the present invention may also include an ultraviolet absorber and/or an oxidation inhibitor (E).

Examples of the ultraviolet absorber include benzophenone-based, benzotriazole-based, hindered amine-based, benzoate-based, and triazine-based ultraviolet absorbers. Examples of commercially available products include "TINUVIN 400" and "TINUVIN 479" manufactured by BASF SE, and "VIOSORB 110" manufactured by Kyodo Chemical Co., Ltd.

Examples of the oxidation inhibitor include hindered phenol-based, benzimidazole-based, phosphorus-based, sulfur-based, and hindered amine-based oxidation inhibitors. Examples of commercially available products include "IRGANOX" series manufactured by BASF SE.

These ultraviolet absorbers and/or oxidation inhibitors may be used singly, or two or more kinds thereof may be used in combination.

The amount of incorporation of the ultraviolet absorber and/or oxidation inhibitor (E) is preferably 0.01 to 5 parts by mass in total relative to 100 parts by mass of the total amount of the polymerizable component (Z).

(Other Components)

The active energy ray-curable resin composition related to the present invention may optionally include known additives such as a surfactant, a mold release agent, a lubricant, a plasticizer, an antistatic agent, a photostabilizer, a flame retardant, a flame retardant aid, a polymerization inhibitor, a filler, a silane coupling agent, a colorant, a reinforcing agent, an inorganic filler, and an impact resistance improving agent.

Furthermore, the active energy ray-curable resin composition related to the present invention may optionally include an oligomer or polymer that does not have a radical polymerizable functional group, a trace amount of an organic solvent, and the like.

It is preferable that the viscosity of the active energy ray-curable resin composition is not too high, from the viewpoint of the ease of flowing-in of the active energy ray-curable resin composition into the microrelief structure on the surface of a stamper. Specifically, the viscosity of the active energy ray-curable resin composition measured at 25° C. with a B type rotary viscometer is preferably 10,000 mPa·s or less, more preferably 5,000 mPa·s or less, and even more preferably 2,000 mPa·s or less.

However, even in a case in which the viscosity of the active energy ray-curable resin composition exceeds 10,000 mPa·s, there is no particular problem as long as the viscosity can be decreased by warming the resin composition in advance at the time of contact with the stamper. In this case, the viscosity of the active energy ray-curable resin composition measured at 70° C. with a B type rotary viscometer is preferably 5,000 mPa·s or less, and more preferably 2,000 mPa·s or less.

On the other hand, when the viscosity is 10 mPa·s or more, it is preferable because the resin composition does not wet and spread, and a light transmissive article can be efficiently produced.

The active energy ray-curable resin composition related to the present invention explained above exhibits high scratch resistance since the resin composition includes a particular polyfunctional acrylate (A1), a particular polyfunctional acrylate (B1) and a particular bifunctional acrylate (C1) at particular proportions. Furthermore, as the resin composition includes a particular bifunctional acrylate (C1) at a particular ratio, a cured product having satisfactory fingerprint wipeability can be obtained.

(Light Transmissive Article)

The light transmissive article related to the present invention includes a microrelief structure layer containing a cured product of an active energy ray-curable resin composition on at least one surface of a light transmissive substrate. The method for forming a microrelief structure of the light transmissive article related to the present invention is not particularly limited, but for example, the microrelief structure can be formed by bringing an active energy ray-curable resin composition into contact with a stamper having a reverse structure of the microrelief structure on the surface, and curing the resin composition.

FIG. 1 is a cross-sectional diagram illustrating an example of the light transmissive article related to the present invention. The light transmissive article 40 has a light transmissive substrate 42, and a microrelief structure layer 44 formed on the surface of the light transmissive substrate 42.

The light transmissive substrate 42 is preferably a molded body that transmits light. Examples of the material of the light transmissive substrate 42 include an acrylic resin (polymethyl methacrylate or the like), a polycarbonate, a styrene (co)polymer, a methyl methacrylate-styrene copolymer, cellulose diacetate, cellulose triacetate, cellulose acetate butyrate, a polyester (polyethylene terephthalate or the like), a polyamide, a polyimide, polyether sulfone, polysulfone, a polyolefin (polyethylene, polypropylene, or the like), polymethylpentene, polyvinyl chloride, polyvinyl acetal, polyether ketone, polyurethane, and glass. These materials may be used singly, or two or more kinds thereof may be used in combination.

The light transmissive substrate 42 may be an injection molded body, may be an extrusion molded body, or may be a cast molded body. The shape of the light transmissive substrate 42 may be a sheet shape, or may be a film shape. The surface of the light transmissive substrate 42 may have been subjected to a coating treatment, a corona treatment, or the like, in order to improve adhesiveness, antistatic properties, scratch resistance, weather resistance, and the like.

The microrelief structure layer 44 is a film containing a cured product of an active energy ray-curable resin composition, and has a microrelief structure on the surface.

In the case of forming a microrelief structure using a stamper of anodized alumina that will be described below, the microrelief structure on the surface of the light transmissive article 40 is formed by transferring the microrelief structure on the surface of the anodized alumina. Furthermore, the microrelief structure layer 44 has plural convexities 46 containing a cured product of an active energy ray-curable resin composition.

The shape of the convexity is preferably a shape in which the convexity cross-sectional area in a direction perpendicular to the height direction continuously increases in the depth direction from the outermost surface, that is, the cross-sectional shape in the height direction of the convexity is preferably a triangular shape, a trapezoidal shape, a bell shape, or the like.

The difference between the refractive index of the microrelief structure layer 44 and the refractive index of the light transmissive substrate 42 is preferably 0.2 or less, more preferably 0.1 or less, and even more preferably 0.05 or less. When the difference in the refractive index is 0.2 or less, reflection at the interface between the microrelief structure layer 44 and the light transmissive substrate 42 is suppressed.

(Stamper)

As described above, the microrelief structure of the microrelief structure layer related to the present invention can be formed by, for example, bringing an active energy ray-curable resin composition into contact with a stamper having a reverse structure of the microrelief structure on the surface, and curing the resin composition.

The stamper has a reverse structure of the microrelief structure on the surface. Examples of the material of the stamper include metals (including metals having oxide coating films formed on the surface), quartz, glass, resins, and ceramics. Examples of the shape of the stamper include a roll shape, a circular tube shape, a flat plate shape, and a sheet shape.

Examples of the method for producing a stamper include method (I-1) and method (I-2) described below. However, the method (I-1) is preferred from the viewpoint of enabling screen enlargement and convenient production.

(I-1) A method of forming anodized alumina having plural pores (concavities) on the surface of an aluminum substrate.

(I-2) A method of forming a reverse structure of a microrelief structure on the surface of a stamper substrate by an electron beam lithographic method, a laser light interference method or the like.

Regarding the method (I-1), a method including the following steps (a) to (f) is preferred:

(a) a step of anodizing an aluminum substrate in an electrolytic liquid at a constant voltage, and thereby forming an oxide coating film on the surface of the aluminum substrate;

(b) a step of removing the oxide coating film, and forming pore originating points of anodization on the surface of the aluminum substrate;

(c) a step of anodizing the aluminum substrate again in an electrolytic liquid after the step (b), and forming an oxide coating film having pores at the pore originating points;

(d) a step of enlarging the diameters of the pores after the step (c);

(e) a step of anodizing the aluminum substrate again in an electrolytic liquid after the step (d);

(f) a step of repeatedly carrying out the step (d) and step (e), and obtaining a stamper in which anodized alumina having plural pores has been formed on the surface of the aluminum substrate.

<Step (a)>

Figure 2:
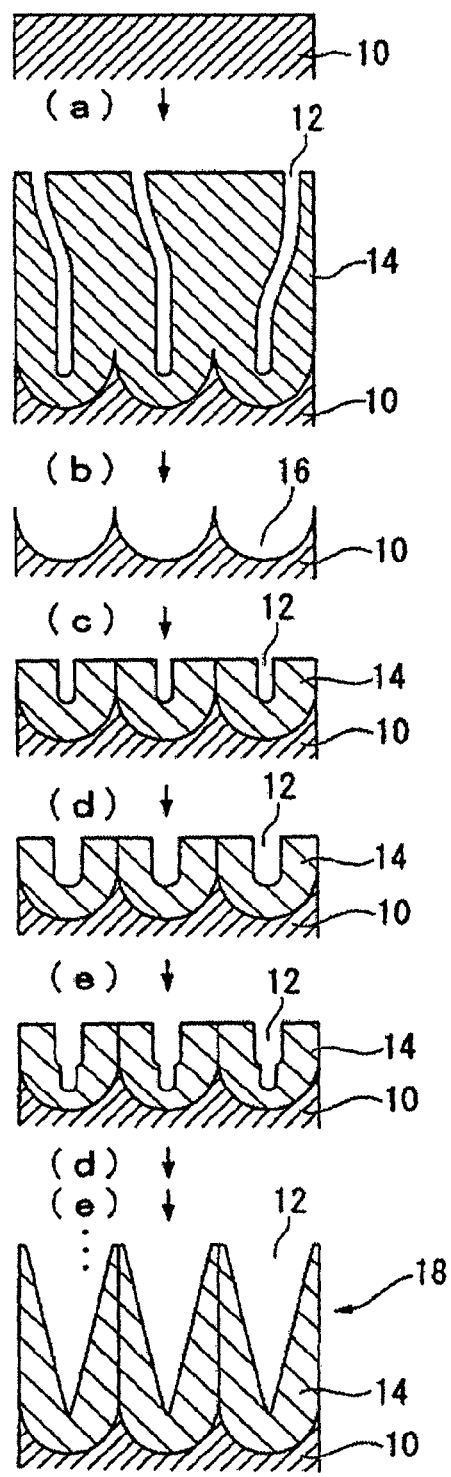
FIG. 2 is a cross-sectional diagram illustrating the production process for a stamper provided with an anodized alumina on the surface.

As illustrated in FIG. 2, an oxide coating film 14 having pores 12 is formed by anodizing an aluminum substrate 10.

Examples of the shape of the aluminum substrate include a roll shape, a circular tube shape, a flat plate shape, and a sheet shape. The aluminum substrate is preferably subjected to a degreasing treatment in advance, because the oil used at the time of processing into a predetermined shape may be adhering. Furthermore, the aluminum substrate is preferably subjected to an electrolytic polishing treatment (etching treatment) in order to make the surface state smooth. The purity of aluminum is preferably 99% or higher, more preferably 99.5% or higher, and even more preferably 99.8% or higher. If the purity of aluminum is low, when the aluminum substrate is anodized, a relief structure having a size that scatters visible light may be formed due to segregation of impurities, or the regularity of pores obtainable by anodization may be decreased.

Examples of the electrolytic liquid include sulfuric acid, oxalic acid, and phosphoric acid.

In the case of using oxalic acid as the electrolytic liquid:

The concentration of oxalic acid is preferably 0.8 M or lower. When the concentration of oxalic acid is 0.8 M or lower, an increase in the current value can be prevented, and roughening of the surface of the oxide coating film can be suppressed. When the formation voltage is 30 to 100 V, an anodized alumina having highly regular pores with a period of 100 nm to 200 nm can be obtained. The regularity tends to decrease if the formation voltage is higher or lower than this range. The temperature of the electrolytic liquid is preferably 60° C. or lower, and more preferably 45° C. or lower. When the temperature of the electrolytic liquid is 60° C. or lower, the occurrence of a phenomenon called "burning" can be prevented, and damage of pores, or disturbance of the regularity of pores caused by melting of the surface can be suppressed.

In the case of using sulfuric acid as the electrolytic liquid:

The concentration of sulfuric acid is preferably 0.7 M or lower. When the concentration of sulfuric acid is 0.7 M or lower, an increase in the current value can be prevented, and a static voltage can be maintained. When the formation voltage is 25 to 30 V, an anodized alumina having highly regular pores with a period of 63 nm can be obtained. The regularity tends to decrease if the formation voltage is higher or lower than this range. The temperature of the electrolytic liquid is preferably 30° C. or lower, and more preferably 20° C. or lower. When the temperature of the electrolytic liquid is 30° C. or lower, the occurrence of a phenomenon called "burning" can be prevented, and damage of pores, or disturbance of the regularity of pores caused by melting of the surface can be suppressed.

<Step (b)>

As illustrated in FIG. 2, the regularity of pores can be enhanced by first removing the oxide coating film 14, and using this as the pore originating points 16 of anodization. An example of the method of removing the oxide coating film 14 may be a method of removing the oxide coating film 14 by dissolving the oxide coating film 14 in a solution that is capable of selectively dissolving the oxide coating film 14 without dissolving aluminum. Examples of such a solution include a chromic acid/phosphoric acid mixed liquid.

<Step (c)>

As illustrated in FIG. 2, the aluminum substrate 10 from which the oxide coating film 14 has been removed, is anodized again, and thereby an oxide coating film 14 having cylindrical pores 12 is formed. The anodization can be carried out under the same conditions as those for the step (a). As the time for anodization is lengthened, deeper pores can be obtained.

<Step (d)>

As illustrated in FIG. 2, a treatment of expanding the diameters of the pores 12 (hereinafter, described as a pore diameter expansion treatment) is carried out. The pore diameter expansion treatment is a treatment of expanding the diameters of the pores obtained by anodization, by immersing the aluminum substrate in a solution capable of dissolving the oxide coating film 14. Examples of such a solution include an aqueous phosphoric acid solution having a concentration of about 5% by mass. As the time for the pore diameter expansion treatment is lengthened, the pore diameter is increased.

<Step (e)>

As illustrated in FIG. 2, when anodization is carried out again, pores 12 having a cylindrical shape with small diameters that extend further down from the bottoms of the cylindrical pores 12 are further formed. The anodization can be carried out under the same conditions as those for the step (a). As the time for anodization is lengthened, deeper pores can be obtained.

<Step (f)>

As illustrated in FIG. 2, an oxide coating film 14 having pores 12 that have a shape in which the diameter continuously decreased from the opening along the depth direction, is formed by repeating the pore diameter expansion treatment of step (d) and the anodization of step (e). Thereby, a stamper 18 having anodized alumina (a porous oxide coating film of aluminum (Alumite)) on the surface of the aluminum substrate 10 is obtained. The final step is preferably ended by step (d). The number of repetitions is preferably 3 times or more in total, and more preferably 5 times or more. When the number of repetitions is 3 times or more, the diameters of the pores are continuously decreased, and thus a moth-eye structure having a sufficient reflectance decreasing effect is obtained.

Examples of the shape of the pores 12 include an approximate conical shape, a pyramidal shape, and a cylindrical shape. A shape in which the pore cross-sectional area in a direction perpendicular to the depth direction continuously decreases from the outermost surface along the depth direction, as in the case of a conical shape or a pyramidal shape, is preferred.

The distance between the pores 12 is less than or equal to the wavelength of visible light, that is, 400 nm or less. The average distance between the pores 12 is 140 to 260 nm, preferably 150 to 240 nm, more preferably 155 nm to 220 nm, and even more preferably 160 nm to 200 nm. Meanwhile, the distance between the pores 12 is a value obtained by measuring the distance between adjacent pores 12 (distance from the center of a pore 12 to the center of an adjacent pore 12) at 50 sites using an electron microscope (trade name: JSM7400F, manufactured by JEOL, Ltd.), and averaging these values.

The depth of the pore 12 is preferably 120 to 250 nm, more preferably 150 to 220 nm, and even more preferably 180 to 190 nm. Meanwhile, the depth of the pore 12 is a value obtained by measuring the distance between the bottommost part of the pore 12 and the topmost part of the convexity existing between the pores 12 when observed by the electron microscopic observation at a magnification ratio of 30,000 times.

The aspect ratio of the pore 12 (depth of pore 12/distance between pores 12) is 0.7 to 1.4, preferably 0.8 to 1.3, more preferably 0.85 to 1.25, and even more preferably 0.9 to 1.2.

The surface of the stamper on the side where a microrelief structure is formed may be treated with a mold release agent. Examples of the mold release agent include a silicone resin, a fluororesin, a fluorine compound, and a phosphoric acid ester, and a phosphoric acid ester is preferred. The phosphoric acid ester is preferably a (poly)oxyalkylene alkyl phosphoric acid compound. Examples of commercially available products include JP-506H (trade name, manufactured by Johoku Chemical Co., Ltd.); MOLDWIZ INT-1856 (trade name, manufactured by Axel Plastics Research Laboratories, Inc.); TDP-10, TDP-8, TDP-6, TDP-2, DDP-10, DDP-8, DDP-6, DDP-4, DDP-2, TLP-4, TCP-5, and DLP-10 (all trade names, manufactured by Nikko Chemicals Co., Ltd.). The mold release agents may be used singly, or two or more kinds thereof may be used in combination.

(Method for Producing Light Transmissive Article)

Figure 3:
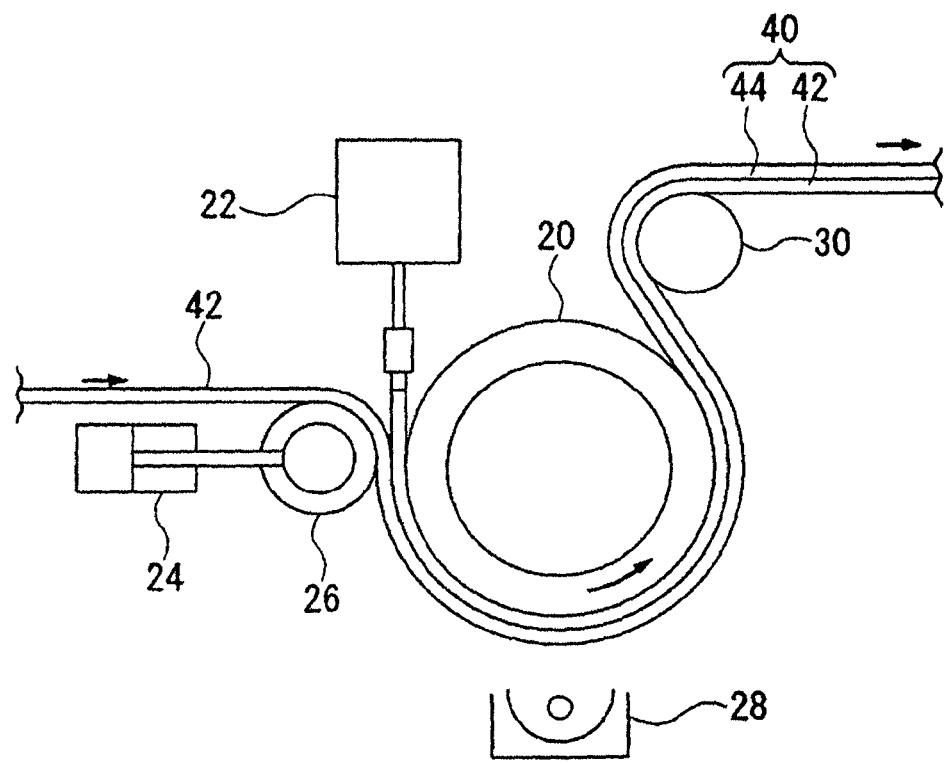
FIG. 3 is a cross-sectional diagram illustrating an example of a production apparatus of the article according to the present invention.

The light transmissive article including a microrelief structure layer related to the present invention is produced as follows, for example, using the production apparatus illustrated in FIG. 3.

An active energy ray-curable resin composition is supplied from a tank 22 through between a roll-shaped stamper 20 having a reverse structure of a microrelief structure (not shown in the diagram) on the surface and a light transmissive substrate 42, which is a band-shaped film that moves along the surface of the roll-shaped stamper 20.

The light transmissive substrate 42 and the active energy ray-curable resin composition are nipped between the roll-shaped stamper 20 and a nip roll 26 for which the nip pressure has been adjusted by a pneumatic cylinder 24. Thereby, the active energy ray-curable resin composition is widely spread uniformly between the light transmissive substrate 42 and the roll-shaped stamper 20, and is also filled inside the concavities of the microrelief structure of the roll-shaped stamper 20.

The active energy ray-curable resin composition is irradiated with active energy radiation from an active energy ray irradiation apparatus 28 installed below the roll-shaped stamper 20, through the light transmissive substrate 42, and thus the active energy ray-curable resin composition is cured. Thereby, a microrelief structure layer 44 onto which the microrelief structure of the surface of the roll-shaped stamper 20 has been transferred, is formed.

When the light transmissive substrate 42 having the microrelief structure layer 44 formed on the surface is peeled off from the roll-shaped stamper 20 using a peeling roll 30, the light transmissive article 40 illustrated in FIG. 1 is obtained.

The active energy ray irradiation apparatus 28 is preferably a high pressure mercury lamp, a metal halide lamp, or the like. The amount of light irradiation energy is preferably 100 to 10,000 mJ/cm$^2$.

Regarding the light transmissive substrate 42, a light transmissive film can be used. Examples of the light transmissive film include an acrylic resin, a polycarbonate, a styrene-based resin, a polyester, a cellulose-based resin (triacetyl cellulose or the like), a polyolefin, and an alicyclic polyolefin. These materials may be used singly, or two or more kinds thereof may be used in combination.

(Applications)

The light transmissive article related to the present invention can be expected to be used in applications such as an antireflective article (an antireflective film, an antireflective film, or the like), an optical article (an optical waveguide, a relief hologram, a lens, a polarization separation element, or the like), or a cell culture sheet. Among these, the light transmissive article related to the present invention is particularly adequate for the use as an antireflective article.

Examples of the antireflective article include an antireflective coating, an antireflective film, an antireflective sheet and the like provided on the surface of an image display apparatus (a liquid crystal display apparatus, a plasma display panel, an electroluminescent display, a cathode ray tube display apparatus, or the like), a lens, a show window, eyeglasses, and the like. In the case of using an antireflective article in an image display apparatus, the antireflective film may be attached directly on the image display surface, an antireflective film may be formed directly on the surface of a member that constitutes an image display surface, or an antireflective film may be formed on the front surface plate.

Since the light transmissive article related to the present invention explained above includes a particular microrelief structure layer, the microrelief structure layer has high scratch resistance and satisfactory fingerprint wipeability.

Second Exemplary Embodiment

It is highly likely that making the protrusions of the microrelief structure layer not easily breakable, and making the cured product not easily shavable or hollowable are in a mutual trade-off relationship. For the design of a resin that combines these two contradictory characteristics, molecular design of the monomers used is important.

The inventors of the present invention found that a microrelief structure having excellent scratch resistance is obtained by using a monomer having many oxyethylene groups ($—CH_2CH_2O—$) in the molecule, and thus continued the investigation on polyethylene glycol di(meth)acrylate. Then, the inventors found that a polyethylene glycol di(meth)acrylate in which the average molecular weight of the polyethylene glycol chain in the molecule is about 300 to 1,000 (the number of moles of ethylene oxide is about 7 to 23) is preferable from the viewpoint of scratch resistance.

Furthermore, the inventors of the present invention conducted thorough investigations, and as a result, the inventors succeeded in imparting high scratch resistance that is conventionally not observable in microrelief structures, by using a polyfunctional (meth)acrylate (A2) that has three or more (meth)acryloyl groups in the molecule, with the average number of oxyethylene groups per group of the relevant (meth)acryloyl groups being 5 or more, as a polymerizable component (Z) in the active energy ray-curable resin composition. Thus, the inventors completed the present invention.

That is, the present invention relates to a light transmissive article including a microrelief structure layer containing a cured product of an active energy ray-curable resin composition on at least one surface of a light transmissive substrate, characterized in that the active energy ray-curable resin composition includes a polymerizable component (Z) including a polyfunctional (meth)acrylate (A2) having three or more (meth)acryloyl groups in the molecule, with the average value of the number of oxyethylene groups per group of the relevant (meth)acryloyl groups being 5 or more, and includes a photopolymerization initiator (D).

According to the present invention, it was succeeded in achieving a balance between prevention of breakage of protrusions by imparting flexibility to the microrelief structure, and prevention of the cured product itself from being significantly destroyed when subjected to friction, by optimizing the number of functional groups of the (meth) acrylate (A2) and the number of moles of ethylene oxide modification per group of the (meth)acryloyl groups. Furthermore, since the average value of the number of oxyethylene groups per (meth)acryloyl group is large, the microrelief structure surface can be sufficiently hydrophilized, and oil stains such as fingerprints can be removed by wiping with a damp cloth.

Therefore, according to the present invention, a light transmissive article including a microrelief structure layer having high scratch resistance and satisfactory fingerprint wipeability can be provided.

<Active Energy Ray-Curable Resin Composition>

The active energy ray-curable resin composition is a resin composition that undergoes a polymerization reaction and cures when irradiated with active energy radiation. The active energy ray-curable resin composition used in the present invention is characterized by including a particular polymerizable component (Z) and a particular photopolymerization initiator (D).

(Polymerizable Component (Z))

The polymerizable component (Z) used in the present invention includes a particular polyfunctional (meth)acrylate (A2) as an essential component, and may optionally include a particular polyfunctional (meth)acrylate (B2), a particular bifunctional (meth)acrylate (C), a monofunctional monomer (F), and other polymerizable components. Meanwhile, according to the present invention, (meth)acrylate means acrylate and/or methacrylate.

(Polyfunctional (Meth)Acrylate (A2))

The polyfunctional (meth)acrylate (A2) used in the present invention is a compound having three or more (meth) acryloyl group in the molecule, with the average value of the number of oxyethylene groups per group of the (meth) acryloyl groups being 5 or more. Meanwhile, a (meth) acryloyl group according to the present invention means an acryloyl group and/or a methacryloyl group.

When the polyfunctional (meth)acrylate (A2) has three or more (meth)acryloyl groups in the molecule, it can be prevented that the cured product itself is deeply hollowed out and destroyed when subjected to friction.

From the viewpoint of further enhancing scratch resistance, the number of the (meth)acryloyl groups of the polyfunctional (meth)acrylate (A2) is preferably 4 or more. However, when the number of (meth)acryloyl groups increases, the viscosity of the polyfunctional (meth)acrylate (A2) tends to increase. Therefore, when it is required that the viscosity of the active energy ray-curable resin be low, the number of the (meth)acryloyl groups thereof is preferably 9 or less, and more preferably 6 or less.

When the average value of the number of oxyethylene groups per group of the (meth)acryloyl groups of the polyfunctional (meth)acrylate (A2) is 5 or more, sufficient flexibility can be imparted to the microrelief structure. Furthermore, when the average value is 16 or less, there is no chance that crystallinity of the repeating moiety of the oxyethylene group increases so high that the polyfunctional (meth)acrylate (A2) becomes wax-like or solid, satisfactory handleability as a liquid is obtained, which is preferable. Therefore, the average value of the number of oxyethylene groups per group of the (meth)acryloyl groups of the polyfunctional (meth)acrylate (A2) is preferably 5 to 16, more preferably 7 to 14, and particularly preferably 8.37 to 14.

The average value of the number of oxyethylene groups per group of the (meth)acryloyl groups of the polyfunctional (meth)acrylate (A2) is representatively the average value of the number of oxyethylene groups (number of repeating units) in the polyoxyethylene chain that is bonded to a (meth)acryloyl group.

Furthermore, an oxypropylene group, an oxybutylene group or the like may also be added as a copolymerizable component in the middle of repetition of the oxyethylene group. In this case, an improvement of crystallinity or the like can be expected. However, since an oxypropylene group or an oxybutylene group has a methyl group, these groups tend to inhibit hydrophilicity. Therefore, a compound which does not contain an oxypropylene group or an oxybutylene group but contains only an oxyethylene group is superior.

When the polyfunctional (meth)acrylate (A2) has a structure in which oxyethylene groups lie in a row, the polyfunctional (meth)acrylate (A2) can be represented by the following general formula (1):

[Chemical Formula 2]

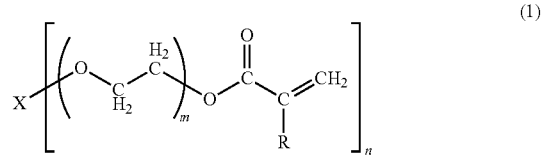

wherein X represents an organic residue; R represents a hydrogen atom or a methyl group; m≥5; and n≥3.

In formula (1), X represents an organic residue, and is not particularly limited in the present invention. Representative examples of X include a residue obtainable when the hydroxyl group moieties of an alcohol compound having three or more hydroxyl groups have been modified, and a residue obtainable when the isocyanate group moieties of a polyisocyanate compound having three or more isocyanate groups have been modified. m corresponds to the average value of the number of oxyethylene groups per group of the (meth)acryloyl groups of the polyfunctional (meth)acrylate (A2). m is 5 or larger, preferably 5 to 16, more preferably 7 to 14, and particularly preferably 8.37 to 14. n corresponds to the number of the (meth)acryloyl groups in the polyfunctional (meth)acrylate (A2). n is 3 or larger, and is preferably 4 or larger from the viewpoint of enhancing scratch resistance. On the other hand, when a decrease in viscosity of the active energy ray-curable resin composition is required, n is preferably 9 or less, and more preferably 6 or less.

The polyfunctional (meth)acrylate (A2) is obtained by, for example, modifying an alcohol compound having three or more hydroxyl groups with ethylene oxide, and converting the resultant product to a (meth)acryl ester. Examples of the alcohol compound having three or more hydroxyl groups include pentaerythritol, dipentaerythritol, tripentaerythritol, polypentaerythritol, glycerin, diglycerin, polyglycerin, trimethylolpropane, ditrimethylolpropane, sorbitol, and polyvinyl alcohol.

Furthermore, the polyfunctional (meth)acrylate (A2) is obtained by, for example, allowing a polyethylene glycol mono(meth)acrylate having a hydroxyl group on one end to react with a polyisocyanate compound having three or more isocyanate groups. The polyfunctional (meth)acrylate (A2) in this case is a polyfunctional urethane (meth)acrylate.

Examples of the polyethylene glycol mono(meth)acrylate having a hydroxyl group on one end include polyethylene (number of EO repetitions≈10) monoacrylate (manufactured by NOF Corp., product name: BLENMER series: AE-400). Examples of the polyisocyanate compound having three or more isocyanate groups include biuret of hexamethylene diisocyanate (manufactured by Asahi Kasei Chemicals Corp., product name: DURANATE series: 24A-100), isocyanurate of hexamethylene diisocyanate (TPA-100 of the same series), and adduct of hexamethylene diisocyanate (P301-75E of the same series). Meanwhile, "EO" is the abbreviation for ethylene oxide.

Examples of the commercially available products that can be used as the polyfunctional (meth)acrylate (A2) include product name: NK series: AT-20E (trimethylolpropane EO-modified (20 mol) triacrylate), A-GLY-20E (glycerin EO-modified (20 mol) triacrylate), ATM-35E (pentaerythritol EO-modified (35 mol) tetraacrylate), and A-PG5054E (polyglycerin (heptamer) EO-modified (54 mol) polyacrylate (nonafunctional)), all manufactured by Shin Nakamura Chemical Co., Ltd.

Further examples thereof include product name: T-200EA (trimethylolpropane EO-modified (45 mol) triacrylate) and S-130EA (sorbitol EO-modified (30 mol) hexaacrylate), all manufactured by Toho Chemical Industry Co., Ltd.

Further examples thereof include product name: DPEA-30 (dipentaerythritol EO-modified (30 mol) hexaacrylate), DPEA-36 (dipentaerythritol EO-modified (36 mol) hexaacrylate), DPEA-42 (dipentaerythritol EO-modified (42 mol) hexaacrylate), DPEA-48 (dipentaerythritol EO-modified (48 mol) hexaacrylate), DPEA-54 (dipentaerythritol EO-modified (54 mol) hexaacrylate), PETA-32 (pentaerythritol EO-modified (32 mol) tetraacrylate), PETA-36 (pentaerythritol EO-modified (36 mol) tetraacrylate), PETA-40 (pentaerythritol EO-modified (40 mol) tetraacrylate), PETA-48 (pentaerythritol EO-modified (48 mol) tetraacrylate), and PETA-56 (pentaerythritol EO-modified (56 mol) tetraacrylate), all manufactured by Dai-ichi Kogyo Seiyaku Co., Ltd.

Among the compounds described above, the polyfunctional (meth)acrylate (A2) is particularly preferably one or more kinds selected from the group consisting of (poly) pentaerythritol, (poly)glycerin, and ethylene oxide-modified (poly)(meth)acrylate of (di)trimethylolpropane.

The polyfunctional (meth)acrylate (A2) may be used singly, or two or more kinds thereof may be used in combination.

The proportion of the polyfunctional (meth)acrylate (A2) is preferably 25 to 100% by mass, more preferably 50 to 90% by mass, and particularly preferably 60 to 86% by mass, relative to 100% by mass of the polymerizable component (Z). The lower limit values of these ranges are meaningful in view of scratch resistance.

(Polyfunctional (Meth)Acrylate (B2))

The polyfunctional (meth)acrylate (B2) that is optionally used in the present invention is a polyfunctional (meth) acrylate having three or more (meth)acryloyl groups in the molecule, with the average value of the number of oxyethylene groups per group of the (meth)acryloyl groups thereof being less than 5.

The main purpose of using the polyfunctional (meth) acrylate (B2) lies in adjusting the (meth)acrylic equivalent of the active energy ray-curable resin composition to an optimal range. Specifically, the (meth)acrylic equivalent is adjusted to an optimal range by combining a polyfunctional (meth)acrylate having a large (meth)acrylic equivalent (A2) and a polyfunctional (meth)acrylate having a small (meth) acrylic equivalent (B2). Since a combination of a large amount of the polyfunctional (meth)acrylate (A2) gives a microrelief structure having superior scratch resistance, a smaller (meth)acrylic equivalent is preferred so that the amount of addition of the polyfunctional (meth)acrylate (B2) becomes smaller.

For that reason, the polyfunctional (meth)acrylate (B2) is such that the (meth)acrylic equivalent is preferably 320 [g/eq] or less, more preferably 200 [g/eq] or less, and even more preferably 150 [g/eq] or less.

Specific examples of the polyfunctional (meth)acrylate (B2) include pentaerythritol (tri)tetraacrylate, dipentaerythritol (penta)hexaacrylate, tripentaerythritol polyacrylate, polypentaerythritol polyacrylate, glycerin triacrylate, diglycerin tetraacrylate, polyglycerin polyacrylate, trimethylolpropane triacrylate, ditrimethylolpropane tetraacrylate, sorbitol hexaacrylate, and isocyanuric acid EO-modified triacrylate. Further examples thereof include alkylene oxide modification products and caprolactone modification products of these compounds. Further examples thereof include urethane acrylates synthesized by allowing those compounds having hydroxyl groups among these compounds (for example, pentaerythritol triacrylate and dipentaerythritol pentaacrylate) to react with isocyanate compounds such as hexamethylene diisocyanate and isophorone diisocyanate.

Among them, pentaerythritol (tri)tetraacrylate, dipentaerythritol (penta)hexaacrylate, and tripentaerythritol polyacrylate are preferred since their acrylic equivalents are particularly small.

Examples of commercially available products that can be used as the polyfunctional (meth)acrylate (B2) include product name ARONIX series: M-309, M-310, M-321, M-350, M-360, M-313, M-315, M-327, M-306, M-305, M-451, M-450, M-408, M-403, M-400, M-402, M-404, M-406, and M-405, all manufactured by Toagosei Co., Ltd.

Further examples thereof include product name NK series: A-9300, A-4300-1CL, A-GLY-9E, A-TMM-3, A-TMM-3L, A-TMM-3LM-N, A-TMPT, AD-TMP, A-TMMT, A-9550, A-DPH, A-PG5009E, and A-PG5027E, all manufactured by Shin Nakamura Chemical Co., Ltd.

Further examples thereof include product name VIS-COAT series: V#295, V#300, V#400, V#360, V#3PA, V#3PMA, V#802, V#1000, V#1020, and STAR-501, all manufactured by Osaka Organic Chemical Industry, Ltd.

Further examples thereof include product name KAY-ARAD series: GPO-303, TMPTA, THE-330, TPA-330, PET-30, T-1420(T), RP-1040, DPHA, DPEA-12, DPHA-2C, D-310, DPCA-20, and DPCA-60, all manufactured by Nippon Kayaku Co., Ltd.

Further examples thereof include product name UA-306H, UA-306T, UA-306I, and UA-510H, all manufactured by Kyoeisha Chemical Co., Ltd.

The polyfunctional monomer (B2) may be used singly, or two or more kinds thereof may be used in combination.

The proportion of the polyfunctional (meth)acrylate (B2) is preferably 0 to 75% by mass, more preferably 5 to 40% by mass, and particularly preferably 10 to 30% by mass, relative to 100% by mass of the polymerizable component (Z). When the proportion of the polyfunctional (meth)acrylate (B2) is 0 to 75% by mass, the acrylic equivalent of the active energy ray-curable resin composition can be adjusted to a suitable range.

(Bifunctional (Meth)Acrylate (C))

The bifunctional acrylate (C) that is optionally used in the present invention is a compound having two (meth)acryloyl groups in the molecule, and having a polyethylene glycol structure in which oxyethylene groups lie in a row in the molecule.

The average value of the number of oxyethylene groups per group of the (meth)acryloyl groups of the bifunctional (meth)acrylate (C) is preferably 4 to 12, and more preferably 5 to 8. When this is expressed as the average molecular weight of the polyethylene glycol structural moiety, the average molecular weight is preferably from 350 to 1000, and more preferably from 400 to 700. When the molecular weight of the polyethylene glycol structural moiety is small, the cured product becomes brittle, and scratch resistance of the microrelief structure is decreased. Therefore, the average molecular weight is preferably 350 or more. Also, when the molecular weight is large, the material is crystallized, and handleability is deteriorated. Therefore, the average molecular weight of the polyethylene glycol moiety is preferably 1000 or less.

Examples of commercially available products that can be used as the bifunctional (meth)acrylate (C) include product name NK series: A-400, A-600, and A-1000 manufactured by Shin Nakamura Chemical Co., Ltd. Further examples thereof include product name NEW FRONTIER series: PE-400 and PE-600 manufactured by Dai-ichi Kogyo Seiyaku Co., Ltd. The bifunctional monomer (C) may be used singly, or two or more kinds thereof may be used in combination.

The proportion of the bifunctional (meth)acrylate (C) is preferably 0 to 50% by mass, and more preferably 0 to 35% by mass, relative to 100% by mass of the polymerizable component (Z). The bifunctional (meth)acrylate (C) can be added to the extent that the bifunctional (meth)acrylate (C) does not inhibit the scratch resistance that is exhibited by the polyfunctional (meth)acrylate (A2). Therefore, a smaller amount of addition is preferred from the viewpoint of scratch resistance. The bifunctional (meth)acrylate (C) exhibits effects such as adjustment of the viscosity of the active energy ray-curable resin composition, securement of the compatibility with additives and the like, impartation of adhesiveness to the substrate film, and impartation of hydrophilicity. When hydrophilicity is imparted, oil stains such as fingerprints can be removed by wiping with a damp cloth.

(Monofunctional Monomer (F))

As the monofunctional monomer (F), the same compound as the monofunctional monomer (F) used in the first exemplary embodiment can be used in the same amount of incorporation.

(Other Polymerizable Components)

As the other polymerizable components, the same compounds as the other polymerizable components used in the first exemplary embodiment can be used.

(Photopolymerization Initiator (D))

As the photopolymerization initiator (D), the same compounds as the photopolymerization initiator (D) used in the first exemplary embodiment can be used.

(Ultraviolet Absorber and/or Oxidation Inhibitor (E))

As the ultraviolet absorber and/or oxidation inhibitor (E), the same compounds as the ultraviolet absorber and/or oxidation inhibitor (E) used in the first exemplary embodiment can be used.

(Other Components)

The active energy ray-curable resin composition may also include known additives such as a surfactant, a mold release agent, a lubricant, a plasticizer, an antistatic agent, a photostabilizer, a flame retardant, a flame retardant aid, a polymerization inhibitor, a filler, a silane coupling agent, a colorant, a reinforcing agent, an inorganic filler, and an impact resistance modifying agent, as necessary.

Furthermore, the active energy ray-curable resin composition of the present invention may also include an oligomer or polymer that does not have a radical polymerizable functional group, a trace amount of an organic solvent, and the like, as necessary.

Since the active energy ray-curable resin composition that constitutes the present invention described above includes a polyfunctional (meth)acrylate (A2), the resin composition has high scratch resistance. Furthermore, when the active energy ray-curable resin composition includes a bifunctional (meth)acrylate (C) at a particular proportion, a cured product having more satisfactory fingerprint wipeability can be formed.

Regarding the active energy ray-curable resin composition, hardness of the cured product can be adjusted to an appropriate range by adjusting the acrylic equivalent of the resin composition.

The acrylic equivalent is a numerical value represented by the molecular weight per (meth)acryloyl group. As the acrylic equivalent is smaller, the concentration of the (meth)acryloyl groups is increased, and a cured product having a high crosslinking density is obtained. On the contrary, as the acrylic equivalent is larger, the concentration of the (meth)acryloyl groups is decreased, and a cured product having a low crosslinking density is obtained.

The acrylic equivalent of the active energy ray-curable resin composition is represented by the following formula (1), by using the weight ratios [% by mass] of the various components: W1, W2, W3, . . . ; the molecular weights [g/mol] of the various components: M1, M2, M3, . . . ; and the number of functional groups of the various components: F1, F2, F3, . . . .

$$\text{Acrylic equivalent [g/eq]} = 1/(F1 \times W1/M1/100 + F2 \times W2/M2/100 + \dots) \quad \text{(Formula 1)}$$

The acrylic equivalent of the active energy ray-curable resin composition is preferably 220 [g/eq] or more, more preferably 220 to 320 [g/eq], and particularly preferably 230 to 300 [g/eq].

If the acrylic equivalent of the active energy ray-curable resin composition that forms a microrelief structure is too small, since the crosslinking density is high, protrusions become brittle and are likely to be breakable or shavable, and therefore, scratch resistance is decreased.

On the other hand, if the acrylic equivalent is too large, since the crosslinking density is low, the cured product itself becomes so soft that the cured product may be damaged by being significantly shaved off or hollowed out to a part where a microrelief structure does not exist, and thus scratch resistance is deteriorated. Alternatively, depending on the microrelief structure, protrusions (convexities) can be easily brought into contact with one another and be stuck together. When protrusions are stuck together, light may be scattered, and the surface may appear cloudy.

It is preferable that the viscosity of the active energy ray-curable resin composition is not excessively high, from the viewpoint of the ease of flowing into the microrelief structure on the surface of the stamper. Therefore, the viscosity of the active energy ray-curable resin composition as measured with a B type rotary viscometer at 25° C. is preferably 10,000 mPa·s or less, more preferably 5,000 mPa·s or less, and even more preferably 2,000 mPa·s or less.

However, even if the viscosity of the active energy ray-curable resin composition is more than 10,000 mPa·s, there is no particular problem as long as the viscosity can be decreased by heating the active energy ray-curable resin composition in advance at the time of contacting with the stamper. In this case, the viscosity of the active energy ray-curable resin composition as measured with a B type rotary viscometer at 70° C. is preferably 5,000 mPa·s or less, and more preferably 2,000 mPa·s or less.

If the viscosity is excessively low, the active energy ray-curable resin composition may be wet spread and cause a problem in the production. The viscosity is preferably 10 mPa·s or higher.

<Light Transmissive Article>

The light transmissive article of the present invention is a light transmissive article including a microrelief structure layer containing a cured product of an active energy ray-curable resin composition on at least one surface of a light transmissive substrate. The microrelief structure layer can be formed by, for example, bringing the active energy ray-curable resin composition into contact with a stamper having a reverse structure of the microrelief structure on the surface, and curing the resin composition.

FIG. 1 is a schematic cross-sectional diagram illustrating an example of the light transmissive article having a microrelief structure layer of the present invention. This light transmissive article 40 has a light transmissive substrate 42 and a microrelief structure layer 44 formed on the surface of the light transmissive substrate 42.

The light transmissive substrate 42 is preferably a molded body that transmits light. Regarding the material of the substrate, those materials described above in the first exemplary embodiment can be used.

The light transmissive substrate 42 may be an injection molded body, may be an extrusion molded body, or may be a cast molded body. The shape of the substrate 42 may be a sheet shape, or may be a film shape. The surface of the light transmissive substrate 42 may have been subjected to a coating treatment, a corona treatment, or the like, in order to improve adhesiveness, antistatic properties, scratch resistance, weather resistance, and the like.

The microrelief structure layer 44 is a film formed from a cured product of an active energy ray-curable resin composition, and has a microrelief structure on the surface.

The microrelief structure on the surface of the light transmissive article 40 in the case of using a stamper of anodized alumina that will be described below, is formed by transferring the microrelief structure on the surface of the anodized alumina, and has plural convexities 46 formed from a cured product of the active energy ray-curable resin composition.

The microrelief structure is preferably a so-called moth-eye structure, in which plural protrusions (convexities) having an approximately conical shape, a pyramidal shape or the like lie in a row. A moth-eye structure in which the distance between protrusions is less than or equal to the wavelength of visible light, is known to serve as an effective means for antireflection, as the refractive index increases continuously from the refractive index of air to the refractive index of the material. In order to achieve a balance between the antireflection performance and scratch resistance in this microrelief structure called a moth-eye structure, it is important to set the aspect ratio of the relief, which is a balance between the average distance between convexities and the height of the convexities (height of a convexity/average distance between convexities), to a particular range.

The average distance between convexities is preferably less than or equal to the wavelength of visible light, that is, 400 nm or less. If the average distance is larger than 400 nm, scattering of visible light occurs, and therefore, the microrelief structure is not suitable for optical applications such as an antireflective article. The average distance between convexities is more preferably 120 to 380 nm, particularly preferably 140 to 260 nm or less, and most preferably 160 nm to 200 nm.

The average distance between convexities is a value obtained by measuring the distance between adjacent convexities (distance between the center of a convexity to the center of an adjacent convexity) at 50 sites by electron microscopic observation, and averaging these values.

When the average distance between the convexities is in the preferred range described above, the antireflection performance is approximately determined by the height of protrusions (convexities). In order to obtain satisfactory antireflection performance, the average height of the convexities is preferably 100 to 300 nm, more preferably 120 to 250 nm, particularly preferably 150 to 220 nm, and most preferably 160 to 190 nm. When the height of the convexities is 100 nm or more, the reflectance is sufficiently decreased, while the wavelength dependency of the reflectance is small. When the height of the convexities is 300 nm or less, the phenomenon in which convexities and concavities are brought into contact and stuck together, can be easily suppressed.

The height of a convexity is a value obtained by measuring the distance between the topmost part of the convexity and the bottommost part of a concavity existing between convexities when observed by an electron microscope at a magnification ratio of 30,000 times.

The aspect ratio of a convexity (height of a convexity/average distance between convexities) is preferably 0.7 to 1.4, and more preferably 0.8 to 1.2. When the aspect ratio of a convexity is 0.7 or more, the reflectance is sufficiently lowered. When the aspect ratio of a convexity is 1.4 or less, scratch resistance of the convexity is improved.

The shape of the convexity is preferably a shape in which the convexity cross-sectional area in a direction perpendicular to the height direction continuously increases from the outermost surface along the depth direction, that is, a shape in which the cross-section shape in the height direction of the convexity is triangular, trapezoidal, or bell-shaped.

The difference between the refractive index of the microrelief structure layer 44 and the refractive index of the substrate 42 is preferably 0.2 or less, more preferably 0.1 or less, and particularly preferably 0.05 or less. When the difference in the refractive index is 0.2 or less, reflection at the interface between the microrelief structure layer 44 and the substrate 42 is suppressed.

(Stamper)

The stamper and the production method thereof may be the same as those of the first exemplary embodiment.

(Method for Producing Light Transmissive Article)

The method for producing a light transmissive article may be the same as that of the first exemplary embodiment.

(Applications)

The applications of the present invention may be the same as those of the first exemplary embodiment.

Third Exemplary Embodiment

The inventors of the present invention paid attention to the scratch resistance of a cured product derived from a crosslinked structure of a polyfunctional (meth)acrylic monomer having a (meth)acryloyl structure, and the flexibility of a cured product of a (meth)acrylic monomer having a polyalkylene glycol structure, and found that when a monomer having these two structures at a particular ratio is used, it is very effective in imparting scratch resistance and flexibility. Thus, the inventors completed the present invention.

That is, the present invention relates to a light transmissive article having a light transmissive substrate, and a microrelief structure layer formed from a cured product of an active energy ray-curable resin composition formed on at least one surface of the light transmissive substrate, in which the polymerizable compound contained in the active energy ray-curable resin composition includes a tetrafunctional or higher-functional (meth)acrylic monomer (A3) having a polyalkylene glycol percent content (PAG) in the (meth)acrylic monomer (A3) represented by the following formula (a) of from 50% to 87%:

$$PAG=M(PAG)/[M(ACR)+M(APG)] \times 100 \quad (a)$$

PAG: polyalkylene glycol percent content (%)

M(PAG): Total chemical formula weight of polyalkylene glycol structural moieties M(ACR): Total chemical formula weight of (meth)acryloyl structural moieties Furthermore, the present invention relates to an antireflective article using the light transmissive article.

According to the present invention, when a particular monomer having a (meth)acryloyl structure and a polyalkylene glycol structure at a particular ratio is used, a light transmissive article having a microrelief structure layer having excellent scratch resistance and antireflection performance can be provided. This light transmissive article has a low reflectance over the entire wavelength region of visible light, and exhibits excellent scratch resistance such that scratches do not occur even in a steel wool scratch test. Therefore, the light transmissive article is very useful as an antireflective article that requires the relevant performance, for example, in applications such as various displays, lenses and window materials.

The active energy ray-curable resin composition used in the present invention is a resin composition that undergoes a polymerization reaction and cures when irradiated with, for example, active energy radiation such as electron beam, ultraviolet radiation, or visible light. This active energy ray-curable resin composition is composed of a polymerizable compound having a radical polymerizable site such as a (meth)acryloyl group or a vinyl group, a polymerization initiator that initiates a polymerization reaction, and optionally auxiliary agents such as an organic solvent and a surfactant.

The polymerizable compound contained in the active energy ray-curable resin composition is a tetrafunctional or higher-functional (meth)acrylic monomer (A3) having one or more polyalkylene glycol structures in the molecule, and the polyalkylene glycol percentage content (PAG) in the (meth)acrylic monomer (A3) is from 50% to 87%.

Here, the polyalkylene glycol structure means a molecular structure (—R—O—)$_n$ [wherein n represents the average number of repetitions] formed from a repeating unit (—R—O—) [wherein R represents an alkylene group] of the molecular structure of alkylene glycol. The polyalkylene glycol structure (—R—O—)$_n$ may be a molecular structure in which plural repeating units of a single kind are connected, or may be a molecular structure in which repeating units of plural kinds are present in mixture and are connected. The average number of repetitions means, in a case in which plural polyalkylene glycol structures having different numbers of repetitions are present in one molecule, the average value obtainable by dividing the sum of the numbers of repetitions by the number of the polyalkylene glycol structures.

This (meth)acrylic monomer (A3) is a compound that has at least one or more (meth)acryloyl groups, and has four or more radical polymerizable sites such as (meth)acryloyl groups or vinyl groups in one molecule. Particularly, a compound in which all the polymerizable sites in the molecule are (meth)acryloyl groups, that is, a compound having four or more (meth)acryloyl groups, is preferred. Meanwhile, the "(meth)acryloyl group" means "acryloyl group and/or methacryloyl group", and "(meth)acrylate" means "acrylate and/or methacrylate".

The (meth)acrylic monomer (A3) is such that the PAG represented by the above formula (a) is from 50% to 87%. Furthermore, the PAG is preferably from 55% to 83%, and more preferably from 70% to 80%. When the PAG is adjusted to 50% or more, high scratch resistance can be exhibited. Also, when the PAG is 87% or less, the Martens hardness originating from the crosslinking density of a light transmissive article and the elastic modulus can be maintained at satisfactory levels, and clouding cause by a phenomenon in which protrusions of a relief structure draw close to one another is prevented, so that light transmission properties can be enhanced.

Regarding the (meth)acrylic monomer (A3), it is preferable to use a compound in which (meth)acryloyl groups are bonded to the hydroxyl group moieties of a polyol compound having 4 or more hydroxyl groups via polyalkylene glycol structures, that is, a so-called alkylene oxide-modified compound of a (meth)acrylic monomer. Furthermore, an alkylene oxide-modified compound of urethane(meth)acrylate, and an alkylene oxide-modified compound of an epoxy (meth)acrylate can also be used. The (meth)acrylic monomer (A3) may be used singly, or two or more kinds thereof may be used in combination. Particularly, from the viewpoint that adhering contaminants can be easily removed by wiping with a damp cloth, an ethylene oxide-modified compound (a compound having a polyethylene glycol structure) is preferred.

Regarding the unit of the molecular structure of alkylene glycol (—R—O—) of the (meth)acrylic monomer (A3), the number of repetitions is preferred from the viewpoint of imparting flexibility of the polyalkylene glycol structure.

From the viewpoint of achieving a balance between the crosslinking density and flexibility, the number of repetitions is preferably 2 to 4.

Suitable specific examples of a tetrafunctional (meth)acrylic monomer (A3) include an EO-modified compound, a PO-modified compound, an EO.PO-modified compound, and a butylene oxide-modified compound of pentaerythritol tetra(meth)acrylate; an EO-modified compound, a PO-modified compound, an EO.PO-modified compound, and a butylene oxide-modified compound of ditrimethylolpropane tetra(meth)acrylate. Suitable specific examples of a pentafunctional or higher-functional (meth)acrylic monomer (A3) include an EO-modified compound, a PO-modified compound, an EO.PO-modified compound, and a butylene oxide-modified compound of dipentaerythritol hexa(meth)acrylate. Meanwhile, "EO" means "ethylene oxide", and "PO" means "propylene oxide". Furthermore, the "EO-modified compound" means a compound having a block structure of an ethylene oxide unit $(-CH_2-CH_2-O-)_n$, and the "PO-modified compound" means a compound having a block structure of a propylene oxide unit $(-CH_2-CH(CH_3)-O-)_n$.

The (meth)acrylic monomer (A3) is particularly preferably a compound represented by the following formula (1) (an EO-modified compound of dipentaerythritol hexa(meth)acrylate):

[Chemical Formula 3]

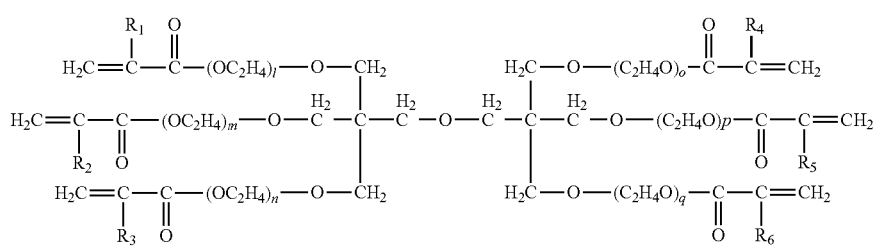

(1)

wherein in formula (1), $R_1$ to $R_6$ each represent H or $CH_3$; and l to q represent integers that satisfy the relationship: $12 \leq l+m+n+o+p+q \leq 48$;

and/or a compound represented by the following formula (2) (an EO-modified compound of pentaerythritol tetra(meth)acrylate):

[Chemical Formula 4]

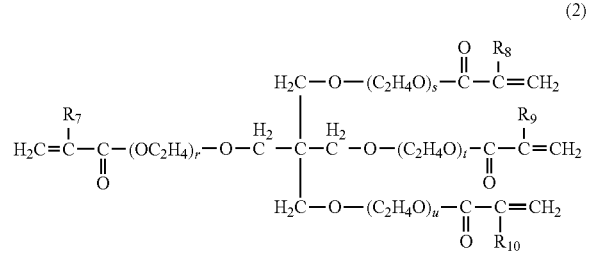

(2)

wherein in formula (2), $R_7$ to $R_{10}$ each represent H or $CH_3$; and r to u represent integers that satisfy the relationship: $8 \leq r+s+t+u \leq 32$.

It is preferable that the active energy ray-curable resin composition further includes, together with the (meth) acrylic monomer (A3) explained above, a trifunctional or higher-functional (meth)acrylic monomer (B3) other than the (meth)acrylic monomer (A3). When this (meth)acrylic monomer (B3) is used in combination, scratch resistance is further enhanced.

This (meth)acrylic monomer (B3) is a compound that has at least one or more (meth)acryloyl groups and has three or more radical polymerizable sites such as (meth)acryloyl groups or vinyl groups in one molecule, and is a compound other than the (meth)acrylic monomer (A3). Particularly, it is preferable that all the polymerizable sites in the molecule are (meth)acryloyl groups, that is, the compound has three or more (meth)acryloyl groups. Furthermore, a trifunctional to nonafunctional (meth)acrylic monomer is preferred.

Regarding the (meth)acrylic monomer (B3), it is preferable to use a (meth)acrylic monomer in which (meth)acryloyl groups are bonded to the hydroxyl group moieties of a polyol compound having three or more hydroxyl groups. Furthermore, a urethane(meth)acrylate or an epoxy (meth)acrylate can also be used. The (meth)acrylic monomer (B3) may be used singly, or two or more kinds thereof may be used in combination. Furthermore, an alkylene oxide-modified compound of a (meth)acrylic monomer can also be used. From the viewpoint of maintaining the Martens hardness that originates from the crosslinking density of a light transmissive article and the elastic modulus at satisfactory levels, and from the viewpoint of preventing clouding caused by a phenomenon in which protrusions of a relief structure are drawn closer to one another, and enhancing the light transmission properties, it is preferable that the unit (—R—O—) of the molecular structure of alkylene glycol of the (meth)acrylic monomer (B3) does not form a repeating structure, that is, the number of repetitions is 1. On the other hand, in view of imparting flexibility of the polyalkylene glycol structure, the average number of repetitions of the alkylene glycol structure of the (meth)acrylic monomer (B3) is preferably 5 or greater. The (meth)acrylic monomer (B3) may be used singly, or two or more kinds thereof may be used in combination.

Specific examples of a trifunctional (meth)acrylic monomer (B3) include trimethylolpropane tri(meth)acrylate, pentaerythritol tri(meth)acrylate, and isocyanuric acid tri(meth)acrylate. Specific examples of a tetrafunctional (meth)acrylic monomer (B3) include pentaerythritol tetra(meth)acrylate and ditrimethylolpropane tetra(meth)acrylate. Specific examples of a pentafunctional or higher-functional (meth)acrylic monomer (B3) include dipentaerythritol hexa(meth)acrylate. Also, it is acceptable to use urethane(meth)acrylate obtained by allowing a polyol compound to react with an isocyanate compound and a (meth)acrylate having hydroxyl groups. Furthermore, a mixture obtained by allowing trimethylolethane to react with succinic acid and acrylic acid at a molar ratio of 2/1/4, may also be used. Among others, trimethylolpropane tri(meth)acrylate, pentaerythritol tri(meth)acrylate, ditrimethylolpropane(meth)acrylate, dipentaerythritol hexa(meth)acrylate, and EO-modified compounds thereof are preferred from the viewpoint of polymerization reactivity.

The content of the (meth)acrylic monomer (A3) in 100 parts by mass of the polymerizable compounds included in the active energy ray-curable resin composition is preferably from 50 parts by mass to 100 parts by mass, more preferably from 50 parts by mass to 95 parts by mass, particularly preferably from 55 parts by mass to 80 parts by mass, and most preferably from 60 parts by mass to 75 parts by mass. When the content is 50 parts by mass or more, scratch resistance and transparency of the light transmissive article can be made satisfactory.

In the case of using the (meth)acrylic monomer (B3) in combination, the content of the (meth)acrylic monomer (B3) among 100 parts by mass of the polymerizable compounds included in the active energy ray-curable resin composition is preferably from 5 parts by mass to 50 parts by mass, more preferably from 20 parts by mass to 45 parts by mass, and particularly preferably from 25 parts by mass to 40 parts by mass. When the content is 5 parts by mass or more, a scratch resistance enhancing effect attributable to the hard coatability of the (meth)acrylic monomer (B3) itself, and flexibility of the polyalkylene glycol structure can be obtained. Furthermore, when the content is 50 parts by mass or less, toughness of the cured product is maintained, and detachment failure from the stamper caused by excessive increase of hardness, or deterioration of the reflectance caused by breakage of protrusions of the relief section can be prevented.

The polymerizable compounds included in the active energy ray-curable resin composition are substantially composed of the (meth)acrylic monomer (A3) described above, or of the (meth)acrylic monomer (A3) and the (meth)acrylic monomer (B3). Here, the term "substantially composed of" does not mean that the polymerizable compounds do not include components other than the (meth)acrylic monomer (A3) and/or (meth)acrylic monomer (B3) at all, but means that the polymerizable compounds may include other monomer components in an amount of about several parts by mass. It is preferable that the (meth)acrylic monomer (A3) is used alone, or only the two of the (meth)acrylic monomer (A3) and the (meth)acrylic monomer (B3) are used.

In the active energy ray-curable resin composition, a polymerization initiator that is cleaved when irradiated with active energy radiation and generates a radical capable of initiating a polymerization reaction, is usually added. Examples of the active energy radiation include electron beam, ultraviolet radiation, and visible light. Ultraviolet radiation is generally used from the viewpoints of equipment cost and productivity.

There are no particular limitations on the kind of this polymerization initiator. Specific examples thereof include benzophenone, 4,4-bis(diethylamino)benzophenone, 2,4,6-trimethylbenzophenone, methyl ortho-benzoylbenzoate, 4-phenylbenzophenone, t-butylanthraquinone, 2-ethylanthraquinone; thioxanthones such as 2,4-diethyl thioxanthone, isopropyl thioxanthone, and 2,4-dichlorothioxanthone; acetophenones such as diethoxyacetophenone, 2-hydroxy-2-methyl-1-phenylpropan-1-one, benzyl dimethyl ketal, 1-hydroxycyclohexyl phenyl ketone, 2-methyl-2-morpholino(4-thiomethylphenyl)propan-1-one, and 2-benzyl-2-dimethylamino-1-(4-morpholinophenyl)-butanone; benzoin ethers such as benzoin methyl ether, benzoin ethyl ether, benzoin isopropyl ether, and benzoin isobutyl ether; acyl phosphine oxides such as 2,4,6-trimethylbenzoyldiphenylphosphine oxide, bis(2,6-dimethoxybenzoyl)-2,4,4-trimethylpentylphosphine oxide, and bis(2,4-6-trimethylbenzoyl)-phenylphosphine oxide; methylbenzoyl formate, 1,7-bisacridinylheptane, and 9-phenylacridine.

The polymerization initiator may be used singly, or two or more kinds thereof may be used in combination. Particularly, it is preferable to use two or more kinds having different absorption wavelengths in combination. Also, if necessary, thermal polymerization initiators including persulfates such as potassium persulfate and ammonium persulfate; peroxides such as benzoyl peroxide; and azo-based initiators may be used in combination.

The proportion of the polymerization initiator is preferably from 0.01 parts by mass to 10 parts by mass, more preferably from 0.1 parts by mass to 5 parts by mass, and particularly preferably from 0.2 parts by mass to 3 parts by mass, relative to 100 parts by mass of the polymerizable compounds. When the proportion is 0.01 parts by mass or more, curability of the resin composition, and the mechanical properties of the cured product attributable to the curability can be made satisfactory. When the proportion is 10 parts by mass or less, the influence of residual unreacted initiator on the elastic modulus and scratch resistance of the cured product, or coloration can be prevented.

In the active energy ray-curable resin composition, known additives such as a mold release agent, a lubricant, a plasticizer, an oxidation inhibitor, an antistatic agent, a photostabilizer, an ultraviolet absorber, a flame retardant, a flame retardant aid, a polymerization inhibitor, a filler, a silane coupling agent, a colorant, a reinforcing agent, an inorganic filler, and an impact resistance improving agent, may be incorporated.

There are no particular limitations on the mixing conditions at the time of mixing the polymerizable compounds, the polymerization initiator, and optionally the additives. For example, the stirring time may be from 1 hour to 10 hours, and the stirring temperature may be from room temperature to 80° C.

The Martens hardness of the microrelief structure of the light transmissive article of the present invention is preferably 15 N/mm$^2$ or higher, more preferably 20 N/mm$^2$ or higher, and even more preferably 30 N/mm$^2$ or higher. When the Martens hardness is 15 N/mm$^2$ or higher, the phenomenon in which protrusions of the microrelief structure draw close to one another, does not easily occur, and therefore, whitening or clouding does not appear at the surface of the light transmissive article.

The light transmissive article of the present invention is preferably such that the number of scratches generated when a scratch resistance test is carried out by rubbing the light transmissive article for 10 reciprocations under the conditions of applying a load of 25 gf/cm$^2$ using an indenter which measures 20 mm on each side and steel wool #0000 in an environment at a temperature of 23° C. and a humidity of 50% RH, is 0 to 10. When the number of scratches is in this range, the light transmissive article can have sufficient scratch resistance.

The light transmissive article of the present invention is a product in which a microrelief structure layer formed from a cured product of the active energy ray-curable resin composition explained above, is formed on at least one surface of a light transmissive substrate.

The light transmissive substrate may any substrate that transmits light, and the material thereof is not particularly limited. Examples of the material of the light transmissive substrate include a methyl methacrylate (co)polymer, a polycarbonate, a styrene (co)polymer, a methyl methacrylate-styrene copolymer, cellulose diacetate, cellulose triacetate, cellulose acetate butyrate, polyester, polyamide, polyimide, polyether sulfone, polysulfone, polypropylene, polymethylpentene, polyvinyl chloride, polyvinyl acetal, polyether ketone, a polyurethane, and glass. The active energy ray-curable resin composition may be cured alone, but it is general to use the active energy ray-curable resin composition in a state of being cured on a light transmissive substrate and integrated with the light transmissive substrate.

The shape and the production method of the substrate are not particularly limited. For example, an injection molded body, an extrusion molded body, or a cast molded body can be used. Furthermore, the shape may be a sheet shape, a film shape, or any other three-dimensional shape. In addition, the surface of the substrate may be subjected to a coating treatment or a corona treatment for the purpose of improving characteristics such as adhesiveness, antistatic properties, scratch resistance, and weather resistance. Particularly, it is preferable to use a light transmissive substrate provided with an easily adhesive layer on the surface, in order to improve the adhesiveness between the active energy ray-curable resin composition and the light transmissive substrate.

Figure 4:
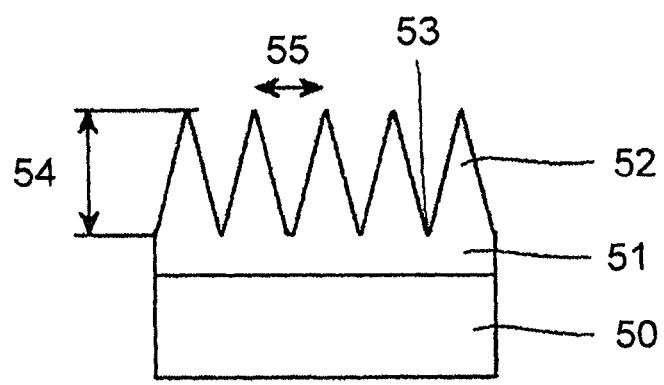
FIG. 4 is a schematic cross-sectional diagram illustrating an example of the light transmissive article of the present invention.

FIG. 4 is a schematic cross-sectional diagram illustrating an example of the light transmissive article of the present invention. The light transmissive article illustrated in this diagram has a light transmissive substrate 50, and a microrelief structure layer 51 formed from a cured product of an active energy ray-curable resin composition on the upper surface of the light transmissive substrate 50. Formed in the microrelief structure layer 51 is a nanorelief structure in which fine convexities 52 and concavities 53 having a size less than or equal to the wavelength of visible light are alternately repeated. Visible light generally refers to light having a wavelength of 380 to 780 nm, and a size less than or equal to the wavelength of visible light means that the distance between adjoining convexities 52 or concavities 53 (protrusion width 55 in the diagram) is 380 nm or less. The height 54 of the relief is not particularly limited, but from the viewpoint of the antireflection characteristics, the height is preferably 60 nm or more, and more preferably 90 nm or more. This microrelief structure layer 51 may be formed on the entirety or a portion of one surface or both surfaces of the light transmissive substrate 50.

The relief shape of the microrelief structure layer is not particularly limited; however, for example, in order to obtain an antireflection function that achieves a balance between low reflectance and low wavelength-dependency by continuously increasing the refractive index from air to the material surface, a structure in which the occupancy of the cross-sectional area continuously increases when cut at the film surface, such as a conical shape, a pyramidal shape, or a bell shape, is preferred. Furthermore, finer protrusions may be stuck together and form the microrelief structure layer.

Regarding the method of forming a microrelief structure layer, for example, a method of disposing an active energy ray-curable resin composition between a stamper having a microrelief structure and a light transmissive substrate, curing the resin composition by irradiating with active energy radiation, detaching the stamper from the cured product layer, and thereby obtaining a cured product layer having the microrelief structure transferred thereon (microrelief structure layer), is preferred.

The method for producing the stamper used in the above method is not particularly limited, but for example, an electron beam lithographic method, a laser light interference method, or an anodization method can be used. For example, a frame having a microrelief structure layer can be produced by applying a photoresist film on an appropriate support substrate, exposing the photoresist film using light such as ultraviolet laser light, electron beam, or X-radiation, and developing the photoresist film. This frame can be directly used as a stamper. It is also possible to use a product obtained by forming a microrelief structure directly on the surface of a support substrate by selectively etching the support substrate by dry etching through a photoresist layer, and removing the resist layer.

Anodized porous alumina can also be used as a stamper. For example, aluminum is anodically oxidized at a predetermined voltage using oxalic acid, sulfuric acid, phosphoric acid or the like as an electrolytic liquid, and a porous structure having a pore size of 20 to 200 nm is formed. This may be used as a stamper. In this method, it is known that pores with very high regularity are formed in a self-organized manner, when high purity aluminum is anodically oxidized at a constant pressure for a long time, subsequently the oxide coating film is first removed, and the aluminum is anodically oxidized again. Furthermore, by combining an anodization treatment and a pore diameter expansion treatment in the second process of anodization, a microrelief structure in which the cross-section is not rectangular but is triangular or bell-shaped can also be formed.

Furthermore, a replica may be produced from a template having a microrelief structure by an electroforming method or the like, and this may be used as a stamper.

The shape of the stamper is not particularly limited, and may be a flat plate shape or a roll shape. Particularly, a roll-shaped stamper is preferred from the viewpoint of productivity, since a microrelief structure layer can be continuously transferred.

Examples of the active energy radiation used in polymerization and curing include electron beam, ultraviolet radiation, and visible light. Ultraviolet radiation is particularly preferred. Examples of a lamp that irradiates ultraviolet radiation include a high pressure mercury lamp, a metal halide lamp, and electrodeless UV lamps (various bulbs) manufactured by Heraeus Noblelight Fusion UV, Inc. The amount of ultraviolet irradiation may be appropriately determined according to the absorption wavelength or the amount of addition of the polymerization initiator in the active energy ray-curable resin composition. If curing is insufficiently achieved, scratch resistance of the microrelief structure may be impaired. Also, if the amount of irradiation is excessively large, coloration of the cured product or deterioration of the light transmissive substrate may occur. Particularly, it is preferable to achieve curing at a integral amount of light of 400 to 4000 mJ/cm2, and it is more preferable to achieve curing at a integral amount of light of 400 to 2000 mJ/cm2. The intensity of irradiation is not particularly limited, but it is preferable to suppress the output power to the extent that deterioration of the light transmissive substrate is not brought about.

The light transmissive molded article of the present invention can be used in, for example, the applications of optical articles such as antireflective articles (antireflective films, antireflective coatings, antireflective sheets, and other antireflective members), an optical waveguide, a relief hologram, a lens, and a polarization separation element; and cell culture sheets. The light transmissive molded article is appropriate for the use in antireflective articles. Examples of the antireflective articles include antireflective coatings, antireflective films, and antireflective sheets used on the surfaces of image display apparatuses such as a liquid crystal display apparatus, a plasma display panel, an electroluminescent display, and a cold cathode tube display apparatus; and the lenses, show windows, spectacle lenses, and the like. When the light transmissive article is used in an image display apparatus, an antireflective film may be attached onto the outermost surface, the antireflective article may be molded as a member that serves as the outermost surface, or the antireflective article may be molded as a front surface panel.

Fourth Exemplary Embodiment

According to the present invention, there is provided an article having a microrelief structure on the surface, characterized in that the distance between adjoining convexities of the microrelief structure is less than or equal to the wavelength of visible light, and the article has a film-like shape formed from a cured product of an active energy ray-curable resin composition and does not have a support.

According to another preferred embodiment of the present invention, there is provided an article having the microrelief structure on the surface, characterized in that the thickness of the article is from 40 µm to 500 µm.

According to still another preferred embodiment of the present invention, there is provided an article having an article having a microrelief structure on the surface, characterized in that the acrylic equivalent of the active energy ray-curable resin composition is 200 or more.

According to still another preferred embodiment of the present invention, there is provided an article having a microrelief structure on the surface, which is an antireflective article.

According to still another preferred embodiment of the present invention, there is provided a method for producing an article having a microrelief structure on the surface, characterized by including the following (step 1) to (step 3):

(step 1) a step of disposing an active energy ray-curable resin composition on a stamper having a reverse structure of the microrelief structure on at least one surface;

(step 2) a step of irradiating active energy radiation and thereby curing the active energy ray-curable resin composition; and (step 3) a step of detaching a cured product of the active energy ray-curable resin composition from the stamper.

According to still another preferred embodiment of the present invention, there is provided a method for producing an article having a microrelief structure on the surface, characterized in that the stamper used in the (step 1) has a roll shape.

The article of the present invention having a microrelief structure on the surface has high surface hardness and can be produced at low cost.

<Configuration of Article Having Microrelief on Surface>

The article of the present invention having a microrelief structure on the surface is in a film form, does not have a support, and can be taken out alone.

When it is said that the article can be taken out alone, it means that an article having on the surface a microrelief structure formed from a cured product of an active energy ray-curable resin composition can be handled without any other support. Specifically, for example, whether the article can be handled alone can be determined by confirming that when the article of the present invention having a microrelief structure on the surface is wound around a cylindrical rod having a circular cross-section having a diameter of about 10 mm, cracks and the like are not generated.

According to the present invention, since the article having a microrelief structure on the surface can be handled alone, a support that is composed of a light transmissive base or the like is unnecessary. Therefore, there is no problem caused by the reflection at the interface between the cured product of the active energy ray-curable resin composition having a microrelief structure and a support. Furthermore, the article having a microrelief structure on the surface can be obtained at low cost. In addition, since the cured product of the active energy ray-curable resin composition has excellent optical isotropy and high light transmission properties, an article appropriate for an image display apparatus or the like can be obtained.

The article of the present invention may be a single layer, or may include plural layers. If the article is a single layer, since deterioration of the antireflection performance caused by the difference in the refractive index between materials inside the article does not occur, an article having high light transmission properties is obtained.

When the article has plural layers, the plural layers are all formed from cured products of active energy ray-curable resin compositions. The plural layers can be obtained by, for example, laminating plural active energy ray-curable resin compositions in an uncured state, and then curing the resin compositions. When the active energy ray-curable resin compositions are laminated in an uncured state, adhesiveness is secured by compatibilizing the contact areas between various layers, and also interfacial reflection can be suppressed to a minimum level.

An article having a microrelief structure formed on the surface from a cured product of an active energy ray-curable resin composition can be attached to an object through a tacky adhesive or the like.

Furthermore, the thickness of the article of the present invention having a microrelief on the surface is preferably from 40 µm to 500 µm, and more preferably from 60 mm to 250 µm. When the thickness is from 40 µm to 500 µm, satisfactory handleability as a film is obtained. When the thickness is larger than 40 µm, the article is not easily damaged, and when the thickness is smaller than 500 µm, cracks are not easily generated in the article. Also, if the film thickness is too large, it is not preferable even from the viewpoint of the material cost.

<Active Energy Ray-Curable Resin Composition>

According to the present specification, a radical polymerizable functional group means a (meth)acryloyl group, a vinyl group, or the like. Furthermore, a (meth)acryloyl group means an acryloyl group and/or a methacryloyl group. Also, (meth)acrylate means acrylate and/or methacrylate. Furthermore, the active energy radiation means visible light, ultraviolet radiation, electron beam, plasma, heat rays (infrared radiation), or the like.

An active energy ray-curable resin composition is a resin composition that undergoes a polymerization reaction and cures when irradiated with active energy radiation.

The active energy ray-curable resin composition preferably used in the present invention includes a polymerizable component (Z) and a photopolymerization initiator (D) as essential components, and optionally includes other components such as an ultraviolet absorber and/or an oxidation inhibitor (E).

(Polymerizable Component (Z))

Examples of the polymerizable component (Z) for the active energy ray-curable resin composition include a monomer having a radical polymerizable group, and a monomer having a cationically polymerizable group. Among them, a monomer having a radical polymerizable group is preferred in view of the rate of polymerization. Examples of the radical polymerizable group include a (meth)acryloyl group, a vinyl ether group, and a vinyl group; however, from the viewpoint of having high reactivity or having a wide selection of the material, a (meth)acryloyl group is preferred.

Here, the acrylic equivalent is a value represented by the number of (meth)acryloyl groups contained per gram of the active energy ray-curable resin composition. As the acrylic equivalent is smaller, the concentration of the (meth)acryloyl groups is increased, and a cured product having a high crosslinking density is obtained. On the contrary, as the acrylic equivalent is larger, the concentration of (meth)acryloyl groups is decreased, and a cured product having a low crosslinking density is obtained.

The acrylic equivalent of the active energy ray-curable resin composition is preferably 200 or more. The acrylic equivalent is more preferably from 200 to 400, and particularly preferably from 220 to 300.

If the acrylic equivalent of the active energy ray-curable resin composition that forms a microrelief structure is too small, the curing shrinkage is increased, and this causes curling of the cured product, or the generation of cracks due to the strain thus produced. Therefore, film thickening of the cured product is made difficult. Also, since the crosslinking density is high, protrusions of the microrelief structure on the surface become brittle and prone to break, and scratch resistance is decreased.

On the other hand, if the acrylic equivalent is too large, since the crosslinking density is low, the cured product itself becomes excessively soft, and the hardness of the film is lowered. Also, in view of scratch resistance, the cured product becomes very easily shavable or hollowable to the part where the microrelief structure carried on the surface is absent.

However, in the case of using a binder polymer, a plasticizer or the like in addition to the polymerizable component (Z) in the active energy ray-curable resin composition, the acrylic equivalent needs to be optimized according to the characteristics of those components, and the optimum range of the acrylic equivalent may become the preferred range described above The polymerizable component (Z) is not particularly limited as long as the aforementioned acrylic equivalent is satisfied; however, examples thereof include combinations of a particular polyfunctional monomer (A), a particular polyfunctional monomer (B), a particular bifunctional monomer (C), and a monofunctional monomer (F) as described below.

(Polyfunctional Monomer (A))

The polyfunctional monomer (A) is a compound that has three or more radical polymerizable functional groups in the molecule, with the molecular weight per group of the relevant functional groups being less than 110.

The molecular weight per functional group is a value obtained by dividing the molecular weight of the polyfunctional monomer (A) by the number of radical polymerizable functional groups in one molecule.

For example, in the case of trimethylolpropane triacrylate, which is a representative trifunctional monomer, since the molecular weight thereof is 296, and the number of radical polymerizable functional groups is 3, the molecular weight per functional group is 98.67, which is less than 110.

When a polyfunctional monomer having three or more radical polymerizable functional groups in the molecule, with the molecular weight per group of the functional groups being less than 110, is used, the polyfunctional monomer accomplishes the role of securing the total crosslinking density of the polymerizable component (Z) and increasing the elastic modulus or hardness of the fallout. The molecular weight per group of the functional groups of the polyfunctional monomer (A) is preferably less than 110, and more preferably less than 100.

Examples of the polyfunctional monomer (A) include trifunctional or higher-functional (meth)acrylates having a molecular weight per functional group of less than 110. Since an acrylate is superior to a methacrylate from the viewpoint of the curing rate when the polyfunctional monomer is cured with active energy radiation, it is preferable to use an acrylate.

Examples of the acrylate that can be used as the polyfunctional monomer (A) include pentaerythritol triacrylate, pentaerythritol tetraacrylate, dipentaerythritol pentaacrylate, dipentaerythritol hexaacrylate, trimethylolpropane triacrylate, and ditrimethylolpropane tetraacrylate.

The polyfunctional monomer (A) may be used singly, or two or more kinds thereof may be used in combination.

The proportion of the polyfunctional monomer (A) is 0 to 30% by mass, and preferably 0 to 20% by mass, relative to 100% by mass of the polymerizable component (Z), and it is also acceptable not to use the polyfunctional monomer (A). When the proportion of the polyfunctional monomer (A) is 30% by mass or less, the acrylic equivalent of the active energy ray-curable resin composition can be adjusted to a suitable range.

(Polyfunctional Monomer (B))

The polyfunctional monomer (B) is a compound that has three or more radical polymerizable functional groups in the molecule, with the molecular weight per group of the functional groups being 110 or more.

This polyfunctional monomer (B) adjusts the acrylic equivalent of the active energy ray-cured product to an appropriate range by the balance with the others.

The molecular weight per functional group of the polyfunctional monomer (B) is preferably 110 or more, and more preferably 150 or more. Also, the number of the radical polymerizable functional groups in the molecule is preferably trifunctional or higher-functional, more preferably tetrafunctional or higher-functional, and even more preferably pentafunctional or higher-functional.

When the polyfunctional monomer (B) has oxyethylene groups in the molecule, it is easier to adjust the amount of the oxyethylene groups contained in the active energy ray-curable resin composition to an appropriate range.

Examples of the acrylate that can be used as the polyfunctional monomer (B) include alkoxylated pentaerythritol triacrylate, alkoxylated isocyanuric acid triacrylate, alkoxylated glycerin triacrylate, alkoxylated pentaerythritol tetraacrylate, alkoxylated dipentaerythritol pentaacrylate, alkoxylated dipentaerythritol hexaacrylate, caprolactone-modified pentaerythritol triacryate, caprolactone-modified isocyanuric acid triacrylate, caprolactone-modified glycerin triacrylate, caprolactone-modified pentaerythritol tetraacrylate, caprolactone-modified dipentaerythritol pentaacrylate, and caprolactone-modified dipentaerythritol hexaacrylate.

Here, examples of alkoxylation may include ethoxylation and butoxylation. Among them, ethoxylation is preferred from the viewpoint of providing oxyethylene groups.

The polyfunctional monomer (B) may be used singly, or two or more kinds thereof may be used in combination.

The proportion of the polyfunctional monomer (B) is 15 to 90% by mass, and more preferably 25 to 65% by mass, relative to 100% by mass of the polymerizable component (Z). When the proportion of the polyfunctional monomer (B) is 15 to 90% by mass, the acrylic equivalent of the active energy ray-curable resin composition and the proportion of oxyethylene groups can be adjusted to suitable ranges.

(Bifunctional Monomer (C))

As the particular bifunctional monomer (C), polyethylene glycol diacrylate is suitably used. Polyethylene glycol diacrylate is a compound having two acryloyl groups in the molecule, and having polyethylene glycol in which oxyethylene groups lie in a row in the molecule.

The molecular weight of the polyethylene glycol structural moiety is preferably 300 or more, and more preferably 400 or more. Also, when the molecular weight of the polyethylene glycol structural moiety is large, crystallization occurs, and handleability is deteriorated. Therefore, the molecular weight of the polyethylene glycol moiety is preferably 1000 or less.

The proportion of the bifunctional monomer (C) is 0 to 85% by mass, and more preferably 35 to 75% by mass, relative to 100% by mass of the polymerizable component (Z). In a case in which polyethylene glycol diacrylate is used as the bifunctional monomer (C), when the proportion thereof is 0 to 85% by mass, the acrylic equivalent of the active energy ray-curable resin composition and the proportion of oxyethylene groups can be adjusted to suitable ranges.

Furthermore, when polyethylene glycol diacrylate is used at the proportion described above, the microrelief surface can be sufficiently hydrophilized, and oil stains such as fingerprints can be removed by wiping with a damp cloth.

(Mono Functional Monomer (F))

As the monofunctional monomer (F), the same compound as the monofunctional (F) for the first exemplary embodiment can be used in the same amount of incorporation.

(Other Polymerizable Components)

The polymerizable component (Z) may include other polymerizable components in addition to the polyfunctional monomer (A), the polyfunctional monomer (B), the bifunctional monomer (C) and the monofunctional monomer (F), to the extent that the effects of the present invention are not impaired. Examples of the other polymerizable components include monomers other than the polyfunctional monomer (A), the polyfunctional monomer (B), the bifunctional monomer (C) and the monofunctional monomer (F), and oligomers and polymers having radical polymerizable functional groups.

The proportion of the other polymerizable components is preferably 30% by mass or less, more preferably 20% by mass or less, and particularly preferably 10% by mass or less, relative to 100% by mass of the polymerizable component (Z). That is, the sum of the polyfunctional monomer (A), the polyfunctional monomer (B), the bifunctional monomer (C) and the monofunctional monomer (F) is preferably 70% by mass or more relative to 100% by mass of the polymerizable component (Z).

(Photopolymerization Initiator (D))

As the photopolymerization initiator (D), the same compound as the photopolymerization initiator (D) for the first exemplary embodiment can be used in the same amount of incorporation.

(Ultraviolet Absorber and/or Oxidation Inhibitor (E))

As the ultraviolet absorber and/or oxidation inhibitor (E), the same compounds as the ultraviolet absorber and/or oxidation inhibitor (E) for the first exemplary embodiment can be used in the same amount of incorporation.

(Other Components)

The active energy ray-curable resin composition of the present invention may optionally include known additives such as a surfactant, a mold release agent, a lubricant, a plasticizer, an antistatic agent, a photostabilizer, a flame retardant, a flame retardant aid, a polymerization inhibitor, a filler, a silane coupling agent, a colorant, a reinforcing agent, an inorganic filler, and an impact resistance improving agent.

Furthermore, the active energy ray-curable resin composition of the present invention may also include, if necessary, an oligomer or polymer that does not have a radical polymerizable functional groups, a trace amount of an organic solvent, and the like.

It is preferable that the viscosity of the active energy ray-curable resin composition is not so high, from the viewpoint of the ease of flowing into the microrelief structure on the surface of the stamper. Therefore, the viscosity of the active energy ray-curable resin composition as measured with an E type viscometer at 25° C. is preferably 10,000 mPa·s or less, more preferably 5,000 mPa·s or less, and even more preferably 2,000 mPa·s or less.

However, even if the viscosity of the active energy ray-curable resin composition exceeds 10,000 mPa·s, there is no particular problem as long as the viscosity can be increased by heating the active energy ray-curable resin composition in advance at the time of contacting with the stamper. In this case, the viscosity of the active energy ray-curable resin composition as measured with a B type rotary viscometer at 70° C. is preferably 5,000 mPa·s or less, and more preferably 2,000 mPa·s or less.

If the viscosity is too low, the active energy ray-curable resin composition may wet spread and bring about a problem in production. The viscosity is preferably 10 mPa·s or more.

In regard to the active energy ray-curable resin composition suitable for the use at the surface of the article of the present invention as described above, since the acrylic equivalent is in a particular range, the cured product thereof may not undergo curling or cracking even if the cured product is in the form of a film that does not have a support, the film can be made thicker, and the cured product has high surface hardness.

Furthermore, since the active energy ray-curable resin composition includes a particular polyfunctional monomer (A), a particularly polyfunctional monomer (B) and a particularly bifunctional monomer (C) at a particular ratio, the microrelief structure has high scratch resistance. Furthermore, since the active energy ray-curable resin composition includes a particular bifunctional monomer (C) at a particular proportion, a cured product having satisfactory fingerprint wipeability of the microrelief structure can be formed.

<Article Having Microrelief Structure on Surface>

The article of the present invention is an article having on the surface a microrelief structure that is formed by bringing an active energy ray-curable resin composition into contact with a stamper having a reverse structure of the microrelief structure on the surface, and curing the resin composition.

FIG. 1 is a cross-sectional diagram illustrating an example of the article of the present invention. The article 40 includes a cover film 42 that is optionally added, and a microrelief structure layer 44. The article 40 may also be composed of the microrelief structure layer 44 only.

The microrelief structure layer 44 has a microrelief structure on the surface.

The microrelief structure on the surface of the article 40 in the case of using a stamper of anodized alumina as described below, is formed by transferring the microrelief structure on the surface of the anodized alumina, and has plural convexities 46 formed from a cured product of the active energy ray-curable resin composition.

Regarding the microrelief structure, a so-called moth-eye structure in which plural protrusions (convexities) having an approximately conical shape, a pyramidal shape or the like lie in a row, is preferred. The moth-eye structure in which the distance between protrusions is less than or equal to the wavelength of visible light, is known to serve as an effective means for antireflection as the refractive index increases continuously from the refractive index of air to the refractive index of the material.

In regard to this microrelief structure called the moth-eye structure, in order to achieve a balance between antireflection performance and scratch resistance, it is important to adjust the aspect ratio of the relief, which is the balance between the average distance between convexities and the height of a convexity) (height of a convexity/average distance between convexities), to a particular range.

The average distance between convexities is preferably less than or equal to the wavelength of visible light, that is, 400 nm or less. If the average distance is more than 400 nm, scattering of visible light occurs, and therefore, the microrelief structure is not suitable for optical applications such as an antireflective article. The average distance between convexities is more preferably 140 to 260 nm, and particularly preferably 160 nm to 200 nm.

The average distance between convexities is a value obtained by measuring the distance between adjacent convexities (distance from the center of a convexity to the center of an adjacent convexity) at 50 sites by electron microscopic observation, and averaging these values.

When the average distance between convexities is in the preferred range described above, the antireflection performance is generally determined by the height of protrusions. In order to obtain satisfactory antireflection performance, the height of the convexities is preferably 120 to 250 nm, more preferably 150 to 220 nm, and particularly preferably 180 to 190 nm. When the height of the convexities is 120 nm or larger, the reflectance is sufficiently decreased, and the wavelength-dependency of reflectance is low. When the height of the convexities is 250 nm or smaller, the phenomenon in which the tips of the convexities adhere closely to one another can be easily suppressed.

The height of a convexity is a value obtained by measuring the distance between the topmost part of the convexity and the bottommost part of a concavity existing between convexities when the microrelief structure is observed with an electron microscope at a magnification ratio of 30,000 times.

Furthermore, the aspect ratio of a convexity (height of the convexity/average distance between convexities) is preferably 0.7 to 1.4, and more preferably 0.8 to 1.2. When the aspect ratio of the convexity is 0.7 or more, the reflectance is sufficiently lowered. When the aspect ratio of the convexity is 1.4 or less, scratch resistance of the convexities becomes satisfactory.

The shape of the convexity is preferably a shape in which the convexity cross-sectional area in a direction perpendicular to the height direction continuously increases from the outermost surface along the depth direction, that is, the cross-sectional shape in the height direction of the convexity is a triangular shape, a trapezoidal shape, or a bell shape.

(Stamper)

The stamper and the method for production thereof are the same as those of the first exemplary embodiment.

(Method for Producing Article)

The article having a microrelief structure on the surface is produced by a process including the following (step 1) to (step 3):

(step 1) a step of disposing an active energy ray-curable resin composition on a stamper having a reverse structure of the microrelief structure on at least one surface;

(step 2) a step of irradiating active energy radiation and thereby curing the active energy ray-curable resin composition; and (step 3) a step of detaching the cured product of the active energy ray-curable resin composition from the stamper.

Furthermore, it is preferable that the stamper in the (step 1) has a roll shape.

For example, the article is produced as described below, using a production apparatus illustrated in FIG. 3.

An active energy ray-curable resin composition is supplied from a tank 22, between a roll-shaped stamper 20 having a reverse structure of a microrelief structure on the surface (not shown in the diagram), and a cover film 42 which is a band-shaped film that moves along the surface of the roll-shaped stamper 20.

The cover film 42 and the active energy ray-curable resin composition are nipped between the roll-shaped stamper 20 and a nip roll 26 for which the nip pressure has been adjusted by a pneumatic cylinder 24, and thus the active energy ray-curable resin composition is uniformly spread widely between the cover film 42 and the roll-shaped stamper 20, and at the same time, the active energy ray-curable resin composition is filled into the concavities of the microrelief structure of the roll-shaped stamper 20.

The active energy ray-curable resin composition is irradiated with active energy radiation through the cover film 42, from an active energy ray irradiation apparatus 28 installed below the roll-shaped stamper 20, and the active energy ray-curable resin composition is cured. Thereby, a microrelief structure layer 44 in which the microrelief structure on the surface of the roll-shaped stamper 20 has been transferred is formed.

The microrelief structure layer 44 and the cover film 42 are detached from the roll-shaped stamper 20 using a peeling roll 30, and thereby the article 40 shown in FIG. 1 is obtained. The cover film 42 of the article 40 is detachable from the microrelief structure layer 44, and the microrelief structure layer 44 can be handled alone.

Preferred examples of the active energy ray irradiation apparatus 28 include a high pressure mercury lamp and a metal halide lamp, and in this case, the amount of light irradiation energy is preferably 100 to 10,000 mJ/cm$^2$.

The cover film 42 is preferably a light transmissive film. Examples of the material of the film include an acrylic resin, a polycarbonate, a styrene-based resin, polyester, a cellulose-based resin (triacetyl cellulose or the like), a polyolefin, and an alicyclic polyolefin. This cover film 42 functions as a protective film in a state of being laminated on the microrelief structure layer 44.

Furthermore, the cover film 42 is not an essential constituent member. For example, it is possible to obtain a film-like microrelief structure layer 44 by directly applying an active energy ray-curable resin composition on the roll-shaped stamper 20 using a coating apparatus, subsequently curing the resin composition by irradiating active energy radiation thereon, and then detaching the microrelief structure layer 44 from the roll-shaped stamper 20. In this case, the active energy ray-curable resin composition is preferably in a state in which oxygen has been purged from the surroundings when active energy radiation is irradiated. The method may be, for example, using inert gas such as nitrogen or carbon dioxide by filling or blowing in.

Examples of the apparatus that coats the active energy ray-curable resin composition on the roll-shaped stamper 20 include a die coater, a gravure coater, and a reverse coater.

Another example of the production method may be a method of obtaining a microrelief structure layer 44 by applying an active energy ray-curable resin composition on a metal belt, transferring the shape using a roll-shaped stamper 20, and then irradiating active energy radiation.

(Applications)

The applications of the present invention can be the same as those of the first exemplary embodiment.

EXAMPLES

Hereinbelow, the present invention is explained in more detail by way of Example A.

(Scratch Resistance)

For evaluation of scratch resistance, an abrasion testing machine (trade name: HEiDON TRIBOGEAR TYPE-30S, manufactured by Shinto Scientific Co., Ltd.) was used. A load of 400 g was applied on a steel wool (trade name: BONSTAR #0000, manufactured by Nippon Steel Wool Co., Ltd.) which measured 2 cm on each side and was placed on the surface of a light transmissive article, and abrasion was carried out for 10 reciprocations at a distance of reciprocation: 30 mm and a head speed: 30 mm/sec. Thereafter, the external appearance of the surface of the light transmissive article was evaluated. On the occasion of the evaluation of external appearance, the light transmissive article was attached to one surface of a transparent black acrylic plate (trade name: ACRYLITE, manufactured by Mitsubishi Rayon Co., Ltd.) having a thickness of 2.0 mm, the black acrylic plate was held up toward a fluorescent lamp indoors, and the external appearance was evaluated by visual inspection. The evaluation was carried out according to the following criteria.

A: No scratches are recognized.

B: There are fewer than 5 scratches that can be recognized, and the scratch sites are not clouded in white.

C: There are 5 or more but fewer than 20 scratches that can be recognized, and the scratch sites are slightly clouded in white.

D: There are 20 or more scratches that can be recognized, and the scratch sites appear clearly cloudy in white.

(Fingerprint Wipeability)

The surface of a light transmissive article having fingerprints attached on the surface was wiped in one direction using a wiper (trade name: ELLEAIR PROWIPE, manufactured by Daio Paper Corp.) soaked with 1.0 cc of tap water. Thereafter, the external surface of the surface of the light transmissive article was evaluated. The evaluation was carried out according to the following criteria.

A: Fingerprints can be completely removed by wiping for 2 or fewer times.

B: Fingerprints can be completely removed by wiping for 3 or more times but fewer than 10 times.

C: Fingerprints remain even after wiping for 10 times.

(Water Resistance)

A test similar to the fingerprint wipeability test was carried out, and water resistance was evaluated according to the following criteria.

A: Satisfactory antireflection performance and transparency are maintained.

B: When a white LED light source is illuminated from an oblique direction, the film is slightly clouded in white.

C: The film is clearly clouded in white.

(Measurement of Distance Between Adjoining Convexities and Height of Convexity)

The distance between adjoining convexities was obtained by measuring the distance between adjoining convexities (distance from the center of a convexity to the center of an adjacent convexity) at 50 sites using an electron microscope (trade name: JSM7400F, manufactured by JEOL, Ltd.), and averaging these values. Furthermore, the height of a convexity was obtained by measuring the distance between the topmost part of a convexity and the bottommost part of a concavity existing between convexities at 50 sites by observing the microrelief structure using the electron microscope at a magnification ratio of 30,000 times, and averaging these values.

(Measurement of Indentation Elastic Modulus (X) and Creep Deformation Ratio (Y))

A large-sized slide glass (trade name: S9213, manufactured by Matsunami Glass Industries, Ltd.) was used as a substrate. An active energy ray-curable resin composition was applied on the substrate so as to obtain a coating film having a thickness of about 500 μm, and the active energy ray-curable resin composition was irradiated with ultraviolet radiation at about 3000 mJ/cm² using a high pressure mercury lamp. This was used as a sample for evaluation of the indentation elastic modulus (X) and the creep deformation ratio (Y).

An evaluation of the properties of the coating film was carried out using a Vickers indenter (tetrahedral diamond pyramid) and a microhardness meter (trade name: FISCHERSCOPE HM2000XYp, manufactured by Fischer Technology, Inc.). The evaluation was carried out in a constant temperature room (temperature 23° C., humidity 50%). The evaluation program was such that [indentation (50 mN/10 seconds)]→[creep (50 mN/60 seconds)]→[unloading (50 mN/10 seconds)].

From the results measured by such a method, the indentation elastic modulus (X) of a cured product of the active energy ray-curable resin composition was calculated using an analytic software (trade name: WIN-HCU, manufactured by Fischer Technology, Inc.). Furthermore, in the evaluation program described above, the indentation depth at the time of creep initiation was designated as h0, the indentation depth at the time of creep completion was designated as h1, and the creep deformation ratio (Y) was determined by the following formula based on these h0 and h1.

Creep deformation ratio (%)=($h1-h0$)/$h0$×100.

(Production of Stamper)

An electrolytically polished aluminum disc having a purity of 99.99% by mass and having a thickness of 2 mm and a diameter of 465 mm was used as an aluminum substrate. A 0.3 M aqueous solution of oxalic acid was adjusted to 15° C., and the aluminum substrate was immersed therein. An electric current was intermittently passed through the aluminum substrate by repeatedly turning the power supply of a direct current stabilization apparatus on and off, and thus the aluminum substrate was anodically oxidized. An operation of applying a constant voltage of 80 V for 5 seconds at an interval of 30 seconds was repeated 60 times. Thereby, an oxide coating film having pores in the aluminum substrate was formed.

Subsequently, the aluminum substrate having the oxide coating film formed thereon was immersed for 6 hours in an aqueous solution at 70° C. produced by mixing 6 mass % phosphoric acid and 1.8 mass % chromic acid. Thereby, the oxide coating film was dissolved and removed.

The aluminum substrate from which the oxide coating film had been dissolved and removed, was immersed in a 0.05 M aqueous solution of oxalic acid that had been adjusted to 16° C., and thus the aluminum substrate was subjected to anodization for 7 seconds at 80 V. Subsequently, the aluminum substrate was immersed for 20 minutes in a 5 mass % aqueous solution of phosphoric acid that had been adjusted to 32° C., and thus the aluminum substrate was subjected to a pore diameter expansion treatment of expanding the pores of the oxide coating film. As such, anodization and a pore diameter expansion treatment were alternately repeated, and these treatments were each applied 5 times in total.

The mold thus obtained was immersed for 10 minutes in a 0.1 mass % aqueous solution of TDP-8 (trade name, manufactured by Nikko Chemicals Co., Ltd.). This was lifted up and dried in air overnight, and thereby the mold was subjected to a mold release treatment. Thus, a stamper was produced.

(Polymerizable Component (Z))

The compounds indicated in Table 1 were used as the polymerizable component (Z).

TABLE 1

|     | Abbreviation | Compound name (product name) | Acrylic equivalent [g/eq] | Oxyethylene groups [mass %] |
|-----|--------------|------------------------------|---------------------------|------------------------------|
| (A) | DPHA         | Dipentaerythritol penta(hexa)acrylate | 96 | 0 |
|     | PETA         | Pentaerythritol tetraacrylate | 88 | 0 |
| (B) | DPHA-12E     | Ethylene oxide-modified dipentaerythritol hexaacrylate (oxyethylene groups: 12 mol) | 185 | 47.5 |
|     | DPHA-3C      | Caprolactone-modified dipentaerythritol hexaacrylate (caprolactone: 3 mol) | 154 | 0 |
| (C) | 9EGDA        | Polyethylene glycol diacrylate (PEG molecular weight = 400, oxyethylene groups: about 9 mol) | 264 | 75.0 |
|     | 14EGDA       | Polyethylene glycol diacrylate (PEG molecular weight = 600, oxyethylene groups: about 14 mol) | 374 | 82.4 |
|     | 23EGDA       | Polyethylene glycol diacrylate (PEG molecular weight = 1000, oxyethylene groups: about 23 mol) | 554 | 91.3 |

TABLE 1-continued

|  | Abbreviation | Compound name (product name) | Acrylic equivalent [g/eq] | Oxyethylene groups [mass %] |
|---|---|---|---|---|
| Others | 3PGDA | Tripropylene glycol diacrylate (oxypropylene groups: 3 mol) | 150 | 0 |
|  | CN2271E | Polyester acrylate oligomer (manufactured by Sartomer Co., Inc.) | Not known | Not known |
|  | CN152 | Monoacrylate oligomer (manufactured by Sartomer Co., Inc.) | Not known | Not known |
|  | HEA | 2-Hydroxyethyl acrylate | 116 | 0 |

(Photopolymerization Initiator (D))

As the photopolymerization initiator (D), IRGACURE 184 (manufactured by BASF SE) was used in an amount of 1.0% by mass, and IRGACURE 819 (manufactured by BASF SE) was used in an amount of 0.5% by mass, both relative to 100% by mass of the polymerizable component (Z).

Example A1

The polymerizable component (Z) was prepared by mixing 70% by mass of DPHA-12E and 30% by mass of 14EGDA. An active energy ray-curable resin composition was prepared by mixing 1.0% by mass of IRGACURE 184 and 0.5% by mass of IRGACURE 819, both relative to 100% by mass of the polymerizable component (Z), as the photopolymerization initiator (D).

Several drops of the active energy ray-curable resin composition were dripped on the surface of the aforementioned stamper. While the active energy ray-curable resin composition was forcibly spread on a triacetyl cellulose film (trade name: TD80ULM, manufactured by Fujifilm Corp.; films in the following were also the same) having a thickness of 80 μm, the active energy ray-curable resin composition was coated over the film. Thereafter, ultraviolet radiation was irradiated through the film side in an energy amount of 2000 mJ/cm$^2$ using a high pressure mercury lamp, and thereby the active energy ray-curable resin composition was cured. The stamper was released from the cured product of the active energy ray-curable resin composition, and thus a light transmissive article having a microrelief structure layer with the distance between adjoining convexities: 180 nm and the height of a convexity: 180 nm (aspect ratio: 1.0) was obtained. The results for the evaluation of scratch resistance, fingerprint wipeability and water resistance are presented in Table 2.

Examples A2 to A12 and Comparative Examples A1 to A12

Light transmissive articles having a microrelief structure layer were obtained in the same manner as in Example A1, except that the composition of the active energy ray-curable resin composition was changed to the compositions indicated in Table 2 and Table 3. The evaluation results are presented in Table 2 and Table 3.

Meanwhile, in Table 2 and Table 3, Examples 1 to 12 and Comparative Examples 1 to 12 represent Examples A1 to A12 and Comparative Examples B1 to B12, respectively.

TABLE 2

|  |  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| (A) | DPHA |  |  |  |  |  |  |  |  |  |  |  | 15 |
|  | PETA |  |  |  |  |  |  |  |  |  |  |  |  |
| (B) | DPHA-12E | 70 | 65 | 60 | 50 | 40 | 30 | 70 | 60 | 50 |  |  | 20 |
|  | DPHA-3C |  |  |  |  |  |  |  |  |  | 30 | 20 |  |
| (C) | 9EGDA |  |  |  |  |  |  |  |  |  |  |  |  |
|  | 14EGDA | 30 | 35 | 40 | 50 | 60 | 70 |  |  |  | 70 | 80 | 65 |
|  | 23EGDA |  |  |  |  |  |  | 30 | 40 | 50 |  |  |  |
| Others | 3PGDA |  |  |  |  |  |  |  |  |  |  |  |  |
|  | CN2271E |  |  |  |  |  |  |  |  |  |  |  |  |
|  | CN152 |  |  |  |  |  |  |  |  |  |  |  |  |
|  | HEA |  |  |  |  |  |  |  |  |  |  |  |  |
| Acrylic equivalent [g/eq] |  | 218 | 225 | 232 | 248 | 266 | 286 | 231 | 252 | 277 | 262 | 291 | 229 |
| Oxyethylene groups [mass %] |  | 58.0 | 59.8 | 61.5 | 65.0 | 68.5 | 72.0 | 60.7 | 65.1 | 69.5 | 57.7 | 65.9 | 63.1 |
| Indentation elastic modulus (X) [MPa] |  | 518 | 402 | 354 | 220 | 149 | 110 | 458 | 296 | 174 | 194 | 108 | 287 |
| Creep deformation ratio (Y) [%] |  | 9.6 | 6.8 | 3.5 | 2.9 | 1.3 | 0.6 | 4.2 | 1.7 | 2.4 | 2.9 | 1.0 | 2.5 |
| (0.00022X − 0.01)*100 |  | 10.4 | 7.9 | 6.8 | 3.8 | 2.3 | 1.4 | 9.1 | 5.5 | 2.8 | 3.3 | 1.4 | 5.3 |
| Scratch resistance |  | B | B | A | A | A | B | B | A | B | B | B | B |
| Fingerprint wipeability |  | A | A | A | A | A | A | A | A | A | A | A | A |
| Water resistance |  | A | A | A | A | A | A | A | A | A | A | A | A |

TABLE 3

| | | Comparative Example 1 | Comparative Example 2 | Comparative Example 3 | Comparative Example 4 | Comparative Example 5 | Comparative Example 6 |
|---|---|---|---|---|---|---|---|
| (A) | DPHA | | | | | | |
| | PETA | | | | | | |
| (B) | DPHA-12E | 80 | 20 | | | | |
| | DPHA-3C | | | 60 | 50 | 40 | |
| (C) | 9EGDA | | | | | | |
| | 14EGDA | 20 | 80 | 40 | 50 | 60 | |
| | 23EGDA | | | | | | |
| Others | 3PGDA | | | | | | |
| | CN2271E | | | | | | 80 |
| | CN152 | | | | | | 20 |
| | HEA | | | | | | |
| Acrylic equivalent [g/eq] | | 206 | 311 | 201 | 218 | 238 | Not known |
| Oxyethylene groups [mass %] | | 54.6 | 75.4 | 33.0 | 41.2 | 49.4 | Not known |
| Indentation elastic modulus (X) [MPa] | | 764 | 74 | 911 | 486 | 213 | 33 |
| Creep deformation ratio (Y) [%] | | 11.4 | 0.3 | 11.2 | 12.0 | 8.9 | 0.3 |
| (0.00022X − 0.01)*100 | | 15.8 | 0.6 | 19.0 | 9.7 | 3.7 | −0.3 |
| Scratch resistance | | D | D | D | D | C | D |
| Fingerprint wipeability | | A | A | A | A | A | C |
| Water resistance | | A | B | A | A | A | C |

| | | Comparative Example 7 | Comparative Example 8 | Comparative Example 9 | Comparative Example 10 | Comparative Example 11 | Comparative Example 12 |
|---|---|---|---|---|---|---|---|
| (A) | DPHA | | | | | 20 | 30 |
| | PETA | | | 15 | 15 | | |
| (B) | DPHA-12E | | | | | | |
| | DPHA-3C | | | | | | |
| (C) | 9EGDA | | | | 85 | | |
| | 14EGDA | | | | | 70 | 60 |
| | 23EGDA | | | 85 | | | |
| Others | 3PGDA | 70 | 85 | | | | |
| | CN2271E | 30 | 15 | | | | |
| | CN152 | | | | | | |
| | HEA | | | | | 10 | 10 |
| Acrylic equivalent [g/eq] | | Not known | Not known | 313 | 203 | 208 | 179 |
| Oxyethylene groups [mass %] | | Not known | Not known | 75.2 | 63.8 | 57.7 | 49.4 |
| Indentation elastic modulus (X) [MPa] | | 1395 | 1861 | 72 | 147 | 241 | 563 |
| Creep deformation ratio (Y) [%] | | 17.7 | 14.1 | 0.8 | 2.7 | 4.6 | 8.0 |
| (0.00022X − 0.01)*100 | | 29.7 | 39.9 | 0.6 | 2.2 | 4.3 | 11.4 |
| Scratch resistance | | D | D | D | D | C | D |
| Fingerprint wipeability | | C | C | A | A | A | A |
| Water resistance | | A | A | C | A | A | A |

Figure 5:
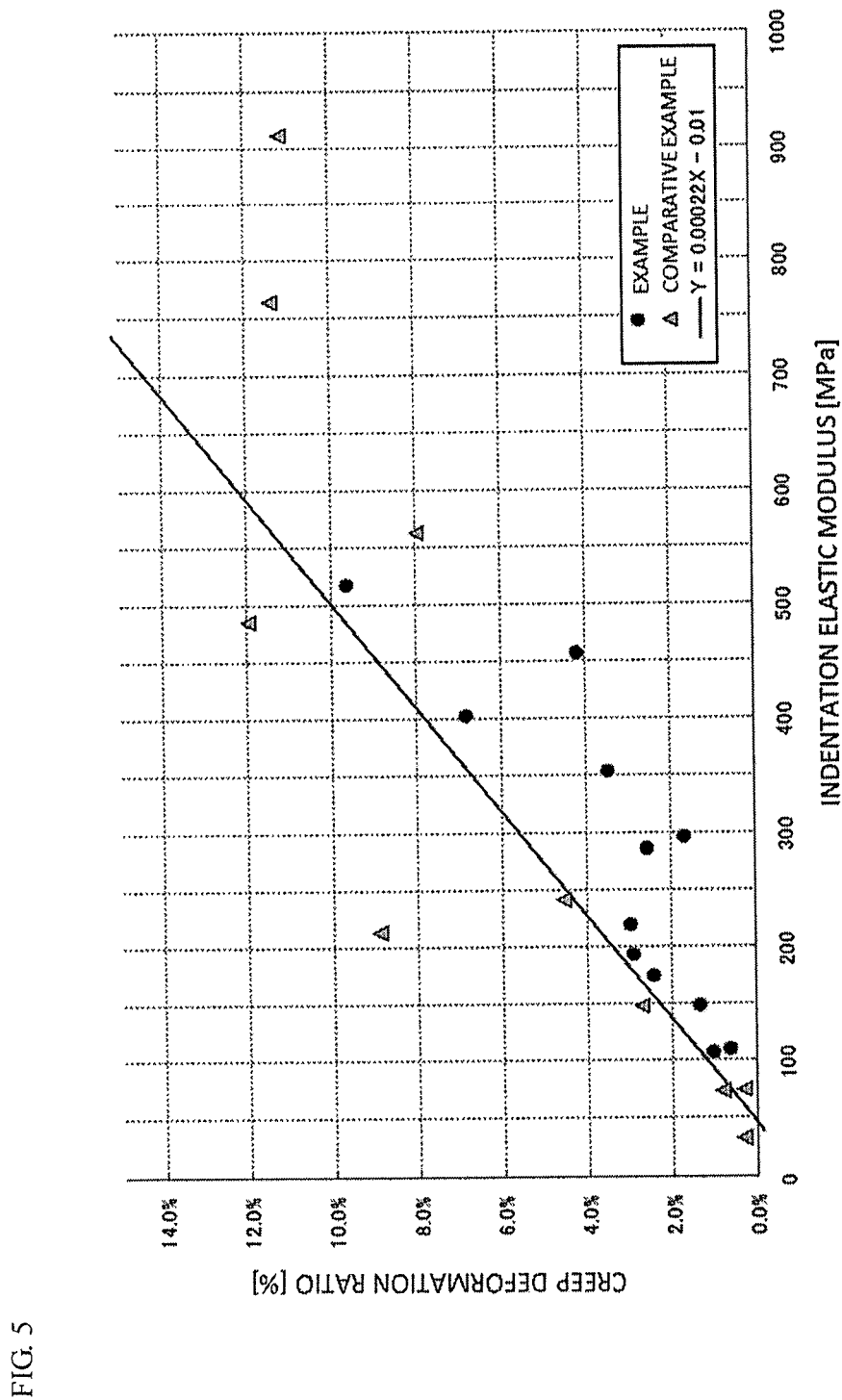
FIG. 5 is a graph illustrating the relationship between the indentation elastic modulus (X) and the creep deformation ratio (Y) in Example A and Comparative Example A.

As is obvious from the results of Table 2 and the graph of FIG. 5, in regard to the light transmissive articles obtained in Examples A1 to A12, since the values of the indentation elastic modulus (X) and the creep deformation ratio (Y) satisfied the above formula (1) and the above formula (2), the light transmissive articles exhibited satisfactory scratch resistance, fingerprint wipeability and water resistance. Furthermore, the acrylic equivalents were in the range of 215 to 300 [g/eq], and the proportions occupied by oxyethylene groups were also in the range of 55.0 to 74.0% by mass On the other hand, as is obvious from the results of Table 3 and the graph of FIG. 5, in regard to the light transmissive articles obtained in Comparative Examples A1 to A12, the values of the indentation elastic modulus (X) and the creep deformation ratio (Y) were not in the range of the formula (1) and/or the formula (2). Therefore, satisfactory scratch resistance could not be obtained.

Specifically, in Comparative Examples A2, A6 and A9 in which the indentation elastic modulus (X) was less than 100 [MPa], since the cured products were too soft, scratches were generated by steel wool such that the resin itself was hollowed out during the evaluation of scratch resistance. Furthermore, sine the protrusions of the microrelief structure layer were too soft, a phenomenon involving sticking together of protrusions was recognized after wiping with a damp cloth during the evaluation of water resistance, and an overall external appearance that looked like fogging was observed. Thus, water resistance was low.

On the other hand, in Comparative Examples A1, A3, A7, A8 and A12 in which the indentation elastic modulus (X) was larger than 560 [MPa], since the cured products were too hard, a phenomenon in which protrusions of the microrelief structure layer were broken in the middle or scraped off was recognized during the evaluation of scratch resistance.

Furthermore, in Comparative Examples A4, A5, A10 and A11, the indentation elastic modulus (X) was in the range of 80≤X≤560 [MPa]; however, since the creep deformation ratio (Y) was not in the range of the above formula (2), a phenomenon in which protrusions of the microrelief structure layer were broken in the middle or scraped off was recognized during the evaluation of scratch resistance.

Furthermore, the present invention is explained in more detail by way of Example B. In the following descriptions, the unit "parts" indicates parts by mass.

[Scratch Resistance: Steel Wool]

A load of 400 g (100 gf/cm$^2$) or 1 kg (250 gf/cm$^2$) was applied on a steel wool (manufactured by Nippon Steel Wool Co., Ltd., product name BONSTAR #0000) that was cut to a size of 2 cm$^2$ and placed on the surface of an article, and the steel wool was rubbed in ten reciprocations at a distance of reciprocation: 30 mm and a head speed: 100 mm/second in average, using an abrasion testing machine (manufactured by Shinto Scientific Co., Ltd., product name: HEiDON TRIBOGEAR TYPE-30S). Thus, the external appearance of the surface of the article was evaluated. On the occasion of the evaluation of external appearance, the article was attached to one surface of a black acrylic plate (manufactured by Mitsubishi Rayon Co., Ltd., product name: ACRYLITE) having a thickness of 2.0 mm, the acrylic plate was held up to a fluorescent lamp indoors, and the external appearance was evaluated by visual inspection.

"AA": No scratches are recognized.
"A": There are fewer than 10 scratches that can be recognized.
"B": There are 10 or more but fewer than 30 scratches that can be recognized.
"C": There are 30 or more scratches that can be recognized.
"D": The antireflection performance is lost in an area of 50% or more of the scratched section.

(Fingerprint Wipeability)

The surface of an article having fingerprints attached on the surface was wiped in one direction using a wiper (manufactured by Daio Paper Corp., product name: ELLEAIR PROWIPE) soaked with 1.0 cc of tap water, and then the external appearance of the surface of the article was evaluated.

"A": Fingerprints can be completely removed by wiping 2 or fewer times.
"B": Fingerprints can be completely removed by wiping from 3 times to 10 times.
"C": Fingerprints remain even after wiping 10 times.

(Water Resistance)

The surface of an article having fingerprints attached on the surface was wiped in one direction using a wiper (manufactured by Daio Paper Corp., product name: ELLEAIR PROWIPE) soaked with 1.0 cc of tap water, and then the external appearance of the surface of the article was evaluated. Samples in which the wiped areas turned cloudy were observed by electron microscopy, and it was confirmed that protrusions of the microrelief structure were stuck together in all of the samples.

"A": Satisfactory antireflection performance and transparency are maintained.
"B": The wiped areas are clouded.

(Measurement of Indentation Elastic Modulus (X) and Creep Deformation Ratio (Y))

Measurement of the indentation elastic modulus (X) and the creep deformation ratio (Y) was carried out by the same method as described above.

(Production of Stamper)

An electrolytically polished aluminum disc having a purity of 99.99% by mass, a thickness of 2 mm and a diameter of φ65 mm, was used as an aluminum substrate.

A 0.3 M aqueous solution of oxalic acid was adjusted to 15° C., and the aluminum substrate was immersed therein. An electric current was intermittently passed through the aluminum substrate by repeatedly turning the power supply of a direct current stabilization apparatus on and off, and thus the aluminum substrate was anodically oxidized. An operation of applying a constant voltage of 80 V for 5 seconds at an interval of 30 seconds was repeated 60 times, and an oxide coating film having pores was formed.

Subsequently, the aluminum substrate having the oxide coating film formed thereon was immersed for 6 hours in an aqueous solution at 70° C. produced by mixing 6 mass % phosphoric acid and 1.8 mass % chromic acid. Thereby, the oxide coating film was dissolved and removed.

The aluminum substrate from which the oxide coating film had been dissolved and removed, was immersed in a 0.05 M aqueous solution of oxalic acid that had been adjusted to 16° C., and thus the aluminum substrate was subjected to anodization for 7 seconds at 80 V. Subsequently, the aluminum substrate was immersed for 20 minutes in a 5 mass % aqueous solution of phosphoric acid that had been adjusted to 32° C., and thus the aluminum substrate was subjected to a pore diameter expansion treatment of expanding the pores of the oxide coating film. As such, anodization and a pore diameter expansion treatment were alternately repeated, and these treatments were each applied 5 times in total.

The mold thus obtained was immersed for 10 minutes in a 0.1 mass % aqueous solution of TDP-8 (manufactured by Nikko Chemicals Co., Ltd.). This was lifted up and dried in air overnight, and thereby the mold was subjected to a mold release treatment.

Example B1

For the polymerizable component (Z), 80 parts of glycerin EO-modified triacrylate (oxyethylene groups=about 20 mol, manufactured by Shin Nakamura Chemical Co., Ltd., trade name: NK ESTER A-GLY-20E) as the component (A2), and 20 parts of pentaerythritol (tri)tetraacrylate (manufactured by Dai-ichi Kogyo Seiyaku Co., Ltd., product name: NEW FRONTIER PET-3) as the component (B2) were used, and 1.0 part of IRGACURE 184 (product name) and 0.5 parts of IRGACURE 819 (product name), all manufactured by BASF SE, as the photopolymerization initiator (D), and 0.1 parts of NIKKOL TDP-2 (product name) manufactured by Nikko Chemicals Co., Ltd. as a mold release agent were incorporated to 100 parts of the polymerizable component (Z). Thus, an active energy ray-curable resin composition was obtained.

Several drops of this active energy ray-curable resin composition was dripped on the surface of the stamper, and the resin composition was coated by spreading on a triacetyl cellulose film (manufactured by Fujifilm Corp., product name: TD80ULM) having a thickness of 80 μm. Subsequently, ultraviolet radiation was irradiated through the film side in an energy amount of 1000 mJ/cm$^2$ using a high pressure mercury lamp, and thus the resin composition was cured. The stamper was released from the film, and thus a light transmissive article having on the surface a microrelief structure having an average distance of convexities of 180 nm and a height of 180 nm was obtained. The evaluation results are presented in Table 4.

Examples B2 to B19 and Comparative Examples B1 to B6

Light transmissive articles having a microrelief structure on the surface were obtained in the same manner as in Example B1, except that the composition of the active energy ray-curable resin composition and the mold were changed as indicated in Tables 4 to 6. The evaluation results are presented in Tables 4 to 6.

Meanwhile, in Tables 4 to 6, Examples 1 to 19 and Comparative Examples 1 to 6 represent Examples B1 to B19 and Comparative Examples B1 to B6, respectively.

Furthermore, the mole numbers of oxyethylene groups, the average values of the number of oxyethylene groups per (meth)acryloyl group, and the acrylic equivalents of various components are presented in Table 7.

TABLE 4

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| (A) | A-GLY-20E | 80 | 80 | 80 | 55 | 30 | | | | | |
| | ATM-35E | | | | | | 80 | 74 | 86 | 86 | 40 |
| | PETA-48 | | | | | | | | | | |
| | PETA-56 | | | | | | | | | | |
| | DPEA-48 | | | | | | | | | | |
| | DPEA-54 | | | | | | | | | | |
| (B) | PET-3 | 20 | | | | | 20 | | 14 | 14 | |
| | DPHA | | 20 | | 20 | | | 26 | | | |
| | V#802 | | | 20 | | | | | | | |
| | DPHA-12EO | | | | | 40 | | | | | 60 |
| | A-GLY-9E | | | | | | | | | | |
| | UA-306H | | | | | | | | | | |
| (C) | A-400 | | | | | | | | | | |
| | A-600 | | | | 25 | 30 | | | | | |
| | A-1000 | | | | | | | | | | |
| Others | APG-700 | | | | | | | | | | |
| | DMAA | | | | | | | | | | |
| | HEA | | | | | | | | | | |
| Acrylic equivalent [g/eq] | | 251 | 259 | 260 | 253 | 273 | 262 | 239 | 303 | 303 | 245 |
| Indentation elastic modulus [MPa] | | 215 | 263 | 285 | 246 | 174 | 188 | 414 | 127 | 127 | 337 |
| Creep deformation ratio [%] | | 0.8% | 1.8% | 1.0% | 1.7% | 0.9% | 1.9% | 2.7% | 0.9% | 0.9% | 3.1% |
| (0.00022X − 0.01)*100 | | 3.7 | 4.8 | 5.3 | 4.4 | 2.8 | 3.1 | 8.1 | 1.8 | 1.8 | 6.4 |
| Mold: pitch/height [nm] | | 180, 180 | 180, 180 | 180, 180 | 180, 180 | 180, 180 | 180, 180 | 180, 180 | 180, 180 | 100, 180 | 180, 180 |
| Scratch resistance (100 gf/cm$^2$) | | A | A | A | A | A | AA | A | AA | AA | A |
| Scratch resistance (250 gf/cm$^2$) | | A | C | C | B | B | A | C | A | A | C |
| Fingerprint wipeability | | A | A | A | A | A | A | A | A | A | A |
| Water resistance | | A | A | A | A | A | A | A | A | B | A |

TABLE 5

| | | Example 11 | Example 12 | Example 13 | Example 14 | Example 15 | Example 16 | Example 17 | Example 18 | Example 19 |
|---|---|---|---|---|---|---|---|---|---|---|
| (A) | A-GLY-20E | 75 | | 70 | 70 | 80 | | | | |
| | ATM-35E | | 50 | | | | | | | |
| | PETA-48 | | | | | | | | 76 | |
| | PETA-56 | | | | | | | | | 74 |
| | DPEA-48 | | | | | | 81 | | | |
| | DPEA-54 | | | | | | | 79 | | |
| (B) | PET-3 | | | | | | 19 | 21 | 24 | 26 |
| | DPHA | | 15 | | 20 | 20 | 15 | | | |
| | V#802 | | | | | | | | | |
| | A-GLY-9E | | | 35 | | | | | | |
| | UA-306H | 25 | | | | | | | | |
| (C) | A-400 | | | | 10 | | | | | |
| | A-600 | | | | | | | | | |
| | A-1000 | | | | | 10 | | | | |
| Others | APG-700 | | | | | | | | | |
| | DMAA | | | | | | 5 | | | |
| | HEA | | | | | | | | | |
| Acrylic equivalent [g/eq] | | 252 | 259 | 249 | 262 | 258 | 261 | 261 | 264 | 262 |
| Indentation elastic modulus [MPa] | | 321 | 260 | 278 | 252 | 188 | 209 | 206 | 207 | 217 |
| Creep deformation ratio [%] | | 4.2% | 0.4% | 1.0% | 1.4% | 1.8% | 2.1% | 2.2% | 0.7% | 1.5% |

TABLE 5-continued

|  | Example 11 | Example 12 | Example 13 | Example 14 | Example 15 | Example 16 | Example 17 | Example 18 | Example 19 |
|---|---|---|---|---|---|---|---|---|---|
| (0.00022X − 0.01)*100 | 6.1 | 4.7 | 5.1 | 4.5 | 3.1 | 3.6 | 3.5 | 3.5 | 3.8 |
| Mold: pitch/height [nm] | 180, 180 | 180, 180 | 180, 180 | 180, 180 | 180, 180 | 180, 180 | 180, 180 | 180, 180 | 180, 180 |
| Scratch resistance (100 gf/cm$^2$) | A | A | A | A | A | AA | AA | AA | AA |
| Scratch resistance (250 gf/cm$^2$) | C | B | C | B | B | A | A | A | A |
| Fingerprint wipeability | A | A | A | A | A | A | A | A | A |
| Water resistance | A | A | A | A | A | A | A | A | A |

TABLE 6

|  |  | Comparative Example 1 | Comparative Example 2 | Comparative Example 3 | Comparative Example 4 | Comparative Example 5 | Comparative Example 6 |
|---|---|---|---|---|---|---|---|
| (A) | A-GLY-20E |  |  |  |  |  |  |
|  | ATM-35E |  |  |  |  |  |  |
|  | PETA-48 |  |  |  |  |  |  |
|  | PETA-56 |  |  |  |  |  |  |
|  | DPEA-48 |  |  |  |  |  |  |
|  | DPEA-54 |  |  |  |  |  |  |
| (B) | PET-3 |  |  |  | 20 |  | 15 |
|  | DPHA | 50 |  |  |  | 20 |  |
|  | V#802 |  |  |  |  |  |  |
|  | DPHA-12EO |  |  | 100 |  |  |  |
|  | A-GLY-9E |  |  |  |  |  |  |
|  | UA-306H |  |  |  |  |  |  |
| (C) | A-400 |  |  |  |  |  | 85 |
|  | A-600 | 50 | 100 |  |  | 70 |  |
|  | A-1000 |  |  |  |  |  |  |
| Others | APG-700 |  |  |  | 80 |  |  |
|  | DMAA |  |  |  |  |  |  |
|  | HEA |  |  |  |  | 10 |  |
| Acrylic equivalent [g/eq] |  | 157 | 374 | 185 | 243 | 208 | 203 |
| Indentation elastic modulus [Mpa] |  | 1387 | 47 | 1285 | 149 | 241 | 147 |
| Creep deformation ratio [%] |  | 5.9% | 0.4% | 9.9% | 2.7% | 4.6% | 2.7% |
| (0.00022X − 0.01)*100 |  | 29.5 | 0.0 | 27.3 | 2.3 | 4.3 | 2.2 |
| Mold: pitch/height [nm] |  | 180, 180 | 180, 180 | 180, 180 | 180, 180 | 180, 180 | 180, 180 |
| Scratch resistance (100 gf/cm$^2$) |  | D | B | C | D | B | C |
| Scratch resistance (250 gf/cm$^2$) |  | D | C | D | D | C | D |
| Fingerprint wipeability |  | A | A | C | C | A | A |
| Water resistance |  | A | B | A | A | A | A |

TABLE 7

|  | Product name (manufacturer) | Compound name | Average number of oxyethylene groups per group of (meth)acryloyl groups | Acrylic equivalent [g/eq] |
|---|---|---|---|---|
| (A) | A-GLY-20E (manufactured by Shin Nakamura Chemical Co., Ltd.) | Glycerin EO-modified triacrylate (oxyethylene group: about 20 mol) | 6.7 | 432 |
|  | ATM-35E (manufactured by Shin Nakamura Chemical Co., Ltd.) | Pentaerythritol EO-modified tetraacrylate (oxyethylene groups: about 35 mol) | 8.8 | 473 |
|  | PETA-48 (manufactured by Dai-ichi Kogyo Seiyaku Co., Ltd.) | Pentaerythritol EO-modified tetraacrylate (oxyethylene groups: about 48 mol) | 12.0 | 616 |
|  | PETA-56 (manufactured by Dai-ichi Kogyo Seiyaku Co., Ltd.) | Dipentaerythritol EO-modified hexaacrylate (oxyethylene group: about 56 mol) | 14.0 | 704 |
|  | DPEA-48 (manufactured by Dai-ichi Kogyo Seiyaku Co., Ltd.) | Dipentaerythritol EO-modified hexaacrylate (oxyethylene groups: about 48 mol) | 8.0 | 448 |
|  | DPEA-54 (manufactured by Dai-ichi Kogyo Seiyaku Co., Ltd.) | Dipentaerythritol EO-modified hexaacrylate (oxyethylene groups: about 54 mol) | 9.0 | 492 |

TABLE 7-continued

| | Product name (manufacturer) | Compound name | Average number of oxyethylene groups per group of (meth) acryloyl groups | Acrylic equivalent [g/eq] |
|---|---|---|---|---|
| (B) | PET-3 ((manufactured by Dai-ichi Kogyo Seiyaku Co., Ltd.) | Pentaerythritol (tri)tetraacrylate | — | 94 |
| | DPHA (manufactured by Nippon Kayaku Co., Ltd.) | Dipentaerythritol (penta)hexaacrylate | — | 99 |
| | V#802 (manufactured by Osaka Organic Chemical Industry, Ltd.) | Mixture of tripentaerythritol acrylate, mono- and dipentaerythritol acrylate, and polypentaerythritol acrylate | — | 101 |
| | DPHA-12EO (manufactured by Dai-ichi Kogyo Seiyaku Co., Ltd.) | Dipentaerythritol EO-modified hexaacrylate (oxyethylene group: about 12 mol) | 2.0 | 185 |
| | A-GLY-9E (manufactured by Shin Nakamura Chemical Co., Ltd.) | Glycerin EO-modified triacrylate (oxyethylene group: about 9 mol) | 3.0 | 270 |
| | UA-306H (manufactured by Kyoeisha Chemical Co., Ltd.) | Pentaerythritol triacrylate, hexamethylene diisocyanate urethane prepolymer | — | 112 |
| | UA-510H (manufactured by Kyoeisha Chemical Co., Ltd.) | Dipentaerythritol pentaacrylate, hexamethylene diisocyanate urethane prepolymer | — | 105 |
| (C) | A-400 (manufactured by Shin Nakamura Chemical Co., Ltd.) | Polyethylene glycol diacrylate (PEG molecular weight = 400, oxyethylene group: about 9 mol) | 4.5 | 264 |
| | A-600 (manufactured by Shin Nakamura Chemical Co., Ltd.) | Polyethylene glycol diacrylate (PEG molecular weight = 600, oxyethylene group: about 14 mol) | 6.8 | 374 |
| | A-1000 (manufactured by Shin Nakamura Chemical Co., Ltd.) | Polyethylene glycol diacrylate (PEG molecular weight = 1000, oxyethylene group: about 23 mol) | 11.4 | 554 |
| Others | APG-700 (manufactured by Shin Nakamura Chemical Co., Ltd.) | Polypropylene glycol diacrylate (PPG molecular weight = 700, oxypropylene group: about 12 mol) | — | 404 |
| | DMAA (manufactured by Kohjin Co., Ltd.) | N,N-dimethylacrylamide | — | 99 |
| | HEA (manufactured by Osaka Organic Chemical Industry, Ltd.) | 2-Hydroxyethyl acrylate | — | 116 |

[Evaluation]

In Examples B1 to B19, since the polyfunctional (meth)acrylate (A2) was incorporated, satisfactory steel wool scratch resistance was obtained. Particularly, in Examples B6, B8, B9, B16, B17, B18 and B19, the results for the test on steel wool scratch resistance were AA (no scratches) at 100 gf/cm$^2$, and A (fewer than 10 recognizable scratches) at 250 gf/cm$^2$, and the samples exhibited particularly high scratch resistance.

However, in Example B9, since the pitch of the mold was 100 nm, the aspect ratio became high, and the phenomenon in which protrusions were stuck together was confirmed. Therefore, results with poor water resistance were obtained.

In Comparative Examples B1 to B6, since the polyfunctional (meth)acrylate (A2) was not incorporated, the steel wool scratch resistance was inferior to that of Examples. In Comparative Example B2, since the acrylic equivalent was large, the cured product was soft and had poor water resistance. In Comparative Example B3, since the average number of oxyethylene groups per group of the (meth)acryloyl groups was small, sufficient scratch resistance was not obtained, hydrophilicity was insufficient, and fingerprint wipeability was also not satisfactory.

Furthermore, hereinbelow, the present invention is explained in more detail by way of Example C. In the following descriptions, the unit "parts" means "parts by mass". Also, the evaluation of various properties was carried out by the following methods.

<Scratch Resistance: Steel Wool Test>

A light transmissive article was rubbed in ten reciprocations with an indenter having a size of 20 mm on each side and attached with steel wool (#0000) under the conditions of a load of 25 gf/cm$^2$, in an environment at a temperature of 23° C. and a humidity of 50% RH, using a reciprocating abrasion testing machine (manufactured by Shinto Scientific Co., Ltd., model name: HEIDON TYPE-30S). Thereafter, a black paper was placed on the back surface of the light transmissive article, the number of scratches generated on the light transmissive article was checked, and thereby scratch resistance was evaluated by visual inspection according to the following criteria. It was considered that sufficient scratch resistance was obtained in the case of A, and satisfactory scratch resistance was obtained in the case of B.

"A": 0 to 10 scratches generated.

"B": More than 10 but 20 or fewer scratches generated.

"C": Scratches were generated over the entire surface contacted with the indenter, or the entire surface was clouded in white (including changes in the external appearance such as a decrease in light transmission properties other than scratching).

<Antireflection Properties: Reflectance>

For a light transmissive article attached to a transparent acrylic resin plate, the relative reflectance at a wavelength between 380 nm and 780 nm was measured under the conditions of an incident angle of 5° using a spectrophotometer U-3300 manufactured by Hitachi, Ltd., and the reflectance at a wavelength of 550 nm was evaluated according to the following criteria.

"A": 4.9% or less.
"B": More than 4.9%.

<Fingerprint Wipeability: Wiping with Damp Cloth>

The surface on the opposite side of the microrelief structure surface (front surface) of a microrelief structure layer was attached to a black acrylic resin plate (manufactured by Mitsubishi Rayon Co., Ltd., ACRYLITE EX#502, 50 mm×60 mm) through an optical adhesive layer, and thus an article having a population fingerprint liquid (dispersion liquid for evaluation described in Japanese Patent No. 3799025) attached on the microrelief structure surface was produced.

While a force of about 1 kgf/cm$^2$ was applied with a fingertip, the microrelief structure surface was rubbed in ten reciprocations with a wiper (Nippon Paper Crecia Co., Ltd., KAYDRY WIPER 132-S) soaked with 1.0 cc of tap water. Then, the external appearance of the article surface was evaluated.

A: Fingerprints have been completely removed.
B: Fingerprints are almost not observable, but the color tone is slightly different when a fluorescent lamp is reflected thereon (fingerprints have not been completely removed).
C: Fingerprints clearly remain.

<Fingerprint Wipeability: Wiping with Dry Cloth>

The surface on the opposite side of the microrelief structure surface (front surface) of the microrelief structure layer was attached to a black acrylic resin plate (manufactured by Mitsubishi Rayon Co., Ltd., ACRYLITE EX#502, 50 mm×60 mm) through an optical adhesive layer, and thus an article having a population fingerprint liquid (dispersion liquid for evaluation described in Japanese Patent No. 3799025) attached on the microrelief structure surface was produced.

While a force was applied (about 3 kgf/cm$^2$) with a fingertip, the microrelief structure surface was rubbed in forty reciprocations with a dry wiper (Nippon Paper Crecia Co., Ltd., KAYDRY WIPER 132-S). Then, the external appearance of the article surface was evaluated.

A: Fingerprints have been completely removed.
B: Fingerprints are almost not observable, but the color tone is slightly different when a fluorescent lamp is reflected thereon (fingerprints have not been completely removed).
C: Fingerprints clearly remain.

<External Appearance: Transparency (Clouding)>

The surface on the opposite side of the microrelief structure surface (front surface) of the microrelief structure layer was attached to a black acrylic resin plate (manufactured by Mitsubishi Rayon Co., Ltd., ACRYLITE EX#502, 50 mm×60 mm) through an optical adhesive layer, and the external appearance of the article was evaluated as described below.

A: When a white LED light source is illuminated from an oblique direction, the surface is uniform, and slight whitening or clouding is not recognized.
B: Under a fluorescent lamp indoors, the surface is uniform, and clouding is not recognized; however, when a white LED light source is illuminated from an oblique direction, whitening or clouding is recognized.
C: Even under a fluorescent lamp indoors, whitening or clouding is recognized.

<Resin Properties: Martens Hardness and Elastic Modulus>

Each of the resin compositions used in Example C and Comparative Example C was disposed between two sheets of slide glass (76×52 mm, thickness: about 1 mm) inserted with a spacer having a thickness of about 200 μm, and the resin composition was cured by irradiating with ultraviolet radiation in a integral amount of light of 1200 mJ/cm$^2$ using a high pressure mercury lamp. The slide glass of one surface was removed, and the Martens hardness and elastic modulus of the cured resin surface were measured by a method according to ISO-14577-1 using an ultramicrohardness test apparatus (Fischer Technology, Inc., trade name: FISCHERSCOPE HM2000), under the measurement conditions described below.

Indenter shape: Vickers indenter (a=136°)
Measurement environment: temperature 23° C., relative humidity 50%
Maximum test load: 100 mN
Rate of loading: 100 mN/10 seconds
Maximum load creep time: 10 seconds
Rate of unloading: 100 mN/10 seconds.

<PAG Percent Content of Resin Composition>

PAG percent content [%]=[$P$(monomer 1)×$PAG$(monomer 1)+$P$(monomer 2)×$PAG$(monomer 2)+ . . . +$P$(monomer $n$)×$PAG$(monomer $n$)]/100

PAG percent content: polyalkylene glycol percent content (%).
PAG (monomer 1): PAG (%) of monomer 1
P (monomer 1): Mass proportion (%) of monomer 1 in composition.
(provided that monomer 1, monomer 2, . . . , monomer n are all the monomers that constitute the resin composition including the (meth)acrylic monomer (A3), (meth)acrylic monomer (B3), and other monomers).

<Measurement of Indentation Elastic Modulus (X) and Creep Deformation Ratio (Y)>

Measurement of the indentation elastic modulus (X) and creep deformation ratio (Y) was carried out by the same method as described above.

(Production of Stamper)

Aluminum with a purity of 99.99% was mirror-surface treated by fabric polishing and electrolytic polishing in a perchloric acid/ethanol mixed solution (1/4 volume ratio).

Step (a):
This aluminum plate was subjected to anodization for 30 minutes in a 0.3 M aqueous solution of oxalic acid under the conditions of direct current, 40 V, and a temperature of 16° C.

Step (b):
The aluminum plate on which an oxide coating film was formed in the above step was immersed for 6 hours in a 6 mass % phosphoric acid/1.8 mass % chromic acid mixed aqueous solution, and thereby the oxide coating film was removed.

Step (c):
This aluminum plate was subjected to anodization for 30 seconds in a 0.3 M aqueous solution of oxalic acid under the conditions of direct current, 40 V, and a temperature of 16° C.

Step (d):
The aluminum plate on which the oxide coating film had been formed in the above step was immersed for 8 minutes in 5 mass % phosphoric acid at 32° C., and thereby a pore diameter expansion treatment was carried out.

Step (e):
The step (c) and the step (d) were repeated five times in total, and an anodized porous alumina having approximately conical-shaped pores having a period of 100 nm and a depth of 180 nm was obtained.

The anodized porous alumina thus obtained was washed with deionized water, and subsequently the moisture on the surface was removed by air blowing. The anodized alumina was immersed for 10 minutes in a solution obtained by diluting a fluorine-based peeling material (manufactured by Daikin Industries, Ltd., trade name: OPTOOL DSX) with a diluent (manufactured by Harves Co., Ltd., trade name: HD-ZV) to a solid content of 0.1% by mass, and was dried in air for 20 hours. Thus, a stamper having pores formed on the surface was obtained.

Reference Example 1

An active energy ray-curable resin composition formed from 70 parts of an EO-modified compound of dipentaerythritol hexaacrylate [manufactured by Dai-ichi Kogyo Seiyaku Co., Ltd., trade name: DPHA-12EO] as the component (A3), 30 parts of ethoxylated pentaerythritol tetraacrylate (manufactured by Shin Nakamura Chemical Industry, Ltd., trade name: NK ESTER ATM-4E) as the component (B3), 1.0 part of 1-hydroxycyclohexyl phenyl ketone (manufactured by Ciba Japan K.K., trade name: IRGACURE 184) and 0.5 parts of bis(2,4,6-trimethylbenzoyl)phenylphosphine oxide (manufactured by Ciba Japan K.K., trade name: IRGACURE 819) as polymerization initiators, and 0.1 parts of a mold release agent (manufactured by Tomoe Engineering Co., Ltd., trade name: MOLDWIZ INT-1856), was prepared.

The total chemical formula weight of the polyalkylene glycol structure $(-C_2H_4O-)_n$ moiety (M(PAG)) in the component (A3) used herein was 44×12=528; the total chemical formula weight of the acryloyl structure $(CH_2=CHCO-)$ moiety (M(ACR)) was 55×6=330; and the polyalkylene glycol percent content (PAG) was 528/(330+528)×100≈61.5(%).

Several drops of the above active energy ray-curable resin composition was dripped on the stamper, and the resin composition was coated by spreading on the surface of a polyethylene terephthalate film (manufactured by Toyobo Co., Ltd., trade name: A-4300) having a thickness of 188 µm. Subsequently, the resin composition was cured by irradiating with ultraviolet radiation through the film side in an energy amount of 1200 mJ/cm$^2$ using a high pressure mercury lamp. Subsequently, the film and the stamper were detached, and thus a light transmissive article having a microrelief structure layer in which the distance between adjoining convexities or concavities was 100 nm and the height was 180 nm, was obtained.

Examples C1 to C10, Comparative Examples C1 to C4, and Reference Examples 2 to 10

Light transmissive articles were produced in the same manner as in Example C1, except that the compounds indicated in Table 8 and Table 9 were used as the polymerizable compounds.

The evaluation results for the various Examples, Comparative Examples and Reference Examples described above are presented in Table 8 and Table 9.

Meanwhile, in Table 8 and Table 9, Examples 1 to 10 and Comparative Examples 1 to 4 represent Examples C1 to C10 and Comparative Examples C1 to C4, respectively.

TABLE 8

| | | a | n | PAG [%] | Reference Example 1 | Reference Example 2 | Reference Example 3 | Reference Example 4 | Example 1 | Example 2 |
|---|---|---|---|---|---|---|---|---|---|---|
| A | DPHA-12EO | 6 | 2 | 61.5 | 70 | | | | 80 | 70 |
| | DPHA-18EO | 6 | 3 | 70.6 | | 70 | | | | |
| | DPHA-24EO | 6 | 4 | 76.2 | | | 95 | | | |
| | DPHA-30EO | 6 | 5 | 80.0 | | | | 100 | | |
| B | ATM-4E | 4 | 1 | 44.4 | 30 | 30 | 5 | | | |
| | DPHA | 6 | 0 | 0 | | | | | | |
| | A-TMPT-6EO | 3 | 2 | 61.5 | | | | | | |
| | PE-4A | 4 | 0 | 0 | | | | | | |
| | ATM-35E | 4 | 8.75 | 87.5 | | | | | 20 | 30 |
| | A-GLY-20E | 3 | 6.67 | 84.2 | | | | | | |
| Others | M260 | 2 | 13 | 83.9 | | | | | | |
| | A-1000 | 2 | 23 | 90.2 | | | | | | |
| | 9EG-A | 2 | 9 | 78.3 | | | | | | |
| | HEA | 1 | 0 | 0 | | | | | | |
| | A-SA | 1 | 0 | 0 | | | | | | |
| Evaluation results | Scratch resistance | | | | A | A | A | A | A | A |
| | Antireflection properties | | | | A | A | A | A | A | A |
| | Fingerprint wipeability | Wiping with damp cloth | | | B | B | B | A | A | A |
| | | Wiping with dry cloth | | | B | B | A | A | A | A |
| | External appearance | Transparency (clouding) | | | A | A | A | A | A | A |
| | Resin properties | Martens hardness [N/mm$^2$] | | | 109 | 81 | 51 | 45 | 41 | 34 |
| | | Elastic modulus [Mpa] | | | 1895 | 1445 | 859 | 744 | 612 | 496 |
| | PAG percent content [%] | | | | 56 | 63 | 69 | 71 | 67 | 69 |
| | Indentation elastic modulus (X) | | | | 1939 | 1527 | 927 | 781 | 559 | 487 |
| | Creep deformation ratio (Y) | | | | 9.30% | 11.20% | 11.90% | 11.80% | 6.10% | 6.30% |
| | (0.00022X − 0.01) × 100 | | | | 41.7 | 32.6 | 19.4 | 16.2 | 11.3 | 9.7 |

| | | a | n | PAG [%] | Example 3 | Example 4 | Example 5 | Example 6 | Example 7 | Example 8 |
|---|---|---|---|---|---|---|---|---|---|---|
| A | DPHA-12EO | 6 | 2 | 61.5 | 50 | 30 | | | | |
| | DPHA-18EO | 6 | 3 | 70.6 | | | | | | |
| | DPHA-24EO | 6 | 4 | 76.2 | | | 100 | | | |
| | DPHA-30EO | 6 | 5 | 80.0 | | | | 100 | 90 | 70 |
| B | ATM-4E | 4 | 1 | 44.4 | | | | | 10 | 30 |
| | DPHA | 6 | 0 | 0 | | | | | | |
| | A-TMPT-6EO | 3 | 2 | 61.5 | | | | | | |
| | PE-4A | 4 | 0 | 0 | | | | | | |

TABLE 8-continued

|  |  | a | n | PAG [%] | | | | | |
|---|---|---|---|---|---|---|---|---|---|
| Others | ATM-35E | 4 | 8.75 | 87.5 | 50 | 70 | | | |
|  | A-GLY-20E | 3 | 6.67 | 84.2 | | | | | |
|  | M260 | 2 | 13 | 83.9 | | | | | |
|  | A-1000 | 2 | 23 | 90.2 | | | | | |
|  | 9EG-A | 2 | 9 | 78.3 | | | | | |
|  | HEA | 1 | 0 | 0 | | | | | |
|  | A-SA | 1 | 0 | 0 | | | | | |
| Evaluation results | Scratch resistance | | | | A | B | A | B | B | A |
|  | Antireflection properties | | | | A | A | A | A | A | A |
|  | Fingerprint wipeability | Wiping with damp cloth | | | | A | A | A | A | A | A |
|  |  | Wiping with dry cloth | | | | B | B | A | B | A | A |
|  | External appearance | Transparency (clouding) | | | | A | C | B | B | B | A |
|  | Resin properties | Martens hardness [N/mm²] | | | | 20 | 11 | 17 | 11 | 14 | 32 |
|  |  | Elastic modulus [Mpa] | | | | 279 | 156 | 248 | 154 | 207 | 487 |
|  | PAG percent content [%] | | | | 75 | 80 | 76 | 80 | 76 | 69 |
|  | Indentation elastic modulus (X) | | | | 237 | 131 | 211 | 133 | 173 | 462 |
|  | Creep deformation ratio (Y) | | | | 2.60% | 0.60% | 2.50% | 0.30% | 1.30% | 8.40% |
|  | (0.00022X − 0.01) × 100 | | | | 4.2 | 1.9 | 3.6 | 1.9 | 2.8 | 9.2 |

TABLE 9

|  |  | a | n | PAG [%] | Reference Example 5 | Reference Example 6 | Reference Example 7 | Example 9 | Example 10 | Reference Example 8 |
|---|---|---|---|---|---|---|---|---|---|---|
| A | DPHA-12EO | 6 | 2 | 61.5 | | | | 90 | 70 | 50 |
|  | DPHA-18EO | 6 | 3 | 70.6 | | | | | | |
|  | DPHA-24EO | 6 | 4 | 76.2 | | | | | | |
|  | DPHA-30EO | 6 | 5 | 80.0 | 50 | 30 | | | | |
| B | ATM-4E | 4 | 1 | 44.4 | 50 | 70 | | | | |
|  | DPHA | 6 | 0 | 0 | | | | | | 30 |
|  | A-TMPT-6EO | 3 | 2 | 61.5 | | | | | | |
|  | PE-4A | 4 | 0 | 0 | | | | | | |
|  | ATM-35E | 4 | 8.75 | 87.5 | | | | | | |
|  | A-GLY-20E | 3 | 6.67 | 84.2 | | | | 10 | 30 | 50 |
| Others | M260 | 2 | 13 | 83.9 | | | | | | 60 |
|  | A-1000 | 2 | 23 | 90.2 | | | | | | |
|  | 9EG-A | 2 | 9 | 78.3 | | | | | | |
|  | HEA | 1 | 0 | 0 | | | | | | 10 |
|  | A-SA | 1 | 0 | 0 | | | | | | |
| Evaluation results | Scratch resistance | | | | A | A | A | A | A | C |
|  | Antireflection properties | | | | A | A | A | A | A | A |
|  | Fingerprint wipeability | Wiping with damp cloth | | | | A | B | B | A | A | A |
|  |  | Wiping with dry cloth | | | | A | B | A | A | A | A |
|  | External appearance | Transparency (clouding) | | | | A | A | A | A | A | A |
|  | Resin properties | Martens hardness [N/mm²] | | | | 63 | 90 | 63 | 38 | 20 | 41 |
|  |  | Elastic modulus [Mpa] | | | | 1069 | 1621 | 1012 | 563 | 288 | 622 |
|  | PAG percent content [%] | | | | 62 | 55 | 64 | 68 | 73 | 51 |
|  | Indentation elastic modulus (X) | | | | 1046 | 1653 | 1028 | 529 | 253 | — |
|  | Creep deformation ratio (Y) | | | | 10.9 | 10.2 | 9.7 | 6.7 | 2.9 | — |
|  | (0.00022X − 0.01) × 100 | | | | 22.0 | 35.4 | 21.6 | 10.6 | 4.6 | — |

|  |  | a | n | PAG [%] | Comparative Example 1 | Comparative Example 2 | Comparative Example 3 | Comparative Example 4 | Reference Example 9 | Reference Example 10 |
|---|---|---|---|---|---|---|---|---|---|---|
| A | DPHA-12EO | 6 | 2 | 61.5 | | | | | | |
|  | DPHA-18EO | 6 | 3 | 70.6 | | 60 | | | | |
|  | DPHA-24EO | 6 | 4 | 76.2 | | | | | | |
|  | DPHA-30EO | 6 | 5 | 80.0 | | | | | | |
| B | ATM-4E | 4 | 1 | 44.4 | | 30 | 100 | | | |
|  | DPHA | 6 | 0 | 0 | 50 | | | | | |
|  | A-TMPT-6EO | 3 | 2 | 61.5 | | | | 100 | | |
|  | PE-4A | 4 | 0 | 0 | | | | | 15 | 15 |
|  | ATM-35E | 4 | 8.75 | 87.5 | | | | | | |
|  | A-GLY-20E | 3 | 6.67 | 84.2 | | | | | | |
| Others | M260 | 2 | 13 | 83.9 | 40 | | | | | |
|  | A-1000 | 2 | 23 | 90.2 | | | | | 85 | |
|  | 9EG-A | 2 | 9 | 78.3 | | | | | | 85 |
|  | HEA | 1 | 0 | 0 | 10 | | | | | |
|  | A-SA | 1 | 0 | 0 | | 10 | | | | |

TABLE 9-continued

| Evaluation results | | | | | | | | |
|---|---|---|---|---|---|---|---|---|
| | Scratch resistance | | C | C | C | C | C | C |
| | Antireflection properties | | A | A | A | A | A | A |
| | Fingerprint wipeability | Wiping with damp cloth | A | B | C | C | C | A |
| | | Wiping with dry cloth | B | B | B | A | C | B |
| | External appearance | Transparency (clouding) | A | A | A | A | C | A |
| | Resin properties | Martens hardness [N/mm$^2$] | 108 | 80 | 156 | 61 | 9 | 22 |
| | | Elastic modulus [Mpa] | 1727 | 1464 | 2749 | 1229 | 136 | 322 |
| | | PAG percent content [%] | 34 | 56 | 44 | 62 | 77 | 67 |
| | | Indentation elastic modulus (X) | 1668 | 1518 | 2917 | 1263 | — | — |
| | | Creep deformation ratio (Y) | 8 | 13.4 | 8.6 | 15.6 | — | — |
| | | (0.00022X − 0.01) × 100 | 35.7 | 32.4 | 63.2 | 26.8 | — | — |

The abbreviations in the tables are as follows.
"a": number of acryloyl groups,
"n": average number of repetitions of structure derived from alkylene glycol,
"PAG": polyalkylene glycol percent content (%),
"DPHA-12EO": EO-modified compound of dipentaerythritol hexaacrylate [manufactured by Dai-ichi Kogyo Seiyaku Co., Ltd., trade name: DPHA-12EO modification, a compound in which $R_1$ to $R_6$ of general formula (1) are all H; and the total number of repeating units of the molecular structure of ethylene glycol (l+m+n+o+p+q) is 12, the average number of repetitions of the polyethylene glycol structure is 2 (=12/6)],
"DPHA-18EO": EO-modified compound of dipentaerythritol hexaacrylate [manufactured by Dai-ichi Kogyo Seiyaku Co., Ltd., trade name: DPHA-18EO modification, a compound in which $R_1$ to $R_6$ of general formula (1) are all H; and the total number of repeating units of the molecular structure of ethylene glycol (l+m+n+o+p+q) is 18, the average number of repetitions of the polyethylene glycol structure is 3 (=18/6)],
"DPHA-24EO": EO-modified compound of dipentaerythritol hexaacrylate [manufactured by Dai-ichi Kogyo Seiyaku Co., Ltd., trade name: DPHA-24EO modification, a compound in which $R_1$ to $R_6$ of general formula (1) are all H; and the total number of repeating units of the molecular structure of ethylene glycol (l+m+n+o+p+q) is 24, the average number of repetitions of the polyethylene glycol structure is 4 (=24/6)],
"DPHA-30EO": EO-modified compound of dipentaerythritol hexaacrylate [manufactured by Dai-ichi Kogyo Seiyaku Co., Ltd., trade name: DPHA-30EO modification, a compound in which $R_1$ to $R_6$ of general formula (1) are all H; and the total number of repeating units of the molecular structure of ethylene glycol (l+m+n+o+p+q) is 30, the average number of repetitions of the polyethylene glycol structure is 5 (=30/6)],
"ATM-4E": Ethoxylated pentaerythritol tetraacrylate (manufactured by Shin Nakamura Chemical Industry, Ltd., trade name: ATM-4E),
"DPHA": Dipentaerythritol hexaacrylate (manufactured by Toagosei Co., Ltd.),
"A-TMPT-6EO": EO-modified compound of trimethylolpropane triacrylate (manufactured by Shin Nakamura Chemical Industry, Ltd., average number of repetitions of the polyethylene glycol structure=2),
"PE-4A": Pentaerythritol tetraacrylate (manufactured by Kyoeisha Chemical Co., Ltd., trade name: LIGHT ACRYLATE PE-4A)
"ATM-35E": Ethoxylated pentaerythritol tetraacrylate (manufactured by Shin Nakamura Chemical Industry, Ltd., a compound having a total number of repeating units having the ethylene glycol molecular structure of 35, the average number of repetitions of the polyethylene glycol structure=8.75 (=35/4)),
"A-GLY-20E": Ethoxylated glycerin triacrylate (manufactured by Shin Nakamura chemical Industry, Ltd., a compound having a total number of repeating units having the ethylene glycol molecular structure of 20, the average number of repetitions of the polyethylene glycol structure=6.67 (20/3)),
"M260": Polyethylene glycol (n=about 13) diacrylate (manufactured by Toagosei Co., Ltd.),
"A-1000": Polyethylene glycol (n=23) diacrylate (manufactured by Shin Nakamura Chemical Industry, Ltd., trade name: NK ESTER A-1000),
"9EG-A": Polyethylene glycol (n=9) diacrylate (manufactured by Kyoeisha Chemical Co., Ltd., trade name: LIGHT ACRYLATE 9EG-A),
"HEA": Hydroxyethyl acrylate,
"A-SA": 2-Acryloyloxyethyl succinate (manufactured by Shin Nakamura Chemical Industry, Ltd.).

<Evaluation>

As is obvious from the results of Table 8, the light transmissive articles of Reference Examples 1 to 7 and Examples C1 to C3, C5, and C8 to C10 had satisfactory scratch resistance and low reflectance. Also, in the light transmissive articles of Examples C4, C7 and C8 having a Martens hardness of less than 15 N/mm$^2$, 20 or fewer fine scratches were generated in some of the test areas due to the scratch resistance test, to the extent that the scratches were not recognizable by visual inspection. On the other hand, in the light transmissive article of Reference Example 8 that did not contain the (meth)acrylic monomer (A3), more than 20 scratches were generated due to the scratch resistance test, and the entire surface of the scratch resistance test area was clouded in white. Similarly, in the light transmissive articles of Comparative Examples C1, C3 and C4 and Reference Examples 9 and 10 that did not contain the (meth)acrylic monomer (A3); Comparative Example C2 that contained components other than the (meth)acrylic monomer (A3) component and the (meth)acrylic monomer (B3); Comparative Example C3 having a PAG percent content of less than 50%; and Comparative Example C4 having a number of functional groups of the (meth)acrylic monomer (B3) of 3, a large number of scratches were generated over the entire surface contacted with the indenter.

Furthermore, in the light transmissive articles of Comparative Examples C3 and C4 containing only a (meth)acrylic monomer (B3) having a small average number of repetitions of the structure derived from alkylene glycol, fingerprints could not be removed by wiping with a damp cloth.

Furthermore, in Examples C4 to C7 in which the Martens hardness was relatively low, scratch resistance was satisfactory; however, clouding caused by the phenomenon in which protrusions of the microrelief structure were drawn close to one another was observed.

Furthermore, in the light transmissive articles of Examples C1 to C10 and Reference Examples 1 to 7, fingerprints could be removed to a level of being not recognizable, by wiping with a damp cloth and by wiping with a dry cloth, without scratching. The light transmissive articles of Reference Examples 8 and 10, and Comparative Examples C1 to C4 had poor scratch resistance, but fingerprints could be removed to a level of being not recognizable, by wiping with a dry cloth or by wiping with a damp cloth.

Also, hereinbelow, the present invention is explained in more detail by way of Example D.

(Scratch Resistance)

A load of 400 g was applied on a steel wool (trade name: BONSTAR #0000, manufactured by Nippon Steel Wool Co., Ltd.) having a size of 2 cm on each side and placed on the surface of an article, and the steel wool was rubbed for 10 reciprocations using an abrasion testing machine (trade name: HEiDON TRIBOGEAR TYPE-30S, manufactured by Shinto Scientific Co., Ltd.) at a distance of reciprocation: 30 mm and a head speed: 30 mm/sec. The external appearance of the surface of the article was evaluated. On the occasion of the evaluation of external appearance, the article was attached to one surface of a transparent black acrylic plate (manufactured by Mitsubishi Rayon Co., Ltd., ACRYLITE) having a thickness of 2.0 mm through a tacky adhesive, the acrylic plate was held up to a fluorescent lamp indoors, and thus scratch resistance was evaluated by visual inspection.

A: No scratches are recognized.

B: There are fewer than 5 scratches that can be recognized, and the scratch sites are not clouded in white.

C: There are 5 or more but fewer than 20 scratches that can be recognized, and the scratch sites are slightly clouded in white.

D: There are 20 or more scratches that can be recognized, and the scratch sites appear clearly cloudy in white.

(Fingerprint Wipeability)

The surface of an article having fingerprints attached on the surface was wiped in one direction using a wiper (trade name: ELLEAIR PROWIPE, manufactured by Daio Paper Corp.) soaked with 1.0 cc of tap water. Thereafter, the external surface of the surface of the article was evaluated.

A: Fingerprints can be completely removed by wiping for 2 or fewer times.

B: Fingerprints can be completely removed by wiping for 3 or more times but fewer than 10 times.

C: Fingerprints remain even after wiping for 10 times.

(Water Resistance)

The surface of an article having fingerprints attached on the surface was wiped in one direction using a wiper (trade name: ELLEAIR PROWIPE, manufactured by Daio Paper Corp.) soaked with 1.0 cc of tap water. Thereafter, the external surface of the surface of the article was evaluated.

A: Satisfactory antireflection performance and transparency are maintained.

B: When a white LED light source is illuminated from an oblique direction, the film is slightly clouded in white.

C: The film is clearly clouded in white.

(Pencil Hardness)

A pencil hardness test was carried out based on JIS K5600-5-4 (1999). A pencil of UNI Series manufactured by Mitsubishi Pencil Co., Ltd. was used, and the load was 500 g. Determination was made on the criterion that scratches including impressions were not recognized by visual inspection.

(Production of Stamper)

An electrolytically polished aluminum disc having a purity of 99.99% by mass and having a thickness of 2 mm and a diameter of ϕ65 mm was used as an aluminum substrate.

A 0.3 M aqueous solution of oxalic acid was adjusted to 15° C., and the aluminum substrate was immersed therein. An electric current was intermittently passed through the aluminum substrate by repeatedly turning the power supply of a direct current stabilization apparatus on and off, and thus the aluminum substrate was anodically oxidized. An operation of applying a constant voltage of 80 V for 5 seconds at an interval of 30 seconds was repeated 60 times. Thereby, an oxide coating film having pores was formed.

Subsequently, the aluminum substrate having the oxide coating film formed thereon was immersed for 6 hours in an aqueous solution at 70° C. produced by mixing 6 mass % phosphoric acid and 1.8 mass % chromic acid. Thereby, the oxide coating film was dissolved and removed.

The aluminum substrate from which the oxide coating film had been dissolved and removed, was immersed in a 0.05 M aqueous solution of oxalic acid that had been adjusted to 16° C., and thus the aluminum substrate was subjected to anodization for 7 seconds at 80 V. Subsequently, the aluminum substrate was immersed for 20 minutes in a 5 mass % aqueous solution of phosphoric acid that had been adjusted to 32° C., and thus the aluminum substrate was subjected to a pore diameter expansion treatment of expanding the pores of the oxide coating film. As such, anodization and a pore diameter expansion treatment were alternately repeated, and these treatments were each applied 5 times in total.

The mold thus obtained was immersed for 10 minutes in a 0.1 mass % aqueous solution of TDP-8 (trade name, manufactured by Nikko Chemicals Co., Ltd.). This was lifted up and dried in air overnight, and thereby the mold was subjected to a mold release treatment.

(Polymerizable Component (Z))

The polymerizable component (Z) used in Example D was as described below.

DPHA-12EO: Ethoxylated dipentaerythritol hexaacrylate (oxyethylene group: 12 mol), 14EGDA: polyethylene glycol diacrylate (molecular weight of polyethylene glycol=600, oxyethylene group: about 14 mol).

(Photopolymerization Initiator (D))

In regard to the photopolymerization initiator (D) used in Example D and Comparative Example D, 1.0% by mass of IRGACURE 184 (manufactured by BASF SE) and 0.5% by mass of IRGACURE 819 (manufactured by BASF SE) were added relative to 100% by mass of the polymerizable component (Z).

Example D1

An active energy ray-curable resin composition was prepared by mixing 50% by mass of DPHA-12EO, 50% by mass of 14EGDA, 1.0% by mass of IRGACURE 184, and 0.5% by mass of IRGACURE 819. A cured product of this active energy ray-curable resin composition had an elastic modulus (X) of 220 MPa and a creep deformation ratio (Y) of 2.9%.

About 1.0 cc of the active energy ray-curable resin composition was dripped on the surface of the stamper, and the resin composition was coated by spreading on a PET film (manufactured by Mitsubishi Plastics, Inc.; T600) having a thickness of 38 µm as a cover film, with a Shim Tape having a thickness of 100 µm being interposed therebetween as a spacer. Subsequently, the resin composition was cured by irradiating ultraviolet radiation through the cover film side in an energy amount of 1000 mJ/cm$^2$ using a high pressure mercury lamp. The cover film was peeled off, subsequently the cured product layer was released from the stamper, and thus a film-like article having on the surface a microrelief structure with an average distance between convexities: 180 nm and a height: 180 nm, and having a thickness of the cured product of 100 µm, was obtained. Furthermore, it was confirmed that cracks were not generated when the article thus obtained was wound around a cylindrical rod having a circular cross-section having a diameter of 10 mm. Thus, a film-like article that can be handled alone was obtained. The evaluation results are such that the scratch resistance was A; the fingerprint wipeability was A; the water resistance was A; and the pencil hardness was 2H.

Example D2

An article having a microrelief structure was obtained in the same manner as in Example D1, except that the thickness of the spacer was adjusted to 200 µm. The article thus obtained was in a film form having a microrelief structure with an average distance between convexities: 180 nm and a height: 180 nm on the surface, and having a thickness of the cured product of 200 µm. Also, it was confirmed that cracks were not generated when the article thus obtained was wound around a cylindrical rod having a circular cross-section having a diameter of 10 mm. The evaluation results were such that the scratch resistance was A; the fingerprint wipeability was A; the water resistance was A; and the pencil hardness was 2H.

INDUSTRIAL APPLICABILITY

The light transmissive article related to the present invention has high scratch resistance while maintaining excellent optical performance, and has satisfactory fingerprint wipeability. Therefore, the light transmissive article can be utilized in various displays of televisions, mobile telephones, mobile game players and the like, and is industrially useful.

Furthermore, the light transmissive article of the present invention as a nanorelief structure can achieve a balance between excellent antireflection performance and high scratch resistance performance. Therefore, the light transmissive article can be utilized in optical applications such as various display panels, lenses, show windows, car instrument cluster covers, rod lens arrays, cover glass for image sensors of facsimiles, copying machines, scanners and the like, contact glass for placing a document in a copying machine, spectacle lenses, and light extraction ratio enhancing members for solar cells, and is industrially highly useful. Also, the light transmissive article can be utilized in mirrors or window materials, which have deteriorated visibility when water droplets adhere thereto.

EXPLANATIONS OF LETTERS OR NUMERALS

10 ALUMINUM SUBSTRATE
12 PORES (REVERSE STRUCTURE OF MICRORELIEF STRUCTURE)
14 OXIDE COATING FILM
16 PORE ORIGINATING POINT
18 STAMPER
20 ROLL-SHAPED STAMPER
22 TANK
24 PNEUMATIC CYLINDER
26 NIP ROLL
28 ACTIVE ENERGY RAY IRRADIATION APPARATUS
30 PEELING ROLL
40 LIGHT TRANSMISSIVE ARTICLE (ARTICLE)
42 LIGHT TRANSMISSIVE SUBSTRATE (COVER FILM)
44 MICRORELIEF STRUCTURE LAYER
46 CONVEXITY
50 LIGHT TRANSMISSIVE SUBSTRATE
51 MICRORELIEF STRUCTURE LAYER
52 CONVEXITY
53 CONCAVITY
54 HEIGHT OF RELIEF
55 PROTRUSION WIDTH

The invention claimed is:

1. An article comprising a microrelief structure comprising a cured product of a resin composition on a surface of the article,
wherein an indentation elastic modulus (X) MPa and a creep deformation ratio (Y) % of the cured product satisfy the following formulas (1) and (2):

$$80 \leq X \leq 560 \quad (1)$$

$$Y \leq (0.00022X - 0.01) \times 100 \quad (2).$$

2. The article according to claim 1, wherein the indentation elastic modulus (X) MPa and the creep deformation ratio (Y) % of the cured product satisfy the following formula (1'):

$$120 \leq X \leq 360 \quad (1').$$

3. The article according to claim 1, wherein an average distance between adjoining convexities in the microrelief structure is 120 to 380 nm, and an average height of convexities of the microrelief structure is 100 to 300 nm.

4. The article according to claim 1, further comprising a substrate having the microrelief structure comprising a cured product of an active energy ray-curable resin composition on at least one surface of the substrate.

5. The article according to claim 4, wherein an acrylic equivalent of the active energy ray-curable resin composition is from 200 to 320.

6. The article according to claim 4, wherein an acrylic equivalent of the active energy ray-curable resin composition is from 230 to 310.

7. The article according to claim 4, wherein oxyethylene groups are present in the cured product in a range from 55.0% by mass to 74.0% by mass.

8. The article according to claim 4, wherein the active energy ray-curable resin composition comprises:
a polymerizable component (Z) comprising:
0 to 20% by mass of a polyfunctional acrylate (A1) having three or more acryloyl groups, with a molecular weight per group of the acryloyl groups being less than 110;
15 to 75% by mass of a polyfunctional acrylate (B1) having three or more acryloyl groups, with a molecular weight per group of the acryloyl groups being 110 or more; and
20 to 85% by mass of a bifunctional acrylate (C1) having two acryloyl groups and containing a polyethylene glycol structure having a molecular weight of 300 or more, and
a photopolymerization initiator (D).

9. The article according to claim 4, wherein the active energy ray-curable resin composition comprises:
a polymerizable component (Z) comprising:
a polyfunctional (meth)acrylate (A2) having three or more (meth)acryloyl groups in the molecule, with the average value of the number of oxyethylene groups per group of the (meth)acryloyl groups being 5 or more, and
a photopolymerization initiator (D).

10. The article according to claim 9, wherein the polyfunctional (meth)acrylate (A2) is a compound represented by Formula (1):

Formula 1

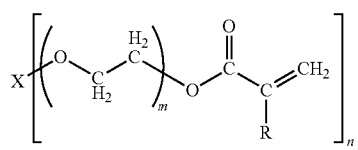

wherein:

X represents an organic residue;

R represents a hydrogen atom or a methyl group;

m≥5; and n≥3.

11. The article according to claim 9, wherein the polyfunctional (meth)acrylate (A2) is one or more compounds selected from the group consisting of ethylene oxide-modified (poly)(meth)acrylates of (poly)pentaerythritol, (poly)glycerin and (di)trimethylolpropane.

12. The article according to claim 4, wherein the active energy ray-curable resin composition comprises:
- a polymerizable component (Z) comprising:
  - 25 to 100% by mass of a polyfunctional (meth)acrylate (A2); and
  - 0 to 75% by mass of a polyfunctional (meth)acrylate (B2) having three or more (meth)acryloyl groups in the molecule, with the average value of the number of oxyethylene groups per group of the (meth)acryloyl groups being less than 5, and
- a photopolymerization initiator (D).

13. The article according to claim 4, wherein a polymerizable compound present in the active energy ray-curable resin composition is a tetrafunctional or higher-functional (meth)acrylic monomer (A3) in which the percentage content of polyalkylene glycol (PAG) in the (meth)acrylic monomer (A3) represented by the following formula (a) is from 50% to 87%:

$$PAG = M(PAG)/[M(ACR)+M(PAG)] \times 100 \quad (a)$$

M(PAG): total chemical formula weight of polyalkylene glycol structural moiety

M(ACR): total chemical formula weight of (meth)acryloyl structural moiety.

14. An antireflective article comprising the article according to claim 4.

15. The article according to claim 1, wherein the resin composition comprises an active energy ray-curable resin composition comprising:
- a polymerizable component (Z) comprising:
  - 0 to 20% by mass of a polyfunctional acrylate (A1) having three or more acryloyl groups, with a molecular weight per group of the acryloyl groups being less than 110;
  - 15 to 75% by mass of a polyfunctional acrylate (B1) having three or more acryloyl groups, with a molecular weight per group of the acryloyl groups being 110 or more; and
  - 20 to 85% by mass of a bifunctional acrylate (C1) having two acryloyl groups and containing a polyethylene glycol structure having a molecular weight of 300 or more, and
- a photopolymerization initiator (D).

16. The article according to claim 1, wherein the resin composition comprises an active energy ray-curable resin composition comprising:
- a polymerizable component (Z) comprising:
  - a polyfunctional (meth)acrylate (A2) having three or more (meth)acryloyl groups in the molecule, with an average value of the number of oxyethylene groups per group of the (meth)acryloyl groups being 5 or more, and
- a photopolymerization initiator (D).

17. The article according to claim 1, wherein the resin composition comprises a light transmissive article active energy ray-curable resin composition comprising:
- a polymerizable component (Z) comprising:
  - 25 to 100% by mass of a polyfunctional (meth)acrylate (A2); and
  - 0 to 75% by mass of a polyfunctional (meth)acrylate (B2) having three or more (meth)acryloyl groups in the molecule, with the average value of the number of oxyethylene groups per group of the (meth)acryloyl groups being less than 5, and
- a photopolymerization initiator (D).

18. The article according to claim 1, wherein the resin composition comprises an active energy ray-curable resin composition comprising:
- a tetrafunctional or higher-functional (meth)acrylic monomer (A3) in which the polyalkylene glycol percent content (PAG) in the (meth)acrylic monomer (A3) represented by the following formula (a) is from 50% to 87%; and
- a trifunctional or higher-functional (meth)acrylic monomer (B3) other than the (meth)acrylic monomer (A3), wherein the (meth)acrylic monomer (A3) and/or (meth)acrylic monomer (B3) of the polymerizable compounds has one or more polyalkylene glycol structures each having an average number of repetitions of the structure derived from alkylene glycol of 5 or more, in the molecule:

$$PAG = M(PAG)/[M(ACR)+M(PAG)] \times 100 \quad (a)$$

M(PAG): total chemical formula weight of polyalkylene glycol structural moiety

M(ACR): total chemical formula weight of (meth)acryloyl structural moiety.

19. An antireflective article comprising the article according to claim 1.

* * * * *